(12) United States Patent
Morishima et al.

(10) Patent No.: US 6,415,095 B1
(45) Date of Patent: Jul. 2, 2002

(54) DATA RECORDING/PLAYBACK APPARATUS, DATA EDITING APPARATUS AND DATA RECORDING METHOD

(75) Inventors: Shinichi Morishima; Makoto Tabuchi, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/738,237

(22) Filed: Dec. 15, 2000

Related U.S. Application Data

(63) Continuation of application No. PCT/JP00/02495, filed on Apr. 17, 2000.

(30) Foreign Application Priority Data

| Apr. 16, 1999 | (JP) | 11-110115 |
| Apr. 16, 1999 | (JP) | 11-110116 |
| Apr. 16, 1999 | (JP) | 11-110117 |

(51) Int. Cl.⁷ ............................................. G11B 27/00
(52) U.S. Cl. ........................... 386/55; 386/52; 345/723
(58) Field of Search ............................ 386/52, 53, 55, 386/65; 369/32; 345/723; H04N 5/93

(56) References Cited

U.S. PATENT DOCUMENTS

| 5,051,845 A | * | 9/1991 | Gardner et al. ................ 386/52 |
| 5,388,197 A | * | 2/1995 | Rayner ........................ 345/723 |
| 5,568,275 A | | 10/1996 | Norton et al. |
| 5,659,793 A | * | 8/1997 | Escobar et al. ............. 707/500.1 |
| 5,717,663 A | * | 2/1998 | Fujita .......................... 369/32 |
| 6,085,020 A | * | 7/2000 | Saito et al. ................... 386/54 |

FOREIGN PATENT DOCUMENTS

| EP | 0 438 299 A2 | 7/1991 |
| EP | 0 791 927 A2 | 8/1997 |
| JP | 4-211587 | 8/1992 |
| JP | 5-89644 | 4/1993 |
| JP | 5-151756 | 6/1993 |
| JP | 5-159536 | 6/1993 |
| JP | 9-168130 | 6/1997 |
| JP | 9-231727 | 9/1997 |
| JP | 11-66817 | 3/1999 |
| JP | 11-146334 | 5/1999 |

* cited by examiner

*Primary Examiner*—Vincent Boccio
(74) *Attorney, Agent, or Firm*—Frommer Lawrence & Haug LLP; William S. Frommer

(57) ABSTRACT

The A/V server manages data to be edited in the form of edit data pages (will be referred to as "page" herebelow) and program as a collection of the pages. The page data include recorder- and player-side device names, file names and edition points per page. The data in all the pages are collected as a program. A page number to identify each page is represented by a sequence of information assigned in the produced order in each page. The A/V server changes only the page number in the temporal order of the IN points in the destination data and produces a program in which the page data are re-arranged. Also when re-accessing near the same material data recorded in a VTR, the A/V server accesses data recorded in the HDD, not in the VTR.

61 Claims, 46 Drawing Sheets

FILE ENTRY (FE)

| FILE NAME |
|---|
| LINK TO FIRST RE |
| START TIME CODE |
| FILE MAKER, DATA OF FILE MAKING, etc. |

RECORD ENTRY (RE)

| LINK TO NEXT RE |
|---|
| DATA AT TOP POSITION |
| CONTINUOUS AREA |

FREE SPACE ENTRY (FSL)

| LINK TO NEXT FSL |
|---|
| DATA AT TOP POSITION |
| CONTINUOUS AREA |

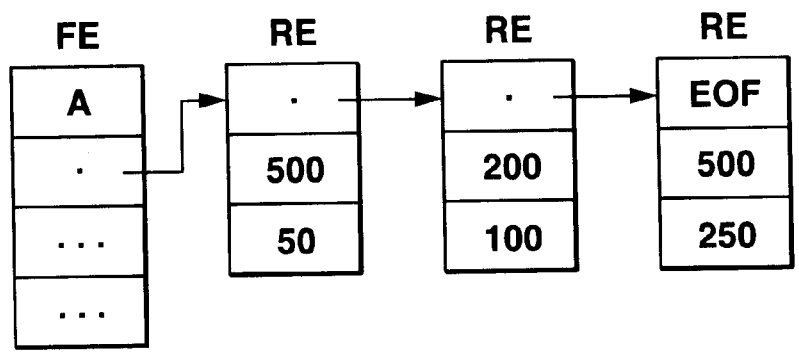
FIG.5
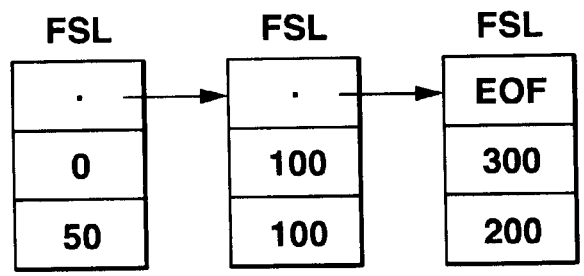
FIG.6
| FILE NAME | PLAYBACK START POSITION | PLAYBACK END POSITION |
|---|---|---|
FIG.7

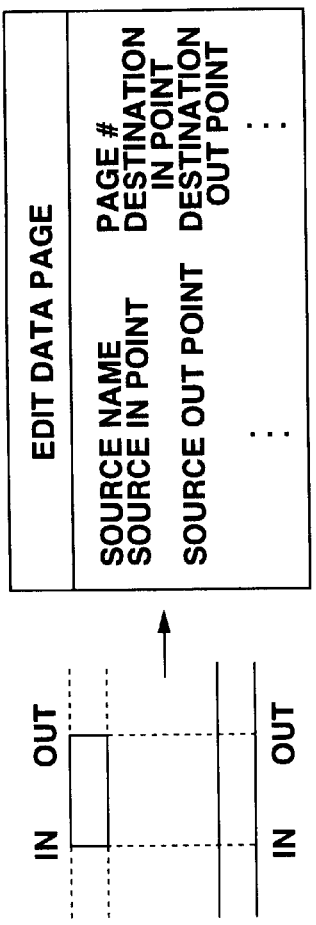
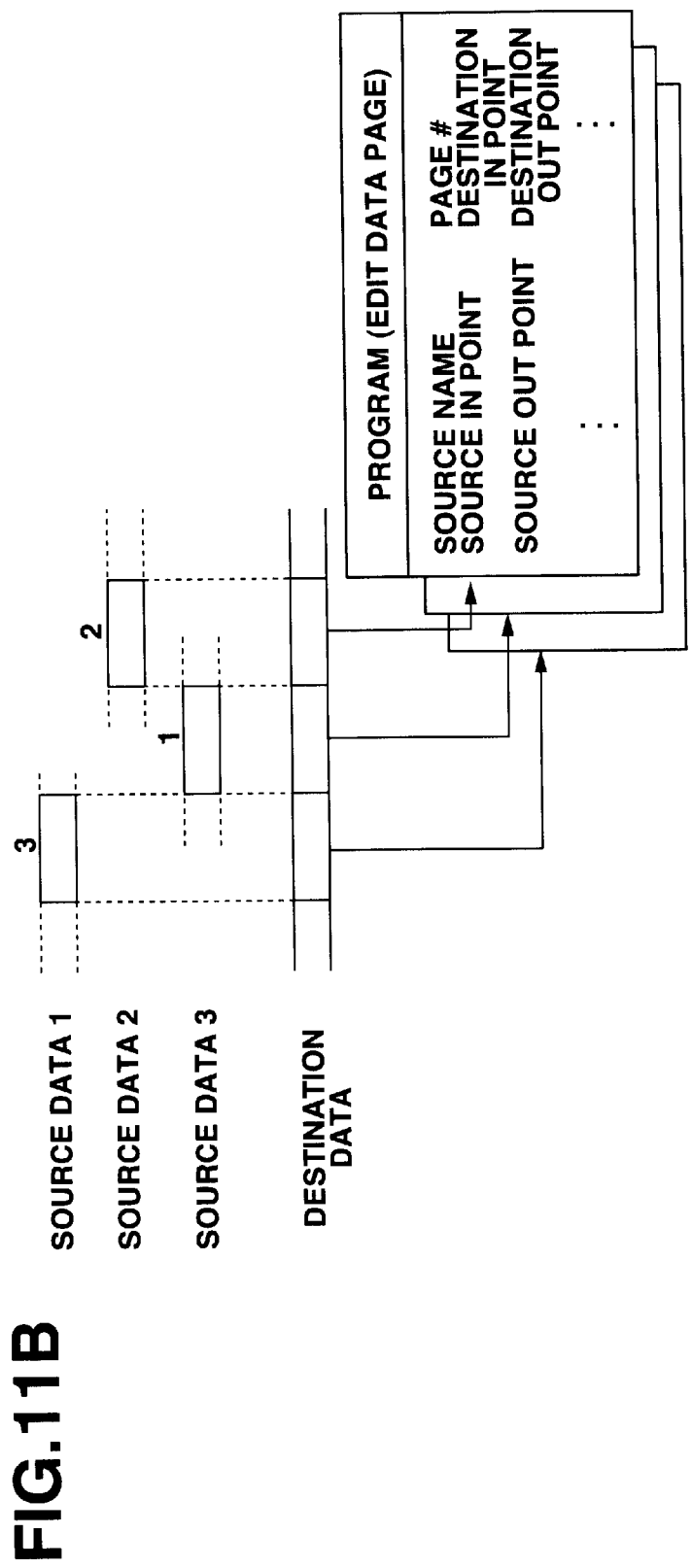
FIG. 11A
FIG. 11B

| PAGE# | DATA NAME | DATA LENGTH | EXAMPLE |
|---|---|---|---|
| 1 | RECORDER DEVICE NAME | 1 BYTE | P3 |
| | RECORDER FILE MANE | 23BYTES | FILE 2 |
| | RECORDER IN POINT | 4BYTES | 00:01:00:00 |
| | RECORDER OUT POINT | 4BYTES | 00:01:10:00 |
| | PLAYER DEVICE NAME | 1BYTE | P2 |
| | PLAYER FILE MANE | 23BYTES | FILE 1 |
| | PLAYER IN POINT | 4BYTES | 00:02:00:00 |
| | PLAYER OUT POINT | 4BYTES | 00:02:10:00 |

FIG.14

| ITEM | DATA NAME | DATA LENGTH | EXAMPLE |
|---|---|---|---|
| CURRENT PAGE # | PageNum | 1BYTE | 1 |
| RECORDER AND PLAYER SELECTED | NowPR | 1BYTE | 0(RECORDER) |
| PORT SELECTED | NowPort | 1BYTE | 2(P1) |
| CURRENT TIME CODE | TimeCode | 4BYTES | 00:03:05:00 |
| FILE NAME ASSIGNED TO CURRENT PORT | FileName | 23BYTE | FILE 1 |

FIG.15

| PAGE # | DATA NAME | EXAMPLE |
|---|---|---|
| 1 | RECORDER DEVICE NAME | P2 |
| | RECORDER FILE NAME | FILE 2 |
| | RECORDER IN POINT | 00:01:00:00 |
| | RECORDER OUT POINT | 00:01:10:00 |
| | PLAYER DEVICE NAME | P1 |
| | PLAYER FILE NAME | FILE 1 |
| | PLAYER IN POINT | 00:02:00:00 |
| | PLAYER OUT POINT | 00:02:10:00 |
| 2 | RECORDER DEVICE NAME | P2 |
| | RECORDER FILE NAME | FILE 2 |
| | RECORDER IN POINT | 00:01:10:00 |
| | RECORDER OUT POINT | 00:01:20:00 |
| | PLAYER DEVICE NAME | P1 |
| | PLAYER FILE NAME | FILE 1 |
| | PLAYER IN POINT | 00:03:00:00 |
| | PLAYER OUT POINT | 00:03:10:00 |
| 3 | RECORDER DEVICE NAME | P2 |
| | RECORDER FILE NAME | FILE 2 |
| | RECORDER IN POINT | 00:01:20:00 |
| | RECORDER OUT POINT | 00:01:30:00 |
| | PLAYER DEVICE NAME | P1 |
| | PLAYER FILE NAME | FILE 1 |
| | PLAYER IN POINT | 00:04:00:00 |
| | PLAYER OUT POINT | 00:04:10:00 |
| 4 | RECORDER DEVICE NAME | P2 |
| | RECORDER FILE NAME | FILE 2 |
| | RECORDER IN POINT | 00:01:30:00 |
| | RECORDER OUT POINT | 00:01:40:00 |
| | PLAYER DEVICE NAME | P1 |
| | PLAYER FILE NAME | FILE 1 |
| | PLAYER IN POINT | 00:05:00:00 |
| | PLAYER OUT POINT | 00:05:10:00 |
| END | RECORDER FILE NAME | END CODE |
| | | |
| | | |
| | | |
| | | |

FIG.16

| PAGE # | DATA NAME | EXAMPLE |
|---|---|---|
| 1 | RECORDER DEVICE NAME | P2 |
| | RECORDER FILE NAME | FILE 2 |
| | RECORDER IN POINT | 00:01:00:00 |
| | RECORDER OUT POINT | 00:01:10:00 |
| | PLAYER DEVICE NAME | P1 |
| | PLAYER FILE NAME | FILE 1 |
| | PLAYER IN POINT | 00:02:00:00 |
| | PLAYER OUT POINT | 00:02:10:00 |
| 2 | RECORDER DEVICE NAME | P2 |
| | RECORDER FILE NAME | FILE 2 |
| | RECORDER IN POINT | 00:01:20:00 |
| | RECORDER OUT POINT | 00:01:30:00 |
| | PLAYER DEVICE NAME | P1 |
| | PLAYER FILE NAME | FILE 1 |
| | PLAYER IN POINT | 00:04:00:00 |
| | PLAYER OUT POINT | 00:04:10:00 |
| 3 | RECORDER DEVICE NAME | P2 |
| | RECORDER FILE NAME | FILE 2 |
| | RECORDER IN POINT | 00:01:30:00 |
| | RECORDER OUT POINT | 00:01:40:00 |
| | PLAYER DEVICE NAME | P1 |
| | PLAYER FILE NAME | FILE 1 |
| | PLAYER IN POINT | 00:05:00:00 |
| | PLAYER OUT POINT | 00:05:10:00 |
| 4 | RECORDER DEVICE NAME | P2 |
| | RECORDER FILE NAME | FILE 2 |
| | RECORDER IN POINT | 00:01:10:00 |
| | RECORDER OUT POINT | 00:01:20:00 |
| | PLAYER DEVICE NAME | P1 |
| | PLAYER FILE NAME | FILE 1 |
| | PLAYER IN POINT | 00:03:00:00 |
| | PLAYER OUT POINT | 00:03:10:00 |
| END | RECORDER FILE NAME | END CODE |
| | | |
| | | |
| | | |
| | | |
| | | |

FIG.17

| PAGE # | DATA NAME | EXAMPLE |
|---|---|---|
| 1 | RECORDER DEVICE NAME | P2 |
| | RECORDER FILE NAME | FILE 2 |
| | RECORDER IN POINT | 00:01:00:00 |
| | RECORDER OUT POINT | 00:01:10:00 |
| | PLAYER DEVICE NAME | P1 |
| | PLAYER FILE NAME | FILE 1 |
| | PLAYER IN POINT | 00:02:00:00 |
| | PLAYER OUT POINT | 00:02:10:00 |
| 2 | RECORDER DEVICE NAME | P2 |
| | RECORDER FILE NAME | FILE 2 |
| | RECORDER IN POINT | 00:01:10:00 |
| | RECORDER OUT POINT | 00:01:20:00 |
| | PLAYER DEVICE NAME | P1 |
| | PLAYER FILE NAME | FILE 1 |
| | PLAYER IN POINT | 00:03:00:00 |
| | PLAYER OUT POINT | 00:03:10:00 |
| 3 | RECORDER DEVICE NAME | P2 |
| | RECORDER FILE NAME | FILE 2 |
| | RECORDER IN POINT | 00:01:20:00 |
| | RECORDER OUT POINT | 00:01:30:00 |
| | PLAYER DEVICE NAME | P1 |
| | PLAYER FILE NAME | FILE 1 |
| | PLAYER IN POINT | 00:04:00:00 |
| | PLAYER OUT POINT | 00:04:10:00 |
| 4 | RECORDER DEVICE NAME | P2 |
| | RECORDER FILE NAME | FILE 2 |
| | RECORDER IN POINT | 00:01:30:00 |
| | RECORDER OUT POINT | 00:01:40:00 |
| | PLAYER DEVICE NAME | P1 |
| | PLAYER FILE NAME | FILE 1 |
| | PLAYER IN POINT | 00:05:00:00 |
| | PLAYER OUT POINT | 00:05:10:00 |
| END | RECORDER FILE NAME | END CODE |
| | | |
| | | |
| | | |
| | | |

FIG.19

| PAGE# | DATA NAME | DATA LENGTH | EXAMPLE |
|---|---|---|---|
| 1 | RECORDER DEVICE NAME | 1 BYTE | P2 |
| | RECORDER FILE MANE | 23BYTES | FILE 2 |
| | RECORDER IN POINT | 4BYTES | 00:01:00:00 |
| | RECORDER OUT POINT | 4BYTES | 00:01:10:00 |
| | PLAYER DEVICE NAME | 1BYTE | EXT1 |
| | PLAYER FILE NAME | 23BYTES | |
| | PLAYER IN POINT | 4BYTES | 00:02:00:00 |
| | PLAYER OUT POINT | 4BYTES | 00:02:10:00 |
| END | RECORDER FILE NAME | 23BYTES | END CODE |
| | | | |
| | | | |
| | | | |
| | | | |

| PAGE# | DATA NAME | DATA LENGTH | EXAMPLE |
|---|---|---|---|
| 1 | RECORDER DEVICE NAME | 1 BYTE | P2 |
| | RECORDER FILE NAME | 23BYTES | FILE 2 |
| | RECORDER IN POINT | 4BYTES | 00:01:00:00 |
| | RECORDER OUT POINT | 4BYTES | 00:01:10:00 |
| | PLAYER DEVICE NAME | 1BYTE | P1 |
| | PLAYER FILE MANE | 23BYTES | FILE X |
| | PLAYER IN POINT | 4BYTES | 00:02:00:00 |
| | PLAYER OUT POINT | 4BYTES | 00:02:10:00 |
| END | RECORDER FILE NAME | 23BYTES | END CODE |
| | | | |
| | | | |
| | | | |
| | | | |
| | | | |

FIG.32

DATA RECORDING/PLAYBACK APPARATUS, DATA EDITING APPARATUS AND DATA RECORDING METHOD

This is a continuation of copending International Application PCT/JP00/02495 having an international filing date of Apr. 17, 2000.

TECHNICAL FIELD

The present invention relates to a data recording/playback apparatus for recording and/or playing back data to and/or from a recording medium, data editing apparatus for editing material data, and a data recording method for recording material data.

BACKGROUND ART

Recently, the so-called CATV (cable television or community antenna television) has prevailed widely. With this prevalence of the CATV systems, information service has been made via multi-channel systems, and it has been demanded that a plurality of video data and/or audio data (will be referred to as "video/audio data" hereafter) can simultaneously be recorded into, and/or played back from, a single video and audio data recording/playback apparatus which records and/or play back video/audio data and the video/audio data can be played back while being recorded, which would not be experienced with the conventional VTR (video tape recorder). To meet such demands, there has been proposed an apparatus called "video server (or A/V (=audio and/or video) server)" which uses a random-accessible recording medium such as a hard disc (will be referred to as "HD" hereafter) and can record/play back video/audio data to/from the HD. The video server is prevailing.

Generally, to meet the quality requirements for video/audio data which is to be recorded and/or played back to and/or from the recording medium, the video server used in the broadcasting stations should be able to transfer required data at a high rate and the recording medium should have a large capacity for recording data for a long time.

To this end, it has been tried to use a data recording/playback apparatus incorporating a plurality of HDs which can store video/audio data and process them in parallel for attaining a high data transfer rate and large recording capacity, and also it has been tried to record parity data in the HDs for maintaining the operational reliability even when any of the HDs becomes faulty.

With the above trials, it has become possible to realize a multi-channel video server which is usable in a variety of applications to form a so-called VOD (video on demand) or NVOD (near video on demand) system by discretely recoding material data including a plurality of video/audio data, transmitting the material data over many channels, and playing back the same material data at one time over one of many channels and at other time over the other channel, for example, even if the number of channels varies depending upon the content of a program which a broadcasting station is going to broadcast as well as upon the mode of the broadcasting.

The data recording/playback apparatus used in such a video server adopts the RAID (redundant arrays of inexpensive discs) system formed from a hard disc drive (will be referred to as "HDD" hereafter) incorporating a plurality of hard discs (HD), as proposed in the David A. Patterson et al's article "A Case for Redundant Arrays of Inexpensive Disks (RAID)", ACM SIGMOND Conference, Chicago, Ill., Jun. 1–3, 1988.

The RAID system disclosed in this article consists of five RAIDs from RAID-1 to RAID-5. The RAID-1 is a so-called "mirrored disc" system to write the same content to two HDDs. The RAID-2 and -3 are to divide input data into data blocks of a predetermined length and write them to a plurality of HDDs. The RAID-2 uses the Hamming code as an error correction code, while the RAID-3 is to produce parity data being exclusive-OR of data blocks of each HDD, corresponding to each other and write it to another HDD. Further the RAID-4 and -5 are to divide input data into large blocks and write one data block to one HDD while writing parity data resulted from exclusive-OR of data blocks corresponding to HDDs, respectively, as a parity block to the HDD. The RAID-4 is to write parity block to the same HDD while the RAID-5 is to discretely write the parity data to a plurality of HDDs.

As a typical one of the video servers using the above data recording/playback apparatus, there has been proposed a video server having a plurality of input/output units provided therein and adapted to record and/or play back video/audio data to and/or from HDs for example via the input/output units. In such a video server, the plurality of input/output units is adapted to work during times slots assigned to them for permission of the right of using a bus, process external input data, transmit the data to a non-linearly accessible recording medium such as HD, and process data read from the recording medium for delivery to outside. Thus, if observed for a long time, the plurality of input/output units in the video server seems to work as if they processed data simultaneously, or in parallel, with each other.

For the user to instinctively edit data, the GUI (graphical user interface) using a time line is adopted in such a video server. That is, using a control panel provided on the video server, the user effects necessary operations for data edition. The control panel has a display screen on which a variety of information required for data edition such as material data including video/audio data to be edited, is displayed, and the user edits the material data based on the GUI shown on the display screen.

The Applicant of the present invention applied the invention related to the edition-use GUI displayed on the video server on Nov. 10, 1998 (Japanese Patent Application No. 10-319634). Also, the Applicant of the present invention applied an invention related to the video server provided with a variety of control switches on Nov. 10, 1998 (Japanese Patent Application No. 10-319037).

It should be noted here that in the conventional so-called linear edition apparatus, edition point information such as time points indicating IN and OUT points of material data, and time points indicating IN and OUT points of data to be produced, is digitally represented, and that the user edits data for each cut based on a UI (user interface) on which the character information is displayed.

In the edition using the GUI in the above-mentioned video server, however, mainly a graphic is displayed on the display screen of the control panel and the random access to material data is used to graphically display the material data itself, so that using the material data itself displayed on the display screen, the user edits the data.

Thus, the edition by the GUI, as a help to the user's instinctive data edition, is rather inconvenient to a user well familiar with the conventional linear edition apparatus because the edition cannot be done rapidly and the ordinary users cannot easily be familiar with the operation of the video server using the GUI.

Also, in case data is off-line edited using an inexpensive linear edition apparatus which can only output images of low resolution to produce a so-called EDL (edition decision list) and the data is on-line edited later using an expensive edition apparatus, the EDL thus produced is not positively used in the data edition.

Further, in the conventional video server, for example, in case an external device such as VTR is connected to the video server and video/audio data recorded in the external device is used as material data to be edited, a time is taken for acquisition of the material data. Also, for acquisition of material data from the external device into the conventional video server, a time is required for pre-roll and phase modification.

Therefore, for fine adjustment of the edition points such as IN and OUT points, for example, the data edition has to be done spending a long time. Data edition by the video server requiring the above-mentioned data edition is less efficient and convenient to the user.

DISCLOSURE OF THE INVENTION

The present invention has an object to overcome the above-mentioned drawbacks of the prior art by providing a data recording/playback apparatus and data editing apparatus, with which, making the most of the capability of non-linear edition of the conventional video server, the user can conveniently edit data with the similar operability to that of the conventional linear editing apparatus.

Also, the present invention has another object to provide a data recording/playback apparatus, data editing apparatus and a data recording method, which make more efficient the data edition with the conventional video server.

The above object can be attained by providing a data recording/playback apparatus including according to the present invention means for writing data including video data and/or audio data to a non-linearly accessible recording medium and reading data recorded in the recording medium, a plurality of input/output means for receiving data supplied from outside and accessing the data writing/reading means for an assigned time slot to output data to the data writing/reading means, and receiving read data supplied from the data writing/reading means for an assigned time slot and delivering the data to outside and a controlling means for producing, for a data edition by inserting source data into destination data, both included in the data recorded in the recording medium, page data having source data insertion start and end points and a start point of the data insertion into the destination data for each of edition units.

In the above data recording/playback apparatus according to the present invention, when data is edited by inserting the source data into the destination data, the page data having source data insertion start and end points and a start point of the data insertion into the destination data is produced for each of edition units and the data is edited based on the page data thus produced.

Also the above object can be attained by providing a data editing apparatus having means for reading data including video data and/or audio data recorded in a tape-like recording medium, and means for editing the data read by the reading means, the editing means including according to the present invention means for writing data including video data and/or audio data to a non-linearly accessible recording medium and reading data recorded in the non-linearly accessible recording medium, a plurality of input/output means for receiving read data supplied from the data writing/reading means and accessing the data writing/reading means for an assigned time slot to output data to the data writing/reading means, and receiving played-back data supplied from the data writing/reading means for an assigned time slot and delivering the data to outside and a controlling means for producing, for a data edition by inserting source data into destination data, both included in the data recorded in the non-linearly accessible recording medium, page data having start and end points of the source data insertion and a start point of the data insertion into the destination data for each of edition units.

In the above data editing apparatus according to the present invention, when data is edited by inserting the source data into the destination data, the editing means produces the page data having source data insertion start and end points and a start point of the data insertion into the destination data for each of edition units, and edits the data based on the page data thus produced.

Also the above object can be attained by providing a data recording/playback apparatus including according to the present invention means for writing data including video data and/or audio data to a non-linearly accessible recording medium and reading data recorded in the recording medium, a plurality of input/output means for receiving data supplied from outside and accessing the data writing/reading means for an assigned time slot to output data to the data writing/reading means, and receiving played-back data supplied from the data writing/reading means for an assigned time slot and delivering the data to outside and a controlling means for producing, for a data edition by inserting source data into destination data, both included in the data recorded in the recording medium, page data having start and end points of the source data insertion and a start point of the data insertion into the destination data for each of edition units, and assigning, when a plurality of page data is produced, page numbers to them in the order of source data output time points for discrimination from other page data and then writing the page numbers in the page data.

In the above data recording/playback apparatus according to the present invention, when data is edited by inserting the source data into the destination data, the page data having source data insertion start and end points and a start point of the data insertion into the destination data is produced for each of edition units and the data is edited based on the page data thus produced. If a plurality of page data is produced, page numbers are assigned to them in the order of source data output time points for discrimination from other page data and written into the page data.

Also the above object can be attained by providing a data editing apparatus having means for reading data including video data and/or audio data recorded in a tape-like recording medium, and means for editing the data read by the reading means, the editing means including according to the present invention means for writing data including video data and/or audio data to a non-linearly accessible recording medium and reading data recorded in the non-linearly accessible recording medium, a plurality of input/output means for receiving read data supplied from the data reading means and accessing the data writing/reading means for an assigned time slot to output data to the data writing/reading means, and receiving read data supplied from the data writing/reading means for an assigned time slot and delivering the data to outside and a controlling means for producing, for a data edition by inserting source data into destination data, both included in the data recorded in the recording medium, page data having start and end points of the source data insertion and a start point of the data insertion into the destination data for each of edition units and assigning, when a plurality of page data is produced, page numbers to them in the order of source data output time points for discrimination from other page data and then writing the page numbers in the page data.

In the above data editing apparatus according to the present invention, when data is edited by inserting source data into destination data, the editing means produces page data having start and end points of the source data insertion and a start point of the data insertion into the destination data for each of edition units. When a plurality of page data is produced, the editing means assigns page numbers to the plurality of page data in the order of source data output time points for discrimination from other page data, and then writes the page numbers in the page data.

Also the above object can be attained by providing a data recording/playback apparatus having a non-linearly accessible recording medium, and a plurality of input/output units for receiving and/or providing data from and/or to the recording medium, each of the input/output units processing input data and writing it to the recording medium and processing data read from the recording medium and delivering it to outside, both within a pre-assigned time slot, the apparatus further including according to the present invention an input controlling means for designating an edition point for material data recorded in the non-linearly accessible recording medium and/or material data recorded in a linear recording medium provided in an external device and means for controlling the non-linearly accessible recording medium and/or linear recording medium according to the edition point designation by the input controlling means, the controlling means writing, when the edition point is designated by the input controlling means, to the non-linearly accessible recording medium, data including edition units based on the edition point, recorded in the linear recording medium, and accessing, when access is made again to near the edition unit recorded in the linear recording medium, data including the edition unit recorded in the non-linearly accessible recording medium.

In the above data recording/playback apparatus according to the present invention, data including edition units based on the edition point, recorded in the linear recording medium, is written to the non-linearly accessible recording medium. When access is made again to near the edition unit recorded in the linear recording medium, access is made to data including the edition unit recorded in the non-linearly accessible recording medium without operation of the external device.

Also the above object can be attained by providing a data editing apparatus for editing and controlling material data for each of edition units, including according to the present invention, a non-linearly accessible recording medium, an input controlling means for designating an edition point for material data recorded in the non-linearly accessible recording medium and/or material data recorded in a linear recording medium provided in an external device; and means for controlling the non-linearly accessible recording medium and/or linear recording medium according to the edition point designation by the input controlling means, the controlling means writing, when the edition point is designated by the input controlling means, to the non-linearly accessible recording medium, data including edition units based on the edition point, recorded in the linear recording medium, and accessing, when access is made again to near the edition unit recorded in the linear recording medium, data including the edition unit recorded in the non-linearly accessible recording medium.

In the above data editing apparatus according to the present invention, data including edition units based on the edition point, recorded in the linear recording medium, is written to the non-linearly accessible recording medium. When access is made again to near the edition unit recorded in the linear recording medium, access is made to data including the edition unit recorded in the non-linearly accessible recording medium without operation of the external device.

Also the above object can be attained by providing a data recording method including, according to the present invention, steps of writing, when designating an edition point for material data recorded in the non-linearly accessible recording medium and/or material data recorded in a linear recording medium provided in an external device, to the non-linearly accessible recording medium data including edition units based on the edition point, recorded in the linear recording medium and accessing, when accessing again near the edition unit recorded in the linear recording medium, data including the edition unit recorded in the non-linearly accessible recording medium.

In the above data recording method according to the present invention, data including edition units based on the edition point, recorded in the linear recording medium, is written to the non-linearly accessible recording medium. When access is made again to near the edition unit recorded in the linear recording medium, access is made to data including the edition unit recorded in the non-linearly accessible recording medium without operation of the external device.

BRIEF DESCRIPTION OF THE DRAWINGS

FIG. 5 shows a specific example of information stated in the file entry (FE) and record entry (RE) of the file management information.

FIG. 6 shows a specific example of information stated in the free spaces list (FSL) of the file management information.

FIG. 7 shows the configuration of a virtual file (VFL) used in the A/V server in FIG. 1.

FIG. 11A shows edit data page produced by the A/V server in FIG. 1.

FIG. 11B shows a program produced by the A/V server in FIG. 1.

FIG. 14 shows an example of data structure of the edit data page produced in the A/V server in FIG. 1.

FIG. 15 shows an example of internal status information produced in the A/V server in FIG. 1.

FIG. 16 shows an example of final page data produced in the A/V server in FIG. 1.

FIG. 17 shows an example of page data produced in the A/V server in FIG. 1, explaining page data including pages 1 to 3 previously produced and a page 4 additionally produced after the pages 1 to 3.

FIG. 19 shows an example of page data produced in the A/V server in FIG. 1, explaining page data produced by renumbering pages in the temporal order of the edition points of recorder in the page data shown in FIG. 17.

FIG. 32 shows an example of page data produced in the A/V server in FIG. 1, explaining the page data changed after the first preview is over.

BEST MODE FOR CARRYING OUT THE INVENTION

The best mode for carrying out the present invention will further be described herebelow with reference to the accompanying drawings;

In the best mode, the data recording/playback apparatus according to the present invention is applied to a so-called audio/video server (will be referred to as "A/V" server hereafter) which writes and /or reads to and/or from a recording medium data including video data and/or audio data (will be referred to as "video/audio data" hereafter). The A/V server has a control panel which will further be described later). Using the control panel, the user can operate the A/V server to write or read video/audio data to or from the recording medium, and edit the data.

Figure 1:
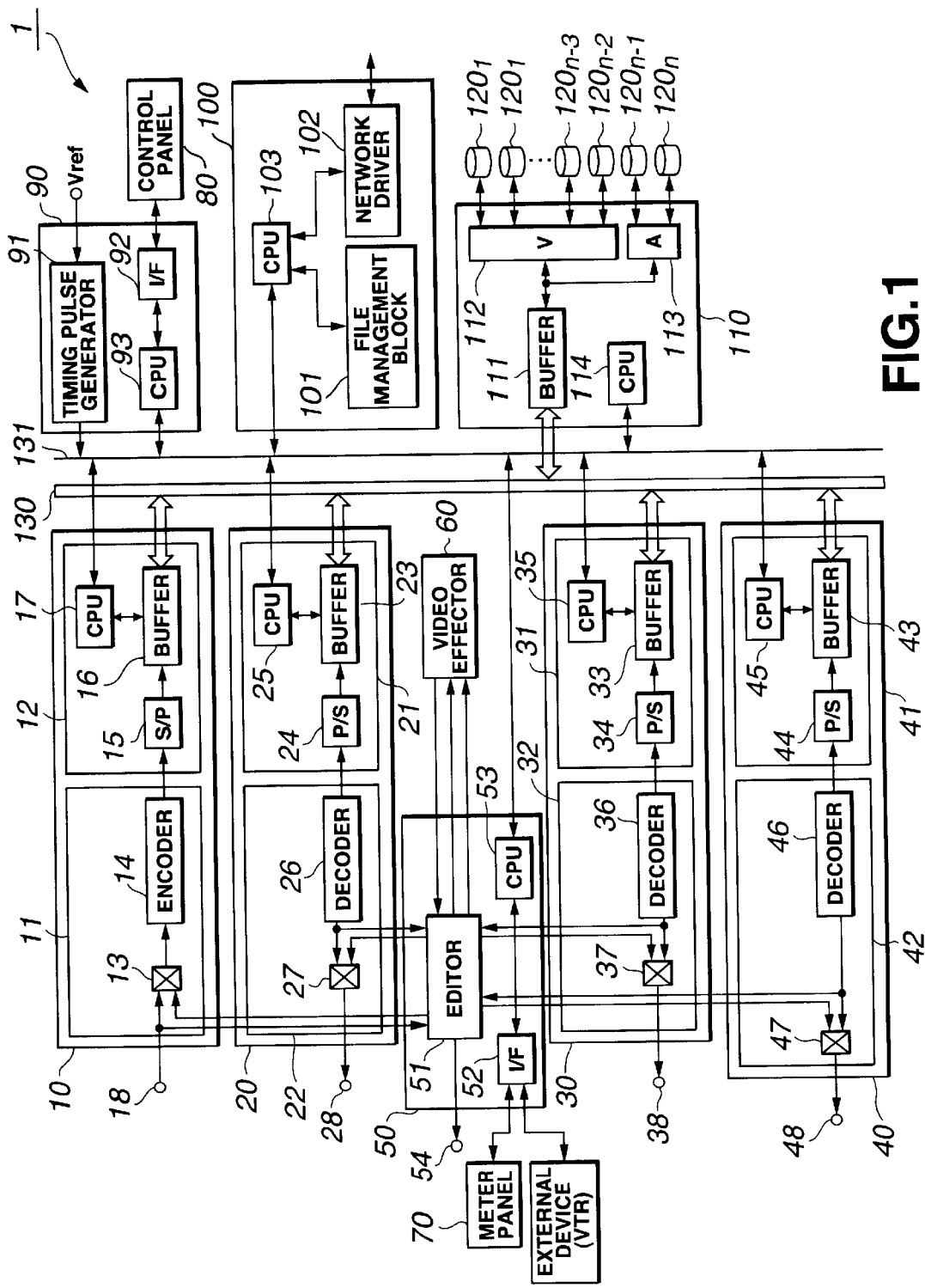
FIG. 1 is a block diagram of the A/V server embodied according to the present invention, showing the internal construction of the A/V server.

FIG. 1 shows the internal circuit of the A/V server generally indicated with a reference 1. As shown, the A/V server 1 includes a recording port 10 being an input unit of the A/V server 1, playback ports 20, 30 and 40 being output units of the A/V server 1, editing manager 50, video effector 60, meter panel 70, control panel 80, timing manager 90, file manager 100, and an HDD array 110 including a plurality of HDDs (hard disc drive) $120_1$, $120_2$, ..., $120_{n-3}$, $120_{n-2}$, $120_{n-1}$ and $120_n$. (n is an arbitrary integer). Also the A/V server 1 includes a data bus 130 for transfer of data between each of the recording port 10, playback ports 20, 30 and 40 and the HDD array 110, and a control bus 131 for transfer of control signals for controlling each of the components of the A/V server 1. With the one input and three outputs, the A/V server 1 can make input and output operations via four I/O systems.

The recording port 10 is an input unit to receive a signal supplied via an input terminal 18 and record it to the HDD array 110. The recording port 10 includes a data input/output unit 11 and data manager 12. The data input/output unit 11 includes a selector 13 and an encoder 14. The data manager 12 includes a serial/parallel converter (will be referred to as "S/P converter" hereafter) 15, buffer 16, and a CPU 17.

The selector 13 is provided to select data for encoding. More specifically, the selector 13 selects either data including data conforming to SDI (serial digital interface) provided in SMPTE (Society of Motion Picture and Television Engineers)-259M and video/audio data supplied via the input terminal 18 such as data conforming to SDTI (serial digital transfer interface) provided in SMPTE-305M, or data output from an editor 51 provided in the editing manager 50 and which will further be described later, and outputs the selected data to an encoder 14 provided downstream of the selector 13.

The encoder 14 is provided to encode a signal output from the selector 13. More particularly, the encoder 14 compresses an input signal by the MPEG (Moving Picture Experts Group) method. The encoder 14 may not be adapted to compress the signal but may be adapted to convert the signal to a format in which the signal can easily be written to the HDDs $120_1$, $120_2$, ..., $120_{n-3}$, $120_{n-2}$, $120_{n-1}$ and $120_n$ which will further be described later. For example, the encoder 14 may extract video and audio signals from the data conforming to the SDI. Further, the encoder 14 may be adapted to extract video and audio signals from the data conforming to the SDTI and also may be adapted to effect a combination of the above operations. Note that in the following description, the encoder 14 will compress and output an input signal. The compressed data from the encoder 14 is supplied to the S/P 15 in the data manager 12.

The S/P (serial/parallel converter) 15 in the data manager block 12 is provided to convert compressed data supplied from the encoder 14 from serial to parallel so as to be writable to each of the HDDs $120_1$, $120_2$, ..., $120_{n-3}$, $120_{n-2}$, $120_{n-1}$ and $120_n$. Each of the data having been converted from serial to parallel by the S/P 15 is supplied at any time to a buffer 16 provided downstream of the S/P 15.

The buffer 16 is provided to provisionally store (buffer) each data output from the S/P 15 and deliver them to the data bus 130 in the time sharing manner for example. The buffer 16 is constructed to separately hold each data output from the S/P 15, which is not shown. The buffer 16 is supplied with each data from the S/P 15 at any time, and when a time slot from a time slot generator (not shown) is assigned to the CPU 17, the buffer 16 will deliver the data buffered therein to the data bus 130.

The data bus 130 is a one called "SBX (spider bus extension)" and it consists of an upward bus to transmit data only in a direction of data recording and a downward bus to transmit data only in a direction of data playback, each of which includes a plurality of buses to separately transmit each serial/parallel-converted data output from the S/P 15. This construction of the data bus 130 is not shown. Each data output from the buffer 16 is transmitted to the HDD array 110 via a one of the buses forming the data bus 130, corresponding to the data. Also there is provided downstream of the buffer 16 a data output unit (not shown) where a command or the like for write to, for example, the HDDs $120_1$, $120_2$, ..., $120_{n-3}$, $120_{n-2}$, $120_{n-1}$ and $120_n$ is superposed on each data output from the buffer 16 so as to conform to a data transmission format of the data bus 130.

The CPU 17 controls each of blocks of the recording port 10 based on a control signal such as external command or the like transmitted via the control bus 131 from the control panel 80 which will further be described later. Also, the CPU 17 transfers the thus supplied control signal to a CPU 53 provided in the editing manager 50 as necessary. Further, the CPU 17 controls output of the data held in the buffer 16 based on a time slot assigned by the time slot generator.

The recording port 10 constructed as in the above is capable of inputting video data and 4- or 8-channel audio data to the A/V server 1.

The playback port 20 functions as an output unit to output data recorded in the HDD array 110 to outside. It consists of a data manager 21 and data input/output unit 22. The data manager 21 includes a buffer 23, parallel-serial converter (will be referred to as "P/S" hereafter) 24 and a CPU 25. The data input/output unit 22 includes a decoder 26 and a selector 27.

The buffer 23 buffers each of data transmitted in parallel from the HDD array 110 via the data bus 130. The buffer 23 is con constructed as to separately hold each of data supplied in parallel from the HDD array 110. This buffer construction is not shown. When a time slot from the time slot generator is assigned to the CPU 25, the buffer 23 reads and stores data from the HDD array 110 under the control of the CPU 25.

Each of the data transmitted from the HDD array 110 has superposed thereon a status corresponding to a command for write to, for example, the HDDs $120_1$, $120_2$, $120_{n-3}$, $120_{n-2}$, $120_{n-1}$ and $120_n$ so as to conform to the data transmission format of the data bus 130. Such data is divided for transmission over the plurality of buses forming together the downward bus of the data bus. Thus, in the A/V server 1, there are less causes of such an error that data from the input system conflicts with that from the output systems. Therefore, date can be recorded and played back at the same time by transmitting data according to assigned time slots. Data supplied to the buffer 23 is buffered in the buffer 23 and then supplied to the P/S 24 provided downstream of the buffer 23.

The P/S 24 converts parallel data supplied from the buffer 23 to serial data. The data thus converted from parallel to serial by the P/S 24 is supplied to a decoder 26 provided in the data input/output unit 22.

The CPU 25 controls each of the blocks of the playback port 20 according to a control signal such as external command transmitted via the control bus 131. Also the CPU 25 transfers a supplied control signal to the CPU 53 provided in the editing manager 50 as necessary. Further, the CPU 25 acquires the right of using the data bus 130 based on a time slot assigned by the time slot generator to input data to the buffer 23.

The decoder 26 provided in the data input/output unit 22 decodes a serial data supplied from the P/S 24 in a predetermined manner. When the data read from the HDD $120_1$, $120_2$, ..., $120_{n-3}$, $120_{n-2}$, $120_{n-1}$ and $120_n$ is a compressed one, the decoder 26 expands the data and converts it to an aforementioned SDI or the like for outputting. Various data including video/audio data resulted from the decoding in the decoder 26 are supplied to the selector 27 and the editor 51 provided in the editing manager 50.

The selector 27 is provided to select a signal which is to be delivered to outside via an output terminal 28. More specifically, the selector 27 selects either of data output from the decoder 26 and data output from the editor 51 of the editing manager 50, and supplies it as an SDI data or SDTI data the output terminal 28.

The playback port 20 constructed as in the above is capable of outputting video data and 4- or 8-channel audio data.

The playback ports 30 and 40 are constructed similarly to the playback port 20. That is, the playback port 30 is composed of a data manager 31 and data input/output unit 32. The data manager 31 includes a buffer 33 to buffer data from the HDD array 110, P/S 34 to convert parallel data from the buffer 33 to serial data, and a CPU 35 to control each of the blocks of the playback port 30. The data input/output unit 32 includes a decoder to decode serial data supplied from the P/S 34, and a selector 37 to select either of data output from the decoder 36 and data output from the editor 51 for delivery to an output terminal 38. On the other hand, the playback port 40 is composed of a data manager 41 and data input/output unit 42. The data manager 41 includes a buffer 43 to buffer data from the HDD array 110, P/S 44 to convert parallel from the buffer 43 to serial data, and a CPU 45 to control each of the blocks of the playback port 40. The data input/output unit 42 includes a decoder 46 to decode serial data output from the P/S 44, and a selector 47 to select either of data output from the decoder 46 and data output from the editor 51 for delivery to an output terminal 48.

The editing manager 50 includes the editor 51, interface (I/F) 52 and CPU 53, and delivers data supplied from the recording port 10 and playback ports 20, 30 and 40 via the editor 51 to a video effector 60 which will further be described later The video effector 60 will edit the received data. The editing manager 50 delivers data from the video effector 60 to the selector 13 of the recording port 10 and selectors 27, 37 and 47 of the playback ports 20, 30 and 40, respectively.

Using an internal selector, etc. (not shown) appropriately, the editor 51 selects a desired one of data input to the recording port 10 and data passed through the decoders 26, 36 and 46 provided in the playback ports 20, 30 and 40, respectively, and outputs it to the video effector 60. Also, using the internal selector, etc. (not shown) appropriately, the editor 51 selects data supplied from the video effector 60 and outputs it to a desired port. Further, when it is desired to deliver to an external monitor or the like data input to the recording port 10, data passed through the decoders 26, 36 and 46 provided in the playback ports 20, 30 and 40, respectively, and data supplied from the video effector 60, the editor 51 supplies these data to an output terminal 54.

The I/F 52 has connected thereto the meter panel 70 which will further be described later, outputs a control signal or the like produced by the CPU 53 to control the meter panel 70, and supplies information sent from the meter panel 70 to the CPU 53. Also the I/F 52 has connected thereto an external VTR (video tape recorder) or the like, outputs data and various command, and is supplied with various external commands.

The CPU 53 is provided to control the editing manager 50, CPU 17 provided in the recording port 10 and CPUs 25, 35 and 45 provided in the playback ports 20, 30 and 40, respectively. In the video server 1, the CPU 53 controls the CPU of each of the ports while controlling the plurality of ports, to edit data.

Using the plurality of ports, the video effector 60 produces a special effect on object data. More particularly, the video effector 60 produces on video data input from the editing manager 50 a special effect such as picture-in-picture (PinP) that a picture is inserted in a different picture.

As will further be described later, the meter panel 70 has provided thereon port operation indicators to indicate the operation status of each of the recording port 10 and playback ports 20, 30 and 40, such as audio level meters, and various switches to select one of the ports which is to be operated. The meter panel 70 is controlled according to a control signal produced by the CPU 53 provided in the editing manager 50. Also, the meter panel 70 supplies the CPU 53 of the editing manager 50 with a control signal indicative of how each of the switches has been operated.

As will further be described later, the control panel 80 has provided therein various user-operated switches to select data to be edited and one of the ports through which data is inputted and outputted, and display screen or the like on which images used for edition are displayed. As operated by the user, the control panel 80 produces a corresponding control signal. More specifically, when the user operates the switches on the control panel 80 to select the recording port 10, playback port 20, 30, 40 or an external VTR, the control panel 80 will output a control signal to the selected port or VTR. The control signal is passed to the control bus 131 via the timing manager 90 which will further be described later, transmitted over the control bus and supplied to the CPU provided in each port. The port or VTR having received the control signal operates according to the control signal.

The timing manager 90 manages the data bus 130 as timed based on a video sync signal. More specifically, the timing manager 90 includes a timing pulse generator 91 to produce a timing pulse, interface (I/F) 92 interfacing the control panel 80, and CPU 93 to control each of the blocks of the timing manager 91. According to an external video sync signal input, the CPU 93 controls the timing pulse generator 91 to produce a timing pulse and send it to the control bus 131. The timing manager 90 manages the data bus 130 according to the timing pulse.

The file manager 100 includes a file management block 101 which holds file management information indicative of recording areas in files in the HDDs $120_1$, $120_2$, $120_{n-3}$, $120_{n-2}$, $120_{n-1}$ and $120_n$ which will further be described later and manages the files according to the management information, network driver 102 connected to an external network such as Ethernet or the like for transfer of data to and from the external network, and a CPU 103 to control each of the blocks of the file manager 100. Under the control of the CPU 103, the file manager 100 manages data recorded in the HDD array 110 which will further be described later. For example, when a file is recorded in the HDDs $120_1$, $120_2$, ..., $120_{n-3}$, $120_{n-2}$, $120_{n-1}$ and $120_n$ the file manager 100 manages data recorded in the HDD file 110 according to information indicative of addresses in the HDDs $120_1$, $120_2$, ..., $120_{n-3}$, $120_{n-2}$, $120_{n-1}$ and $120_n$ where the file is recorded.

The HDD array 110 stores and manages various data. The HDD array 110 is connected to the plurality of HDDs $120_1$, $120_2$, ..., $120_{n-3}$, $120_{n-2}$, $120_{n-1}$ and $120_n$. It stores data into these HDDs $120_1$, $120_2$, ..., $120_{n-3}$, $120_{n-2}$, $120_{n-1}$ and $120_n$ and manages the data recorded in the HDDs $120_1$, $120_2$, ..., $120_{n-3}$, $120_{n-2}$, $120_{n-1}$ and $120_n$. The HDD array 110 includes a buffer 111, video data write/read unit (V) 112, audio data write/read unit (A) 113 and CPU 114.

When transferring data to and from the data bus 130, the buffer 111 buffers the data. For example, data from the HDDs $120_1$, $120_2$, ..., $120_{n-3}$, $120_{n-2}$, $120_{n-1}$ and $120_n$ is buffered in this buffer 111 and then delivered to the data bus 130.

The video data write/read unit 112 writes and read video data to and from the HDDs $120_1$, $120_2$, ..., $120_{n-3}$ and $120_{n-2}$. More specifically, this video data write/read unit 112 selects any one of the HDDs $120_1$, $120_2$, ..., $120_{n-3}$ and $120_{n-2}$ and writes data supplied from the buffer 111 to that HDD, while reading audio data from a desired HDD and delivering it to the buffer 111.

The CPU 114 controls each of the blocks of the HDD array 110.

The HDD array 110 thus constructed positively records data which is to be recorded for use in broadcasting service for example, and has such a redundancy that data recorded therein can positively be played back. Namely, the HDD array 110 has a so-called RAID (redundance arrays of inexpensive discs) structure. The HDDs $120_1$, $120_2$, ..., $120_{n-3}$ and $120_{n-2}$ into which video data is recorded is designed to have a RAID-3 structure in which data is divided for a plurality of discs and thus transferred in parallel, which contributes to an improved transfer performance. Each of the HDDs $120_1$, $120_2$, ..., $120_{n-3}$ and $120_{n-2}$ incorporates a parity disc. Each of the HDDs $120_{n-1}$ and $120_n$ in which audio data is recorded is designed to have a RAID-1 structure called "mirror disc" in which data is doubly written.

Figure 2:
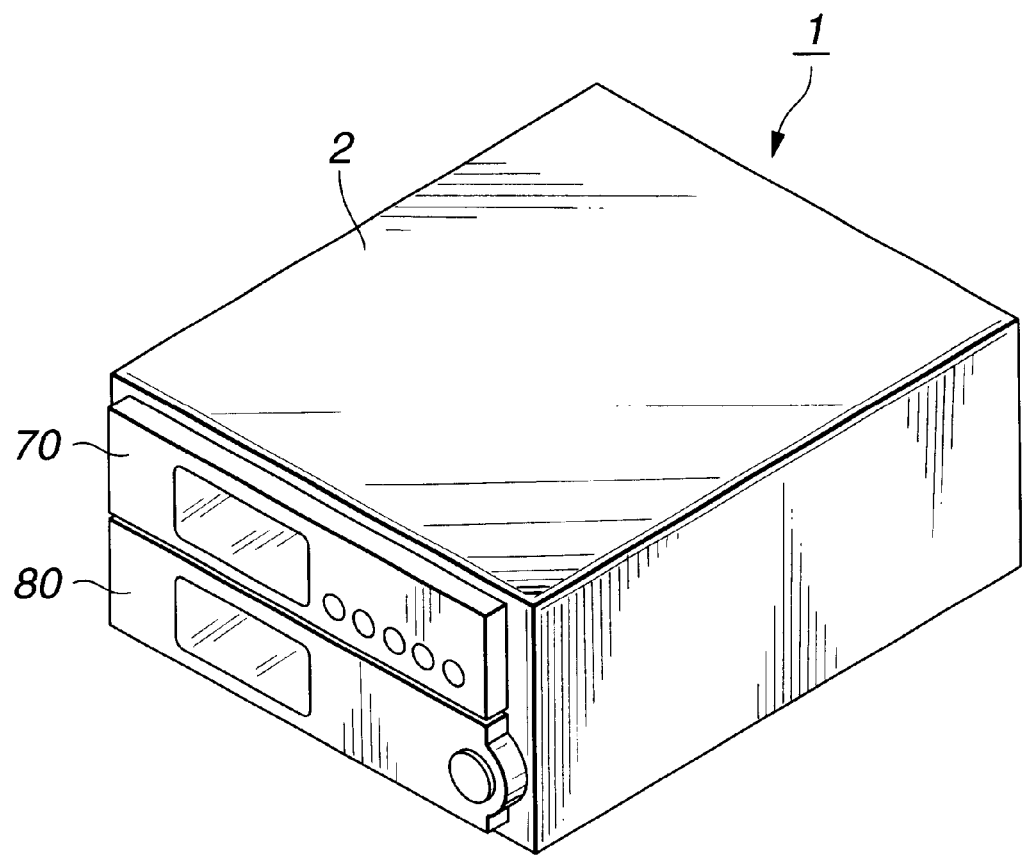
FIG. 2 is a perspective view of the A/V server in FIG. 1.

The A/V server 1 having the above-mentioned internal circuit includes a housing 2 encasing the aforementioned components. The housing 2 generally appears like a rectangular parallelopiped as shown in FIG. 2, and is as large as a VTR unit for example. The housing 2 has the meter panel 70 at the upper front thereof, and the control panel 80 at the lower front. The control panel 80 is removably attached to the housing 2. Even when detached from the housing 2, the control panel 80 is connected to an I/F 92 of the aforementioned timing manager 90 inside the housing 2, and thus still operable.

The A/V server 1 will record external input data as will be described below:

In the A/V server 1, data supplied to the input terminal 18 is passed to the encoder 14 via the selected 13 provided in the data input/output unit 11 of the recording port 10, and it is encoded to a predetermined format in the encoder 14. The encoded data is converted to parallel data by the S/P 15 provided in the data manager 12 of the recording port 10, and buffered into the buffer 16. The buffered data is outputted to the data bus 130 and transferred to the HDD array 110 for a time slot produced by the tile slot generator and assigned to the CPU 17.

The data transferred to the HDD array 110 is buffered into the buffer 111 and read out. Of the data read out from the buffer 111, video data is supplied to the video data write/read unit 112 while audio data is supplied to the audio data write/read unit 113. The video data write/read unit 112 divides the supplied video data in predetermined units and provides parity data, and record the divided data and parity data into the HDDs $120_1$, $120_2$, ..., $120_{n-3}$ and $120_{n-2}$. The audio data write/read unit 113 records the supplied audio data into the HDDs $120_{n-1}$ and $120_n$.

With the above operations, the A/V server 1 can record external input data into the HDD array 110.

On the other hand, the A/V server 1 will read out the data recorded in the HDDs HDDs $120_1$, $120_2$, ..., $120_{n-3}$, $120_{n-2}$, $120_{n-1}$ and $120_n$ and output them to outside as will be described below:

That is, in the A/V server 1, any of the playback ports 20, 30 and 40 accesses the HDD array 110 for a time slot assigned by the time slot generator and requests the HDD array 110 to play back data. In the HDD array 110, the video data write/read unit 112 reads out the divided data recorded in the HDDs $120_1$, $120_2$, ..., $120_{n-3}$ and $120_{n-2}$, combines them, and detects an error in them and correct the error, if any, based on the parity data to play back the video data. The audio data write/read unit 113 plays back audio data from any one of the HDDs $120_{n-1}$ and $120_n$ whichever is free from error. The played-back video and audio data are buffered in the buffer 111, then read out and transferred via the data bus 130 to the playback port having made the request for the data playback.

Description will be made here on the assumption that the playback port 20 for example has made a request for data playback. Data output from the HDD array 110 is supplied to the buffer 23 provided in the data manager 21 via the data bus 130. The data supplied to the buffer 23 is buffered in the buffer 23 and then converted to serial data by the P/S 24. The serial data is supplied to the decoder 26 provided in the data input/output unit 22 and decoded there, and then supplied to the output terminal 28 via the selector 27 for delivery to outside.

Thus, the A/V server 1 can play back internal data and output it to outside.

With the aforementioned A/V server 1, the user can edit data by operating the control panel 80. The A/V server 1 holds file management information managed by the above file management block 101. Just by designating a file name, the user can play back a desired file. Thus, based on a virtual file (will be referred to as "VFL" hereafter) being information on a file to play back as will be described later, internal data can be played back according to an edition result without recording new data during the edition.

The file management information will be described in detail below. As shown in FIG. 3, the file management information is composed of three kinds of information including file entry (will be referred to as "FE" hereafter), record entry (will be referred to as "RE" hereafter) and free space entry (will be referred to as "FSL" hereafter).

Figures 3A, 3B, 3C, 4:
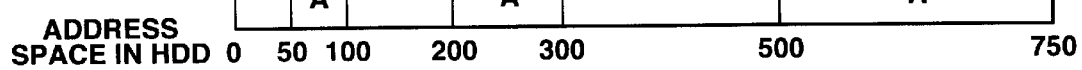
FIG. 3A shows the content of file entry (FE) of file management information held in the A/V server in FIG. 1.
FIG. 3B shows the content of record entry (RE) of the file management information held in the A/V server in FIG. 1.
FIG. 3C shows the content of free spaces list (FSL) of the file management information held in the A/V server in FIG. 1.
FIG. 4 shows arbitrary file A recorded in an address area in HDD provided in the A/V server in FIG. 1.

As shown in FIG. 3A, the FE includes a file name, information on a point to a first RE, actual time when for example a file is recorded or start time code when "0" is stated, and associated information such as file maker, date of file making, etc. In the A/V server 1, the FE is set in units of file, and it can be known where in the HDDs $120_1$, $120_2$, ..., $120_{n-3}$, $120_{n-2}$, $120_{n-1}$ and $120_n$ the file record starts.

As shown in FIG. 3B, the RE includes information on a point to a next RE, top position data indicating an address of the top position in an HDD in which the file is actually recorded, and a continuous area length indicating a length of the file record from the address indicating the top position. Information stated in the RE will be described in further detail about an arbitrary file A recorded in the address area in the HDD as shown in FIG. 4. As seen, the file A is divided and recorded at addresses 50 to 100, addresses 200 to 300, and addresses 500 to 750 in the address space in the HDD.

The FE and RE have stated therein information as shown in FIG. 5. More specifically, "A" is stated as a file name in the FE, and information on a pointer to a first RE is also stated in the FE. There will be provided as many REs as divisions of the file A. The first one of REs has stated therein "50" being a first address at which the file A is recorded as data at the top position in the HDD, and also "50" as a length of the recording in the continuous area because the file A is recorded at addresses 50 to 100. A next RE has stated therein "200" as data t the top position and also "100" as a length of the recording in the continuous area because the file A is recorded at addresses 200 to 300. Further, a further RE has stated therein "500" as data at the top position and also "250" as a length of the recording in the continuous area because the file A is recorded at addresses 500 to 750. Further, this RE has stated therein EOF (end of file) as information on a pointer to a next RE to indicate that the file A has come to end.

The above FE and REs are information indicating in which area in the HDD data is recorded, while the FSL has stated therein information indicating an area in the HDD where no data are recorded. As shown in FIG. 3C, the FSL includes information on a pointer to a next FSL, top position data indicating an address of the top position in a continuous blank area in the HDD in which no data is recorded, and a continuous area length indicating a length of the blank area from the top position address to a next area where data is recorded. Information stated in the FSL will be described in further detail about an arbitrary file A recorded in the address area in the HDD as shown in FIG. 4.

The FSL has stated therein information as shown in FIG. 6. There are provided as many FSLs the continuous blank areas. The first one of FSLs has stated therein "0" being a first address of the blank area in the HDD, and also "50" as a length of the recording in the continuous area because the file A is recorded starting at the address 50. A next FSL has stated therein "100" as data t the top position and also "100" as a length of the recording in the continuous area because the file A is recorded starting at the address 200. Further, a further FSL has stated therein "300" as data at the top position and also "200" as a length of the recording in the continuous area because the file A is recorded starting at the address 500. Further, this FSL has stated therein EOF (end of file) as information on a pointer to a next RE to indicate that the area is a last one.

The A/V server 1 holds such file management information in the file management block 101 of the file manager 100. When another file is recorded in the HDDs $120_1$, $120_2$, ..., $120_{n-3}$, $120_{n-2}$, $120_{n-1}$ and $120_n$, FE and RE related to the file are produced and the FSL is rewritten.

In the A/V server 1 holding the above file management information, when video/audio data recorded in the HDDs $120_1$, $120_2$, ..., $120_{m-3}$, $120_{n-2}$, $120_{n-1}$ and $120_n$ are edited as internal material, information indicating the file is outputted from the control panel 80 to the CPU 93 in the timing manager 90, and to the CPU 53 in the editing manager 50 via the control bus 131. Based on the file management information, the CPU 53 in the editing manager 50 can know which area in the HDDs $120_1$, $120_2$, ..., $120_{n-3}$, $120_{n-2}$, $120_{n-1}$ and $120_n$ should be accessed in order to play back a desired file.

The CPU 53 sends to the CPU 103 of the file manager 100 via the control bus 131 a control signal intended to acquire file management information on a file to play back. The CPU 103 reads out the file management information on the file from the file management block 101, and sends it via the control bus 131 to the CPUs 25, 35, 45 of the playback ports 20, 30 and 40, respectively, which provide material data to be edited (video/audio data to be edited). Receiving the file management information, the CPUs 25, 35 and 45 read out a playback address from the file management information and supply it to the buffers 23, 33 and 43, respectively. Information on the playback addresses stored in the buffers 23, 33 and 43, respectively, is added to playback commands produced by the CPUs 25, 35 and 45, respectively, and provided to the HDD array 110 via the data bus 130 for an assigned time slot. Receiving the playback commands, the HDD array 110 accesses, based on the playback addresses, an address of the file to play back and plays back the file, and provides it to the playback ports 20, 30 and 40. Thus, the content of the material data is supplied from the output terminal 54 via the playback ports 20, 30 and 40 and editor 51 to a display screen provided in the control panel 80 which will further be described later. The content is displayed on the display screen.

In the A/V server 1, material data displayed on the display screen of the control panel 80 is edited by operating various switches on the control panel 80 which will further be described. When an IN point and OUT point of a material data for example are determined as the result of the edition, information indicating the edition result, namely, information on the IN and OUT points, are outputted from the control panel 80 to the CPU 93 of the timing manager 90 and held in the CPU 93, and also outputted to the CPU 53 of the editing manager 50 via the control bus 131 and held in the CPU 53. The information on the edition result is sent from the CPU 53 to the CPU 103 of the file manager 100 via the control bus 131, and stored along with the file management information in the file management block 101.

At this time, the material data to be edited will not be recorded again from the recording port 10 into the HDD array 110. That is, in the A/V server 1, since the edition result information is stored in the file management block 101 of the file manager 100, it suffices to play back the file by accessing the edition result information as in the playback operation.

In the A/V server 1, the above-mentioned edition result information is called "VFL" as in the above. By reading out, based on the VFL, the material data recorded in the HDDs $120_1$, $120_2$, ..., $120_{n-3}$, $120_{n-2}$, $120_{n-1}$ and $120_n$, it is possible to deliver edited data to outside. Therefore, the A/V server 1 can edit and output the material data while normally recording and playing back on the real-time basis.

Figures 8A, 8B:
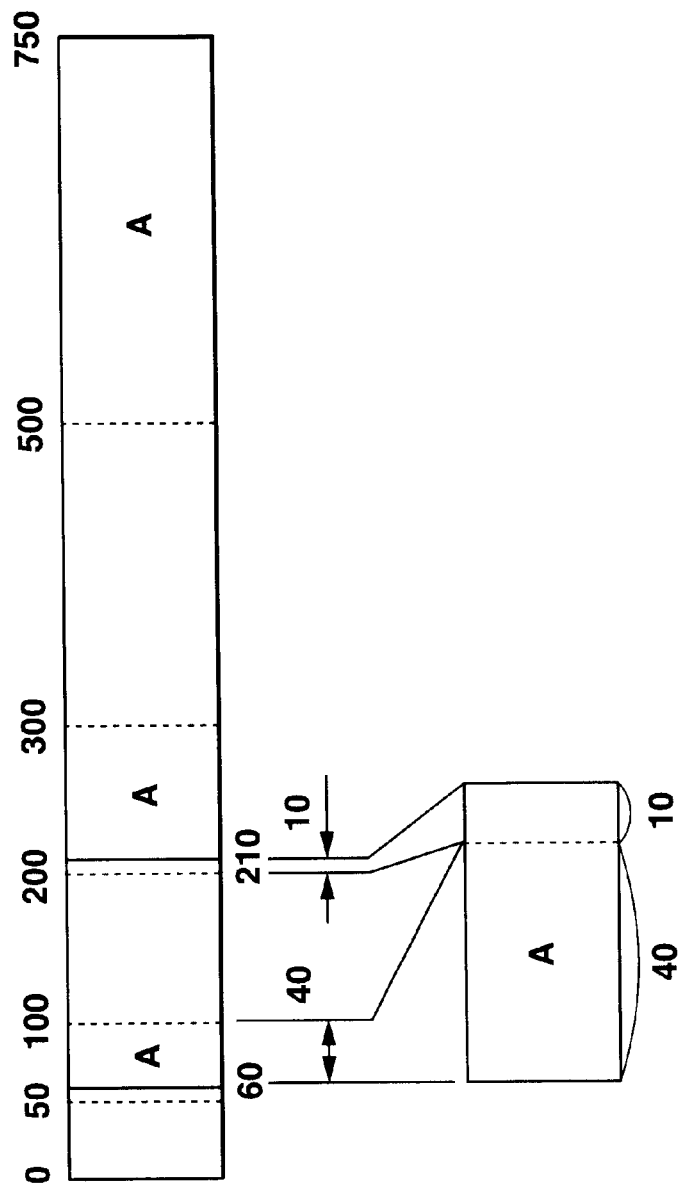
FIG. 8A shows an specific example of VFL, explaining a produced VFL.
FIG. 8B shows a specific example of VFL, explaining the correspondence between actual read start and end positions on the HDD.

As shown in FIG. 7, the VFL includes a file name area indicating the name of an edited file, a playback start position area and playback end position area, indicating the IN and OUT points, respectively, of the file. The playback start and end position areas indicate a playback start position and playback end position corresponding to addresses in the HDD, counted from the top position of the file. When a VFL is produced as shown in FIG. 8A for example, actual playback start and end positions in the HDD will be as shown in FIG. 8B.

That is, since the file A is recorded at the address 50 in the address space in the HDD, the playback start position for the file A, indicated in the VFL, will be an address 60 which is taken as IN point at which the playback is started. Also, since the playback end position is 60 from the top position, the address 210 will be an OUT point at which the playback is ended.

In the A/V server 1, since data to play back is determined based on the above VFL, it is not necessary to record the data into the HDDs $120_1$, $120_2$, ..., $120_{n-3}$, $120_{n-2}$, $120_{n-1}$ and $120_n$ after the data is edited.

By operating the meter panel 70 and control panel 80 of the A/V server 1, it is possible to select video/audio data input, adjust the recording and playback levels of the audio data and select a channel through which the audio data is monitored, for each of the recording port 10 and playback ports 20, 30 and 40.

Figure 9:
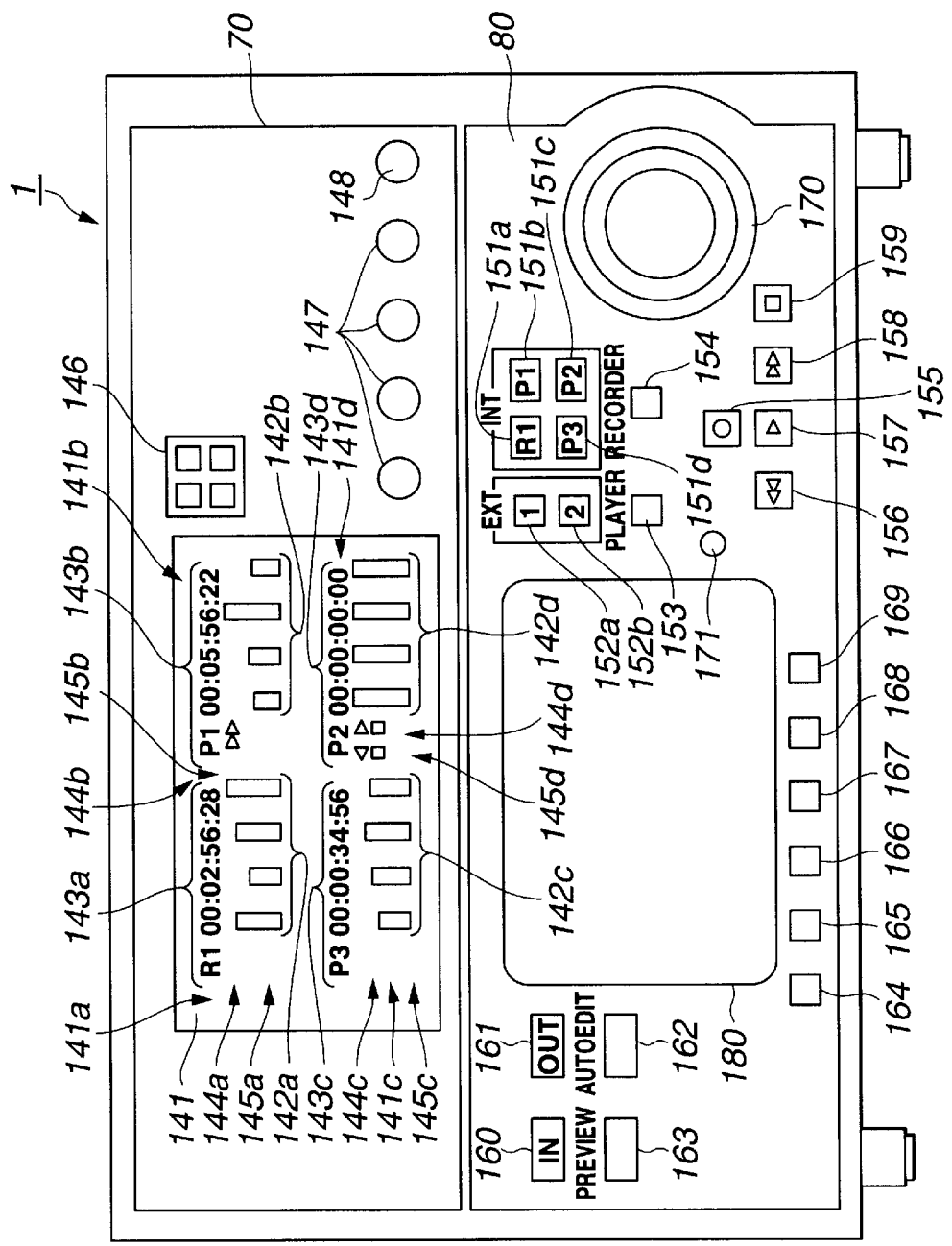
FIG. 9 is a front view of the A/V server in FIG. 1.

As outlined in FIG. 9, the meter panel 70 has a port status display screen 141 to display the operating status of the recording port 10 and playback ports 20, 30 and 40. The port status display screen 141 consists of four display areas 141a to 141d for the ports, respectively. These display areas 141a to 141d have audio level meter sets 142a to 142d, respectively, each indicating levels of audio data on four channels, dot matrix indicators 143a to 143d, respectively, each indicating a time code or the like, status indicators 144a to 144d, respectively, each indicating the current operating status of the corresponding port such as playback or recording in process, and information indicators 145a to 145d, respectively, each indicating a variety of information such as kind of a time code being indicated. As mentioned above, each of the audio level meter sets 142a to 142d includes four audio level meters for four channels, respectively, and each of the audio level meters has a corresponding channel number displayed below it. By operating switches which will further be described later, either four audio level meters for first to fourth channels or other four ones for fifth to eighth channels are selectively displayed in each of the audio level meter sets 142a to 142d.

The meter panel 70 has provided thereon four port select switches 146 to select a port to be operated, four level adjusting rotary encoders 147 to adjust the recording/playback level of audio data, and a video process adjusting rotary encoder 148 to adjust the video process.

On the other hand, as outlined in FIG. 9, the control panel 80 has provided thereon a recording port select switch (RI) 151a to select the recording port 10, and playback port select switches (P1, P2 and P3) 151b, 151c and 151d to select the playback ports 20, 30 and 40, respectively. The A/V server 1 is designed to have connectable thereto up to two external devices such as VTR. The control panel 80 has provided thereon a first external device select switch (1) 152a to select one of the two external devices, and a second external device select switch (2) 152b to select the other external device. Further, the control panel 80 is provided thereon with a playback select switch (PLAYER) 153 and recording select switch (RECORDER) 154 to select playback or recording for which a port and external device, selected by the recording port select switch 151a or any one of the playback port select switches 151b to 15Id and first or second external device select switch 152a or 152b, respectively, are used.

Also the control panel 80 has provided thereon a record switch 155 to designate data recording, rewind switch 156 to designate tape rewinding, playback switch 157 to designate data playback, fast forward switch 158 to designate tape fast forwarding, and a stop switch 159 to designate stop of recording or playback.

Further the control panel 80 has provided thereon an IN point designate switch 160 used to designate an IN point for material data used for data edition and/or data to produce, OUT point designate switch 161 to designate an OUT point for the material data and/or data to produce, edition start switch (AUTO EDIT) 162 to start data edition after IN and OUT points are designated by the IN and OUT point designate switches 160 and 161, and a preview start switch (PREVIEW) 163 to start data preview after IN and OUT points are designated by the IN and OUT point designate switches 160 and 161.

Moreover the control panel 80 has provided thereon a mode select switch (MODE) 164 to select a mode of operation of the A/V server 1, for example, an edit mode for data edition or a material mode for management of material data such as display, retrieval, deletion, etc. of detailed information of material data, an insertion mode select switch (INS/OVL) 165 to select either page insertion or page overlay when inserting a new page in an intermediate page during data edition in units of pages as will further be described layer, a clear program switch (CLEAR PROGRAM) 166 to clear the above-mentioned program being currently edited in order to start a new edition, a backspace switch (BS) 167 to return an arbitrary page displayed on a display screen which will further be described later to a preceding page, a forward space switch (FS) 168 to forward an arbitrary page displayed on the display screen to a page following the arbitrary page, and a cancel switch (CANCEL) 169 to cancel an operation having once been done. Also the control panel 80 is provided with a search dial 170 rotatable through 360 degrees and used to search an edition point for example, and a cursor-moving rotary encoder 171 rotatable through 360 degrees and used to move the cursor displayed on the display screen.

Figure 10:
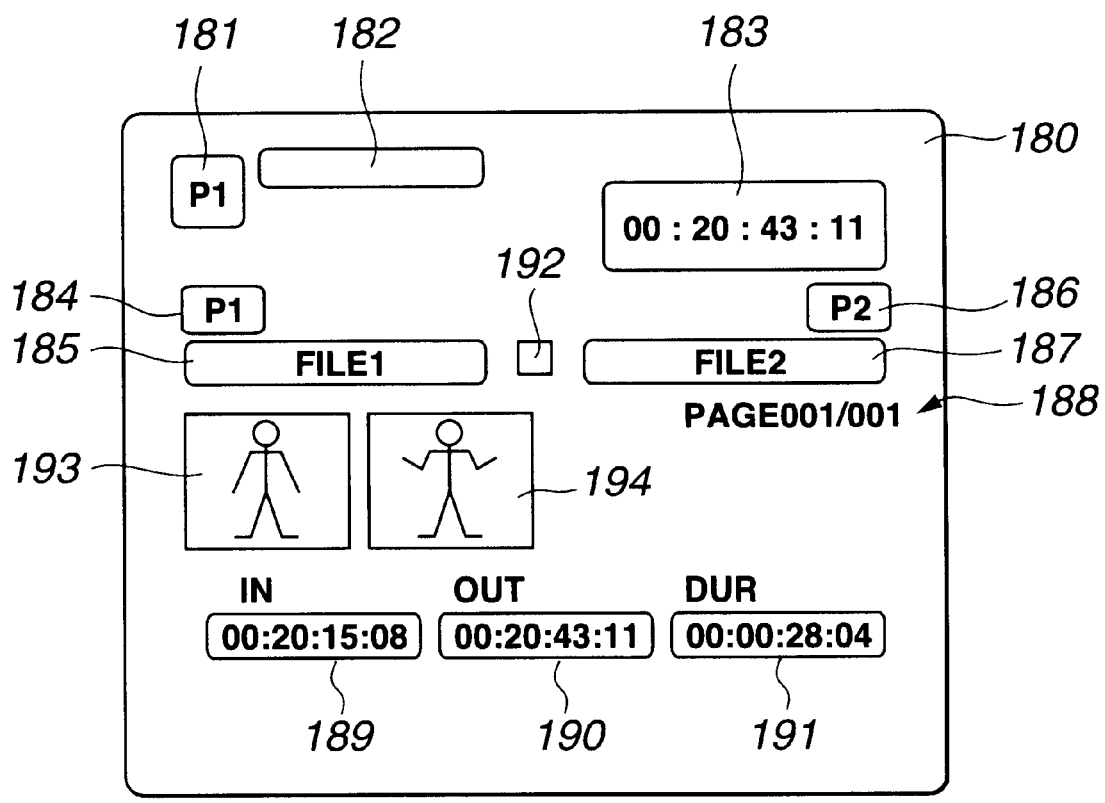
FIG. 10 shows the content displayed on the display screen provided on the control panel of the A/V server in FIG. 1.

Furthermore, the control panel 80 has provided thereon a display screen 180 which is a liquid crystal panel or the like to display various kinds of information required for data edition. The display screen 180 has various display areas in which information about each page when in the edit mode. As shown in FIG. 10 for example, the display areas on the display screen 180 include a current port indicator 181 to indicate a port being currently selected and through which data edition can be done, port material data name indicator 182 to indicate a file name of data opened in a current port, time indicator 183 to indicate a current time with hours, minutes, seconds and frame number, player port indicator 184 to indicate a PLAYER port in which material data being an edition source is opened, indicator 185 to indicate the name of the material data opened in the PLAYER port, indicator 186 to indicate a RECORDER port through which produced data being an edition destination is played back, indicator 187 to indicate the name of produced data opened in the RECORDER port, indicator 188 to indicate the position of a current edition point in a page in data in the current port and managed by the control panel 80, indicator (IN) 189 to indicate a time code of an IN point of data in the current port with hours, minutes, seconds and frame number, indicator (OUT) 190 to indicate a time code of an OUT point of data in the current port with hours, minutes, seconds and frame number, indicator (DUR) 191 to indicate a section being edition-time information of an edition section including an OUT point in the current port with hours, minutes, seconds and frame number, and an insertion mode indicator 192 to indicate a mode designated by the aforementioned insertion mode select switch 165. Also the display screen 180 has an IN point stamp picture display 193 in which there is indicated a stamp picture of data in the current port at a time code indicated in the IN point indicator 189, and an OUT point stamp picture display 194 in which there is indicated a stamp picture of data in the current port at a time code indicate in the OUT point indicator 190.

As in the above, the control panel 80 displays various kinds of information, mainly character information on the display screen 180. The user will edit data based on a UI (user interface) whose various types of information are indicated.

The operations effected using the above-mentioned switches on the control panel 80 for data edition will be described below with reference to FIGS. 11 to 50.

Before describing the operations of data edition in the A/V server 1 in detail, the edition according to the present invention will first be outlined with reference to FIG. 11.

Note that for simplicity of the illustration and description, a cut-in edition will be described in which when there are two material video data, IN and OUT points indicating insertion points are set and one of the material video data is inserted into the other material video data.

In the A/V server 1, when one of the two material video data (will be referred to as "source data" hereafter) is inserted into the other material video data (will be referred to as "destination data" hereafter), IN and OUT points are determined for the source data as shown in FIG. 11A. Thereafter in the A/V server 1, IN and OUT points are determined for the source data which is to be inserted into the destination data. Then in the A/V server 1, there is produced edit data page information composed of a source name indicative of a file name of the source data, IN and OUT points for the source data, IN and OUT points for the destination data, and a page number. That is, the A/V server 1 will produce data corresponding to one edition cut called "page" at each edition cut as shown in FIG. 11A.

Also, the A/V server 1 takes a stack of pages for one destination data as "program" to produce program information as shown in FIG. 11B.

To insert a plurality of source data such as source data 1, source data 2 and source data 3 into destination data, the A/V server 1 produces one edit data page for the source data 1 being one edition cut, another edit data page for the source data 2 and further edit data page for the source data 3 as shown in FIG. 11B.

The A/V server 1 manages the plurality of edit data pages as a program. Having information about the pages (edit data pages) and program in this way, the A/V server 1 displays on the display screen the edition point information on the IN and OUT points at each edition cut as character or numerical information, thereby implementing an edition at each cut, which has so far been popular in the linear edition, in the non-linear edition also.

Note that the production of pages and program, detailed content of each page, and page numbering within a program will further be described later.

Figure 12:
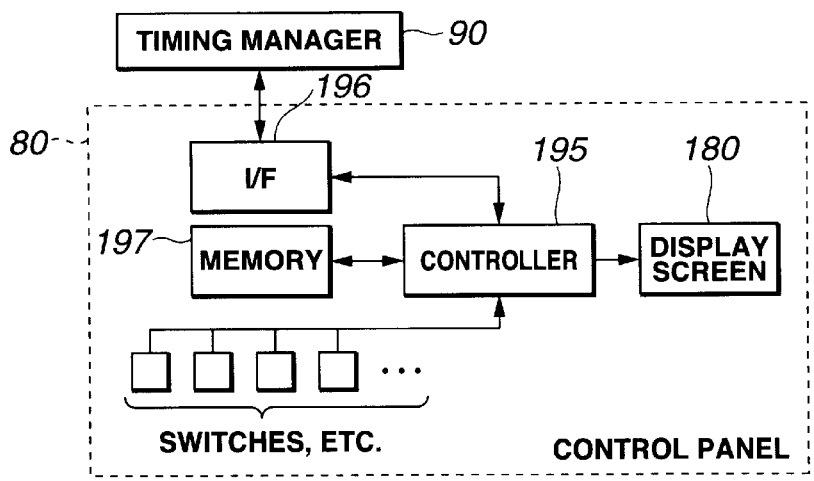
FIG. 12 is a block diagram of the control panel provided on the A/V server in FIG. 1, showing the internal construction of the control panel.

As shown in FIG. 12, the control panel 80 has also provided thereon a controller 195 to process signals entered by operating various switches provided on the control panel and produce edition list information corresponding to the above-mentioned program, and displays, on the display screen 180, the signals having been entered by the switch operations and supplied via the controller 195. Also the control panel 80 sends to an interface (I/F) 196 the signals having been entered by the switch operations via the controller 195, converts a program corresponding to a switch operation by the I/F 196 to produce a VFL (virtual file), and sends the VFL to the file management block 101 of the file manager 100 via the I/F 92 of the aforementioned timing manager 90 or to the HDD array 110 via the file management block 101. Further, the control panel 80 displays information, etc. such as stamp picture received from the main body of the A/V server 1 via the I/F 196 on the display screen 180 under the control of the controller 195, and holds the information in a memory 197. The memory 197 holds a variety of programs necessary for the data edition and information received from the main body of the A/V server 1, and the controller 195 reads out the program and information from the memory 197, processes them, controls a content displayed on the display screen 180, and sends the content to the main body of the A/V server 1 via the I/F 196.

Figure 13:
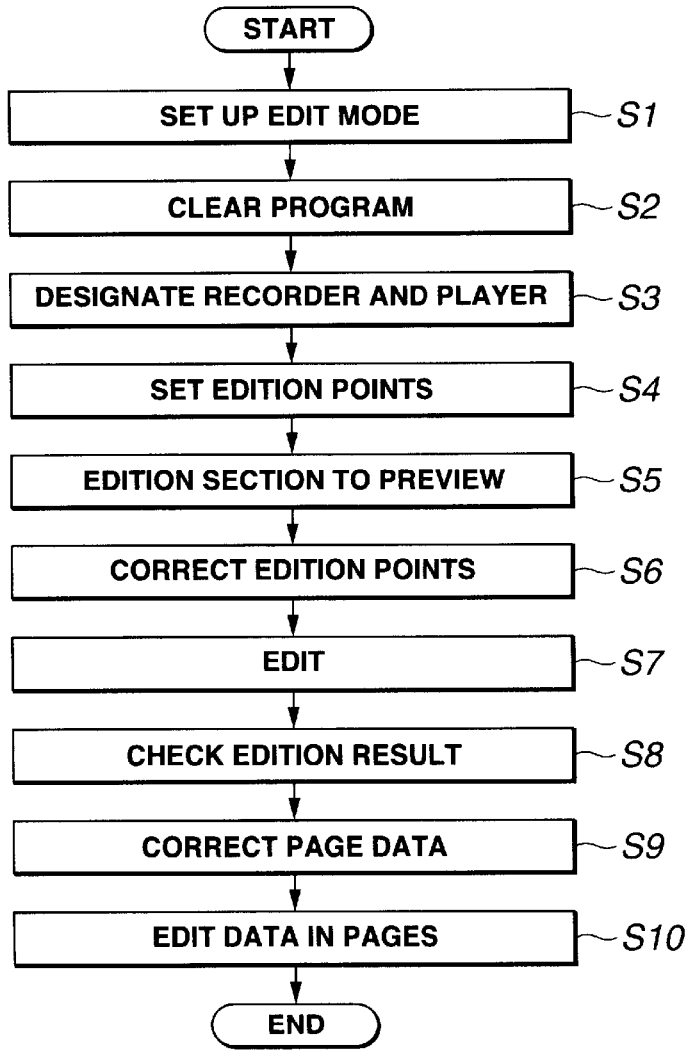
FIG. 13 is a flow chart of operations effected in basic edition in the A/V server in FIG. 1.

The basic edition effected in the A/V server 1 is as shown in FIG. 13. First at step S1, the user presses the mode select switch 164 on the control panel 80 of the A/V server 1 to set the edit mode. When in the edit mode, the display screen 180 on the control panel 80 displays information necessary for the edition as shown in FIG. 10.

Next at step S2, the user operates the clear program switch 166 on the control panel 80 of the A/V server 1 to open a program currently managed by the control panel 80, that is, a stack of "pages" for one destination data, to produce a blank program.

When the user operates the clear program switch 166, the display screen 180 of the control panel 80 displays a dialog box to show whether the program may be cleared or not.

When the dialog box shows that the program may be cleared, the user operates an OK switch (not shown) so that the A/V server 1 will clear all data having so far been managed as a program.

When the dialog box shows that the program may not be cleared, the user operates the cancel switch 169 so that the A/V server 1 will cease to clear data having so far been managed as a program.

Next at step S3, a recorder device and player device are designated in the A/V server 1. That is, a PLAYER port in which source video data to be inserted is opened and a RECORDER port in which destination video data into which the source video data is to be inserted, are designated in the A/V server 1.

It is assumed here that the playback port 20 is taken as a PLAYER port in which the source video data is to be played back and the playback port 30 is taken as a RECORDER port in which the destination video data is played back. In this case, at the A/V server 1, the user presses the playback port select switch (P2) 151*c* corresponding to the playback port 30 and recording select switch (RECORDER) 154 at the same time to designate the playback port 30 as the recorder port. Also, at the A/V server 1, the user presses the playback port select switch (P1) 151*b* corresponding to the playback port 20 and playback select switch (PLAYER) 153 at the same time to designate the player port 20 as the player port. When pressed by the user, these switches will be illuminated. With these operations, the PLAYER port indicator 184 on the display screen 180 of the control panel 80 reads "P1", and the RECORDER port indicator 186 reads "P2" as shown in FIG. 10.

Note that in the A/V server 1, once the recorder and player ports are designated as in the above, a port currently being designated as player, or the playback port 20, will automatically be selected and become controllable as a current port when the recording select switch 153 for example is pressed again subsequently.

Next at steps S4 to S8, a program is produced in the A/V server 1. First at step S4, edition points are set. At this time, when the user presses the mode select switch 164, the A/V server 1 will move to the material mode and load source data for use in the edition to the playback port 20. It should be noted that the term "loading" used herein corresponds to insertion of a cassette into the VTR and means a status that file management information on the source data is held in the CPU 25 in the playback port 20 and a command for playback of the source data from the control panel 80 is waited for. Then, on the display screen 180 of the control panel 80, the source data name indicator 185 indicates the name of a file of source data output from the playback port 20, and the destination data name indicator 187 indicates the name of a file of destination data. Note that the name indicated in the destination data name indicator 187 may arbitrarily be changed subsequently.

Thereafter at the A/V server 1, the user presses the mode select switch 164 again to move to the edit mode, and the playback select switch 153 to switch the current port to the playback port 20. Then, on the display screen 180 of the control panel 80, the current port indicator 181 reads "P1" indicating the playback port 20, and the current port material data name indicator 182 indicates the name of a file output from the playback port 20, as shown in FIG. 10.

Then in the A/V server 1, edition points are set for material data output from the playback port 20. Edition points are set by any of the four methods which will be described below by way of examples.

With the first one of the four methods, the user turns the search dial 170 to search a point he or she wants to set as an IN point. While an image of the point (image frame or picture output from the playback port 20) is being displayed in the IN point stamp picture indicator 193, the user presses the IN point designate switch 160 to set an IN point. Then, the user turns the search dial 170 to search a point he wants to set as an OUT point. While an image of that point (similarly, image frame or picture output from the playback port 20; after the IN point is set, an image after the IN point, for example, will be outputted) is being displayed in the OUT point stamp picture indicator 194, the user presses the OUT point designate switch 161 to set an OUT point.

With the second method, the user turns the search dial 170 to search a point he wants to set as an IN point. While an image of the point is being indicated in the IN point stamp picture indicator 193, the user operates the cursor move rotary encoder 171 to move the cursor onto the IN point indicator 189, presses a set switch (not shown) to set the IN point, and then turns the search dial 170 to search a point he wants to set as an OUT point. While an image of that point is being indicated in the OUT point stamp picture indicator 194, the user turns the cursor move rotary encoder 171 to move the cursor onto the OUT point indicator 190, and then presses the set switch (not shown) to set the OUT point.

With the third method, the user turns the cursor move rotary encoder 171 to move the cursor onto the IN point indicator 189, press a dialog box display switch (not shown) to display a dialog box, enters a time code into the displayed dialog box to set an IN point, then turns the cursor move rotary encoder 171 to move the cursor onto the OUT point indicator 190, press the dialog box display switch (not shown) to display a dialog box, and then enters a time code into the displayed dialog box to set an OUT point.

With the fourth method, the user sets an IN or OUT point using any of the above three methods, then turns the cursor move rotary encoder 171 to move the cursor onto the section indicator 191, presses the dialog box display switch (not shown) to display a dialog box, and then enters a time code into the displayed dialog box to automatically set an OUT or IN point.

In case edition points have been set by any of the above four methods, when an IN point is set, a time code of the IN point will be indicated in the IN point indicator 189, and when an OUT point is set, a time code of the OUT point will be indicated in the OUT point indicator 190. Also, when IN and OUT points are set separately, time codes of them will be displayed in the current time indicator 183. Further, after both IN and OUT points are set, a time length from the IN point to OUT point of material video data will be indicated in the form of a time code in the section indicator 191.

At the A/V server 1, after edition points of source data are set using the playback port 20 as in the above, the user presses the recording select switch 154 to take the playback port 30 as a current port, and also sets edition points of destination data in the similar manner.

At the A/V server 1, when three of IN and OUT points of the player and recorder ports, respectively, are set, the edition start switch 162 and preview start switch 163 flicker to indicate that data edition and review can be done. In the A/V server 1, when the edition points are set, the controller 195 of the control panel 80 will produce an edit data page which will be held in the memory 197.

An example of data structure in the edit data page will be described with reference to FIG. 14.

As will be seen from FIG. 14, the data structure of the edit data page includes a page number item and eight items showing the content of the edit data page.

The content of the edit data page is generally composed of two pieces of information, namely, information about destination data and information about source data.

The information about destination data includes a recorder device name item storing the name of a port from which the destination data is outputted, a recorder file name item storing information indicating a file name of the destination data, a recorder IN point item storing information indicating an IN point after the destination data is edited, and a recorder OUT point item storing information indicating an OUT point after the destination data is edited. The edit data page has areas of 1 byte, 23 bytes, 4 bytes and 4 bytes for the recorded device name item, recorder file name item, recorder IN point item and recorder OUT point item, respectively.

The information about source data includes a player device name item storing the name of a port from which the source data is outputted, a player file name item storing information indicating a file name of the source data, a player IN point item storing information indicating an IN point after the source data is edited, and a player OUT point item storing information indicating an OUT point after the source data is edited. Also, the edit data page has 1-byte, 23-byte, 4-byte and 4-byte areas for the player device name item, player file name item, player IN point item and player OUT point item, respectively.

In the example shown in FIG. 14, the destination data is an output from the "P3" port, that is, the playback port 30, and the file name of the destination data is "File2". The IN point of the destination data after the edition is "00:01:00:00", namely, just at a time of 1 min from the top, and the OUT point of the destination data after the edition is "00:01:10:00", that is, just at a time of 1 min and 10 sec from the top. Therefore the length of the destination data into which source data is to be inserted after the edition is equal to 10 sec.

On the other hand, the source data is an output from the "P2" port, that is, the playback port 20, and the file name of the source data is "File1". The IN point of the source data after the edition is "00:02:00:00", namely, just at a time of 2 min from the top, and the OUT point of the source data after the edition is "00:02:10:00", that is, just at a time of 2 min and 10 sec from the top. Therefore, the length of the source data inserted into the destination data is equal to a time of 10 sec.

Also with the above operations, the controller 195 of the control panel 80 of the A/V server 1 produces internal status information. The internal status information includes, for each page, the name of a port currently selected port, file name of data to be outputted from the port, etc. Thus it indicates the current status of each page.

An example of such an internal status information is shown in FIG. 15. As shown, the internal status information consists of a current page number (PageNum), recorder port selected for output of source data or recorder port selected for output of destination data (NowPR), port currently selected (NowPort), current time code (TimeCode), and a file name assigned to the current port (FileName).

Since in the example shown in FIG. 15, "2", namely, "P1" is selected as NowPort and "0", namely, recorder port is selected as NowPR, the internal status information indicates that a file "File1" has been played back from the current port "2", that is, playback port 20, as destination data from a time of 3 min and 50 sec from the top.

In the A/V server 1, such an internal status information is held in the memory 197 to permit easy production of an edit data page based on the internal status information.

Note that the internal status information will have the content thereof appropriately rewritten depending upon the situation, for example, whether any other port is selected.

Next at step S5, an edition section is previewed in the A/V server 1. When the user of the A/V server 1 presses the preview start switch 163, the preview is started. The preview start switch 163 of the A/V server 1 will illuminate in the course of the preview.

When the user presses the preview start switch 163 on the control panel 80, the controller 195 will read edit data page as previously shown in FIG. 14 from the memory 197, and the I/F 196 will convert the edit data page to VFL and send the VFL along with various commands to the main body of the A/V server 1.

In the A/V server 1, the VFL and commands are received by the I/F 92 of the timing manager 90. The VFL is sent to the file management block 101 of the file manager 100, where it is buffered or via the file management block 101 to the HDD array 110 where it is rewritten, while the commands are sent to the CPU 53 of the editing manager 50. The commands include a command for cue-up of data to a pre-roll point, command for data playback, and a command for stop of data playback at a post-roll point. Based on the VFL and commands, the A/V server 1 uses the recorded-side played-back data to output video/audio data included between the pre-roll point and IN point from the output terminal 54 to a monitor (not shown), uses the player-side played-back data to output video/audio data included between the IN and OUT points from the output terminal 54 to the monitor, and also uses the recorder-side played-back data side to output video/audio data included between the OUT point and post-roll point from the output terminal 54 to the monitor.

To preview and output video/audio data included between the pre-roll point at which data playback starts and the post-roll point at which data playback stops, the A/V server 1 will internally process data as will be described below.

Note that the reason why the IN point after the edition is not taken as the playback start point and the OUT point after the edition is not taken as the playback end point, is that it should be checked whether material data to be edited has been edited as intended before and after the material data is inserted. Of course, in the A/V server 1, the IN point after the edition is taken as the playback start point and OUT point after the edition is taken as the playback end point.

In the A/V server 1, the VFL including the edit data pages is cumulated in the file management block 101 and various commands such as the cue-up command are outputted to the CPU 53 of the editing manager 50.

The CPU 103 produces a control signal to produce a file of destination data from a predetermined playback start point before the pre-roll point and outputs it via the control bus 131 to the CPU 35 of the playback port (recorder port) 30 which outputs the destination data. The control signal has inserted therein an address of a file to be played back and retrieved from a file system associated with a file of source data cumulated in the file management block 101 as in the above. Normally, the file system has cumulated therein top address and length (corresponding to the address value) of a file. In the A/V server 1, the control signal including the top address and file length is outputted to the CPU of the playback port. However, for data playback started at a predetermined length, for example, before the IN point of the file of destination data stated in the edit data page, the address value may be calculated by the CPU 103 and the calculated address can be taken as the pre-roll point and outputted to the CPU 35 of the playback port 30. Of course, at the A/V server 1, the user can operate the control panel 80 to enter the above length and determine a pre-roll point according to the length.

The above is also the true for the playback end point. Normally, the playback end point is determined by the start address of a file to be edited in the file system and "length" of the file. In the A/V server 1, however, the playback end point can be calculated by the CPU 103 from the predetermined length for the OUT point stated in the edit data page or the length entered by the user from the control panel 80, and the control signal including the "length" indicating the playback end point in the file system can be outputted to the CPU 35 of the playback port 30.

Further, in the A/V server 1, a control signal for the playback start address of the file in the file system and length of the file may be outputted from the CPU 103 to CPU 35 as in the normal playback, and the editor 51 may be controlled so that the file (source data) played back from the playback port under the control signal is changed at IN and OUT points set as edition points by the CPU 53 which controls the editor 51.

More specifically, the A/V server 1 according to the present invention functions as will be described below:

In the A/V server 1, a control signal for the playback start address of a file of destination data and length of the file is outputted from the CPU 93 to the CPU 53 via the control bus 131. Then, in the A/V server 1, a playback start point (playback start address) for playback at the pre-roll point is determined by the CPU 53 based on a command for cue-up to the pre-roll point and playback start point (playback start address) of the destination data from the CPU 93, and a length to the playback start point (from the pre-roll point to a post-roll point) is calculated from a command for playback stop at the post-roll point, playback start address of the destination data from the CPU 93, and the length of the destination data, and thus a control signal having a similar structure to that consisting of the playback start point in the file system and length of the file is outputted to the CPU 35 of the playback port (recorder port) 30 via the control bus 131.

Upon reception of the control signal, the CPU 35 of the playback port 30 supplies the buffer 33 with a playback instruction for playback of the file of source data and a command indicative of an address of the aforementioned pre-roll point and length to the post-roll. Thus, the playback port 30 will output the command to the HDD array 110 via the data bus 130 for the period of an assigned time slot.

The HDD array 110 buffers the command in the buffer 111 and is controlled by the CPU 114 to play back data for the length from the playback start address of the file to be played back based on the content of the command. More specifically, under the playback control by the CPU 114 inside the HDD array 110, for example, the playback heads (not shown) in the HDDs $120_1$, $120_2$, ..., $120_{n-3}$, $120_{n-2}$, $120_{n-1}$ and $120_n$ access the playback address and read the file data from a disc (not shown) for the "length", and output the read data. The files played back by the HDDs $120_1$, $120_2$, $120_{n-3}$, $120_{n-2}$, $120_{n-1}$ and $120_n$ are buffered in the buffer 111 and outputted one after another to the playback port 30 via the data bus 130.

In the NTSC (National Television System Committee) for example, the command outputted from the playback port 30 to the HDD array 110 is a control signal for playback of data for the aforementioned time slot, namely, for 1/30 (sec)×4 (frames)=133 (msec). Consequently, when the command is outputted to the recording port 10 or playback ports 20, 30 and 40 for time slots assigned to the ports, respectively, files to be played back for the time slot assigned to the playback port 30 will be buffered in the buffer 33. The files buffered in the buffer 33 will be outputted to the editor 51 via the P/S 34 and decoder 36.

The destination data supplied to the editor 51 is controlled by the CPU 53 for data included in a section from the pre-roll point to an IN point stated in the aforementioned edit data page to be delivered at the output terminal 54.

Next, the A/V server 1 delivers at the terminal 54 source data included in a section from the IN point to the OUT point.

In the A/V server 1, a control signal for the playback start address of the destination data in the file system is entered from the CPU 93 via the control bus 131 as in the aforementioned destination data playback, and the CPU 53 calculates an address of IN point and length from the IN point address to the OUT point from information about the IN and OUT points in the edit data page and outputs them as a control signal along with an instruction for playback of source data to the playback port (player port) 20.

Receiving this control signal, the CPU 25 of the playback port 20 provides a command from the buffer 23 to the HDD array 110 via the data bus 130 for a time slot assigned to the playback port 20.

The HDD array 110 analyzes the playback start address and file length based on the content of the command under the control of the CPU 114 and moves the playback heads (not shown) in the HDDs $120_1$, $120_2$, ..., $120_{n-3}$, $120_{n-2}$, $120_{n-1}$ and $120_n$ to the address to play back the file of source data for the file "length" from the disc (not shown). The source data thus played back is outputted to the editor 51 via the buffer 111, databus 130, buffer 23, P/S 24 and decoder 26 of the playback port (player port) 20.

At the IN point stated in the edit data page, the editor 51 switches a file from the playback port (recorder port) 30 to a file from the playback port (player port) 20, and delivers source data at the output terminal 54.

When the source data down to the OUT point is outputted from the output terminal 54 to the monitor (not shown), destination data from the OUT point will be outputted from the output terminal 54 to the monitor (not shown).

More specifically, for playback of data from the OUT point down to the post-roll point, the playback start point (OUT point) and length (from the OUT point to the post-roll point) are calculated by the CPU 53 from information about the destination data from the CPU 93 and included in the file system and information about the OUT point, etc. of the edit data page and control signal is sent to the CPU 25 of the playback port 30 from which the file is to be played back. Receiving a command outputted from the CPU 35 via the buffer 33 and data bus 130, the HDD array 110 delivers source data from the OUT point to the playback port 30 according to the command. Similarly, destination data from the OUT point is inputted to the editor 51, data is switched by the editor 51 from the source data to destination data at the OUT point, and the data down to the post-roll point is outputted from the output terminal 54 to the monitor (not shown).

The preview can be interrupted by pressing the stop switch 159 on the control panel 80.

In the A/V server 1, after an edition section is previewed as in the above, the edition points are corrected at step S6 as necessary. First, the user presses the playback select switch 153 or recording select switch 154 to select a device (port) for which the edition points are to be corrected. At this time, the pressed one of the playback select switch 153 and recording select switch 154 is illuminated. Then, while pressing the IN point designate switch 160 or OUT point designate switch 161 correspondingly to the corrected edition points, the use turns a trimer (not shown) provided on the control panel 80 to elaborately correct the edition points. In the A/V server 1, as the trimmer is turned, the time code indicated in the current time indicator 183, IN point indicator 189 or OUT point indicated 190 changes frame by frame. Thus in the A/V server 1, it is possible to correct the edition points by incrementing or decrementing the time codes therefor. Note that in the A/V server 1, the edition points may be corrected by operating the cursor move rotary encoder 171 while pressing the IN point designate switch 160 or OUT point designate switch 161 to increment or decrement the time codes for the edition points. The edition points can be deleted by pressing the IN point designate switch 160 or OUT point designate switch 161 while pressing a delete switch (DELETE; not shown) provided on the control panel 80.

Next, an edition is effected and the result of the edition is checked at steps S7 and S8, respectively, in the A/V server 1. In the A/V server 1, the edition is carried out when the user presses the edition start switch 162. In the A/V server 1, the edition start switch 162 is illuminated during the edition. Also in the A/V server 1, when the edition is effected, the controller 195 of the control panel 80 edits the results of steps having so been effected as the edit data pages shown in FIG. 14 and the edit data pages are held in the memory 197. The controller 195 of the control panel 80 converts the edit data pages held in the memory 197 to VFL by means of the I/F 196, and sends the VFL along with commands which will further be described to the main body of the A/V server 1.

In the A/V server 1, the VFL and commands are supplied to the I/F 92 of the timing manager 90. The VFL is sent to the file management block 101 of the file manager 100 where it will be buffered or to the HDD array 110 via the file management block 101, where it will be written, while the commands are sent to the CPU 53 of the editing manager 50. Specifically, the commands include a command for cue-up to the pre-roll point, a command for data playback, and a command for stop of the data playback at the post-roll point. In the A/V server 1, based on the VFL and commands, video/audio data included between the pre-roll point and IN point are outputted from the terminal 54 to the monitor (not shown) using the recorder-side played-back data, video/audio data included between the IN and OUT points are outputted from the output terminal 54 to the monitor using the player-side played-back data, and video/audio data included between the OUT point and post-roll point are outputted from the output terminal 54 to the monitor using the recorder-side played-back data.

After the edition is effected and the result of the edition is checked in this way, the control panel 80 will indicate a variety of information about a next edit data page on the display screen 180.

In the A/V server 1, steps S4 to S8 are effected for each page to produce all edit data pages forming together one program. The page data finally obtained in this way is as shown in FIG. 16 for example. More specifically, the page data includes a recorder port name (device name) and player port name (device name), file name, and edition points per page. Namely, the page data is an integration of data in all pages. An end code is suffixed to a recorder file name in a page next to the last page. Page numbers to identify pages are given as consecutive information assigned to pages, respectively, according to time series, such as serial numbers. Note that although the player file names are the same in all the pages as shown in FIG. 16, different files may be used as source data as shown in FIG. 11B. On the other hand, the recorder file names, namely, file names of destination data, should of course be the same in all the pages.

In the A/V server 1, after all edit data pages are produced, the page data are corrected at step S9 as necessary. That is, the A/V server 1 can correct the page data at any time even after the program is produced. When in any other mode than edit mode, the user presses the mode select switch 164 to select the edit mode. At the A/V server 1, when the user presses the backspace switch 167 or forward-space switch 168, a page the user wants to correct the data therein is displayed on the display screen 180. The edition points are corrected as at step S6, the page is previewed as at step S5 when necessary, and then the user presses the edit start switch 162 to effect an edition. The edition is effected as at steps S7 and S8.

Thus, the A/V server 1 produces an edit data page reflecting the edition point correction.

Further in the A/V server 1, the edition can be done in pages as at step S10. Namely, in the A/V server 1, a new page can be inserted between existing edit data pages or the existing edit data page can be moved.

Production of page data as shown in FIG. 17 will be discussed below by way of example.

The page data in FIG. 17 is different from the content of the page data shown in FIG. 16 in that page numbers of source data in relation to the destination data are not in the produced order of the edit data pages.

More particularly, the recorder OUT point of the pager number 1 shown in FIG. 17, that is, the OUT point of an edition cut of the page number 1 of the destination data, is "00:01:10:00", the IN recorder point of the page number 4 is "00:01:10:00", the recorder OUT point of the page number 4 is "00:01:20:00", and the recorder IN point of the page number 2 is "00:01:20:00". So, the edit data page having the page number 4 will follow the edit data page having the page number 1, and the edit data page having the page number 2 will follow the edit data page having the page number 4. This concept is shown in FIG. 18.

Figure 18:
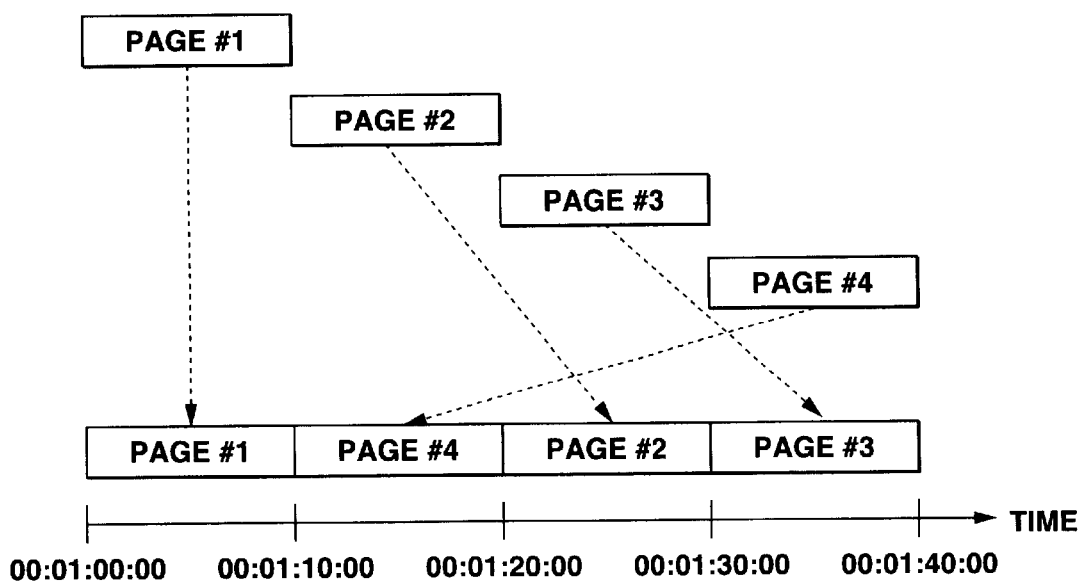
FIG. 18 shows the relation between a page related to the page data shown in FIG. 17 and a package.

As shown in FIGS. 17 and 18, the edit data pages are numbered in the produced order. However, if the edition cuts are replaced subsequently during an edition, the produced order of the edit data pages will not coincide with the order of page numbers of the final data for broadcasting, what we call "package", on the time base as the case may be.

In this case, it is difficult to retrieve arbitrary page from the package data for example.

To avoid the above, the A/V server 1 is provided with an auto renumbering function to automatically correct and rearrange page numbers in the temporal order of information about the edition points in the recorder during execution of an edition irrespectively of the produced order of edit data pages.

At the A/V server 1, when editing data in units of page, the user presses the aforementioned insertion mode select switch 165 to designate, depending upon edition points in a new page, whether the page is to be inserted between existing pages or overlapped on the pages. At this time, the insertion mode indicator 192 in the display screen 180 on the control panel 80 indicates "INS" or "OVL" indicating a insertion or overlapping mode.

Here, production of page data as shown in FIG. 17 in the "INS" mode will be discussed by way of example. In this case, when the user presses the edition start switch 162, the A/V server 1 edits the page data as at steps S7 and S8 and renumber the edit data pages in the temporal order of edition points in the recorder of the page data as shown in FIG. 19.

Figure 20:
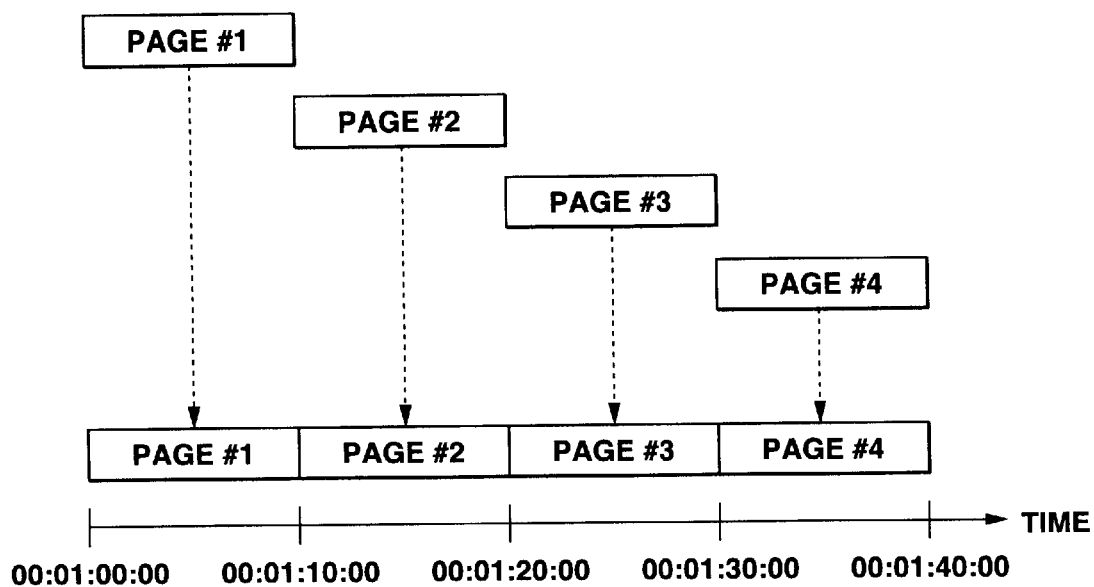
FIG. 20 shows the relation between a page related to the page data shown in FIG. 19 and a package.

This operation can be represented by a relation between the pages and package as in FIG. 20. That is, as the edition is effected, the A/V server 1 performs the auto renumbering function to insert the pages 2 and 3 in FIG. 17 as pages 3 and 4 and the page 4 in FIG. 17 as a page 2. When in the "INS" mode, the blank area between the pages 1 and 2, where no data exist, as shown in FIG. 17 has disappeared because the pages were inserted after the auto renumbering. However, such a blank area may be moved as the pages are moved.

Figure 21:
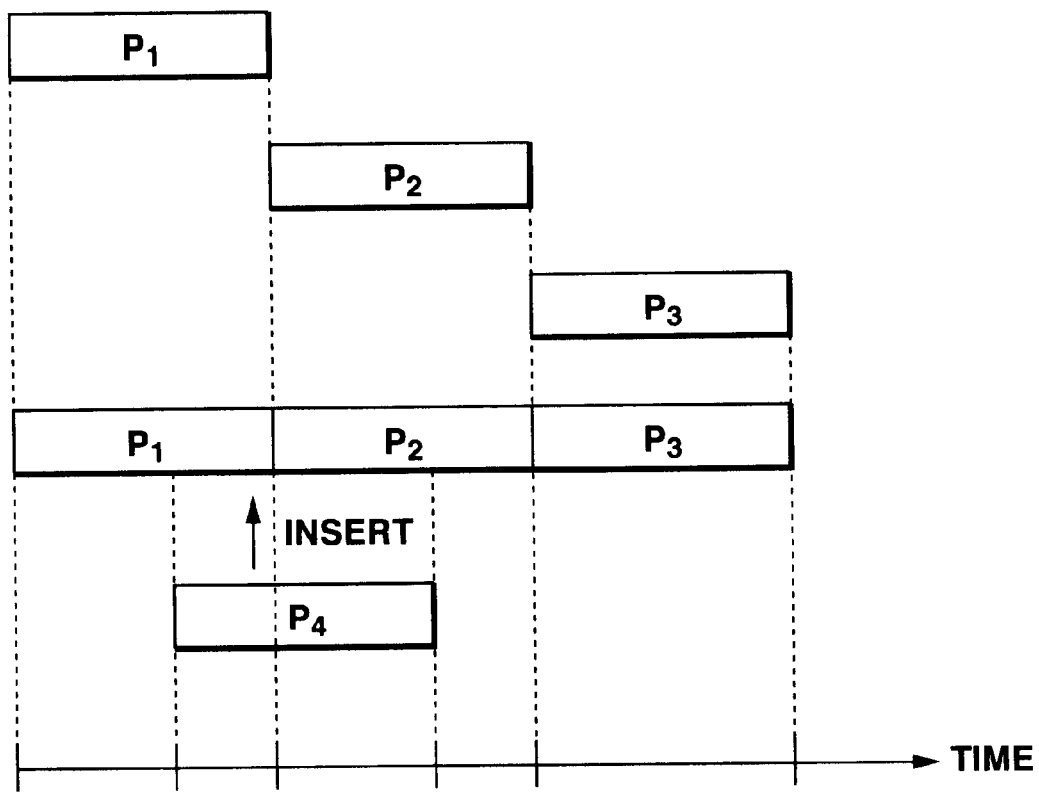
FIG. 21 shows the relation between the page and package before a new page is inserted between arbitrary pages.

In the A/V server 1, the auto renumbering function is used to insert a new page between arbitrary pages during an edition in units of page as at step S1. Insertion of a newly produced page $P_4$ between pages $P_1$ and $P_2$ of page data consisting of three pages $P_1$, $P_2$ and $P_3$ as shown in FIG. 21, will specifically be discussed by way of example.

Figure 22A:
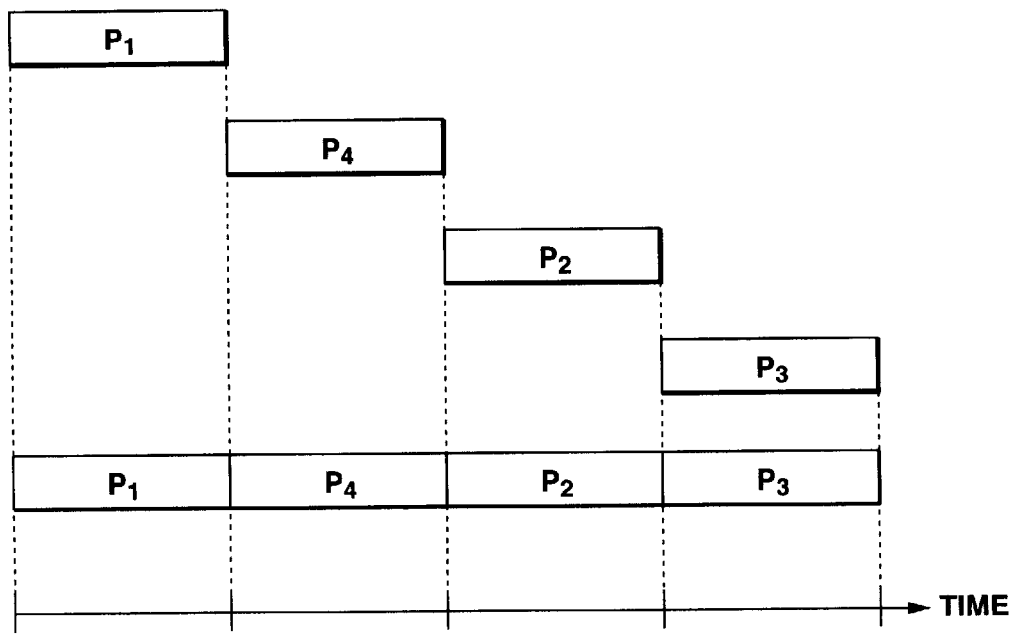
FIG. 22A shows the relation between a page and package after a new page is inserted between arbitrary pages with the "INS" mode selected.
Figure 22B:
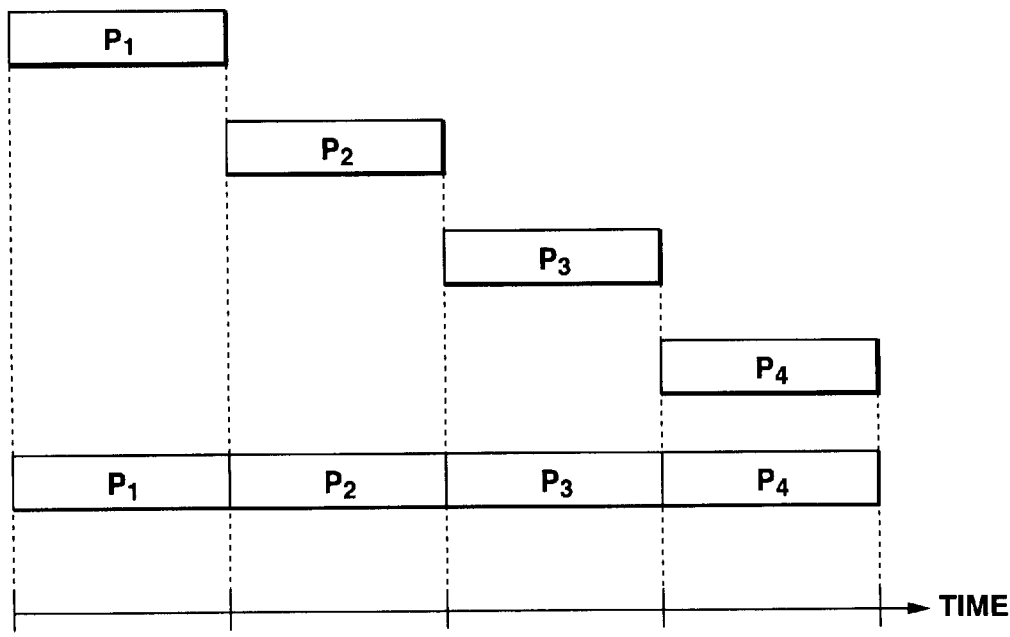
FIG. 22B shows the relation between the page and package after page numbers are automatically changed by the auto renumbering function after the new page has been inserted between arbitrary pages with the "INS" mode selected.

In the AN server 1, when the user presses the edition start switch 162 after having pressed the insertion mode select switch 165 to select the "INS" mode, the page $P_4$ is inserted at a nearest edition point after the IN point in the recorder of the page $P_4$ along the time base as shown in FIG. 22A, IN and OUT points in the recorders of the pages $P_2$, $P_3$ and $P_4$, respectively, are automatically changed correspondingly, and the auto renumbering function is performed to automatically renumber the pages $P_2$, $P_3$ and $P_4$. Thus the pages numbers are rearranged in the temporal order as shown in FIG. 22B.

Figure 23A:
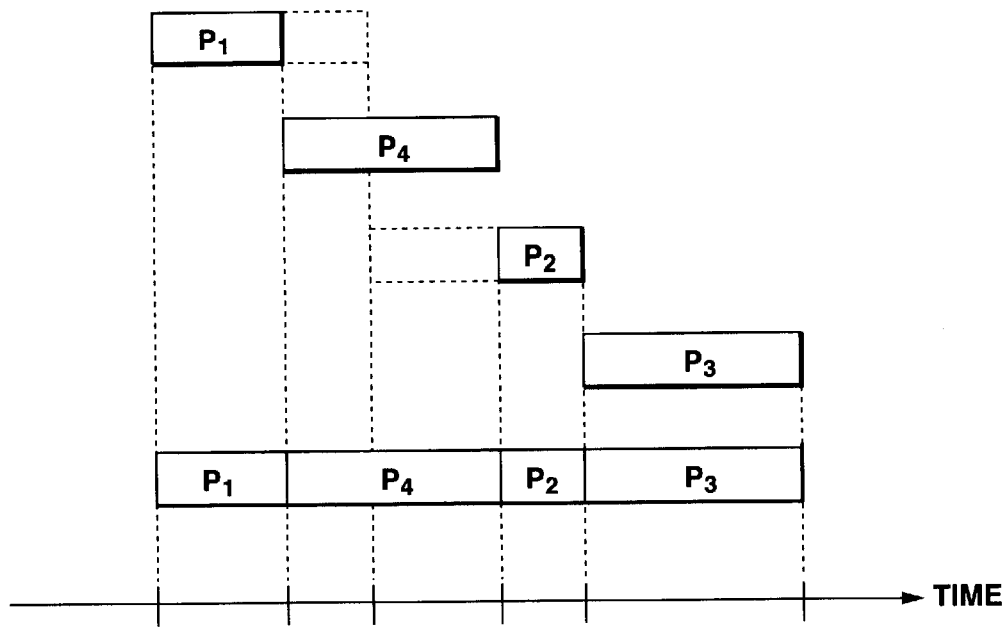
FIG. 23A shows the relation between a page and package after a new page is inserted between arbitrary pages with the "OVL" mode selected.
Figure 23B:
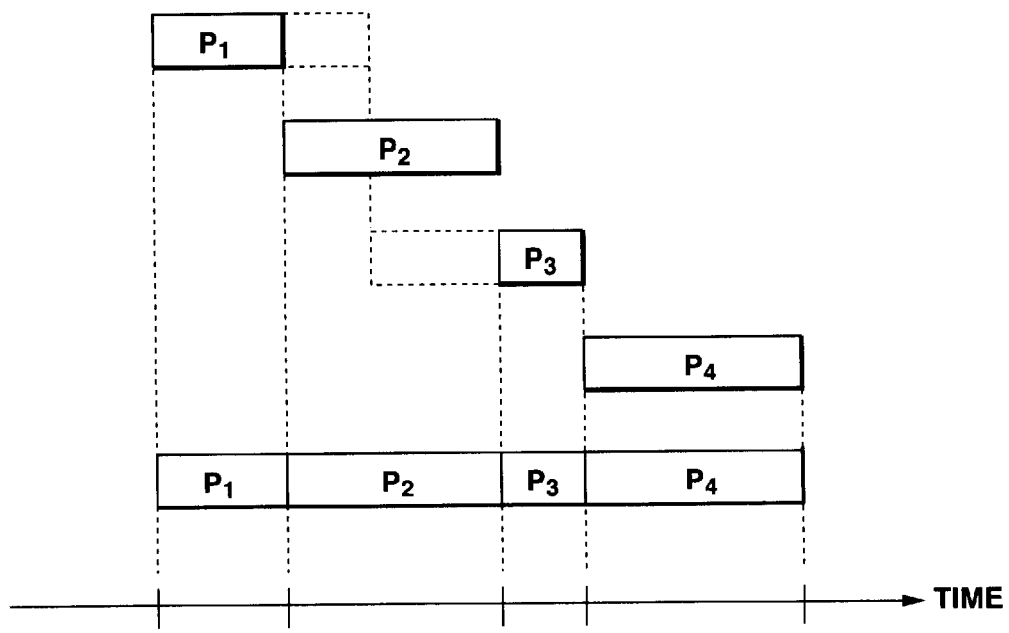
FIG. 23B shows the relation between the page and package after page numbers are automatically changed by the auto renumbering function after the new page has been inserted between arbitrary pages with the "OVL" mode selected.

At the A/V server 1, when the user presses the edition start switch 162 after having pressed the insertion mode select switch 165 to select the "OVL" mode, the page $P_4$ is inserted depending upon the IN and OUT points in the recorder of the page $P_4$ as shown in FIG. 23A, the duration of both the pages $P_1$ and $P_2$ is shortened correspondingly, edition points in the recorders of the pages $P_1$, $P_2$ and $P_3$, respectively, are automatically changed, and the auto renumbering function is performed to automatically change the page numbers of the pages $P_2$, $P_3$ and $P_4$, respectively, as shown in FIG. 23B. Thus, the page numbers are arranged in the temporal order. Therefore, in the A/V server 1, when the "OVL" mode is selected, the length of the destination data will not be changed before and after the edition is effected.

Thus in the A/V server 1, a new page can be inserted between arbitrary pages.

Figure 24:
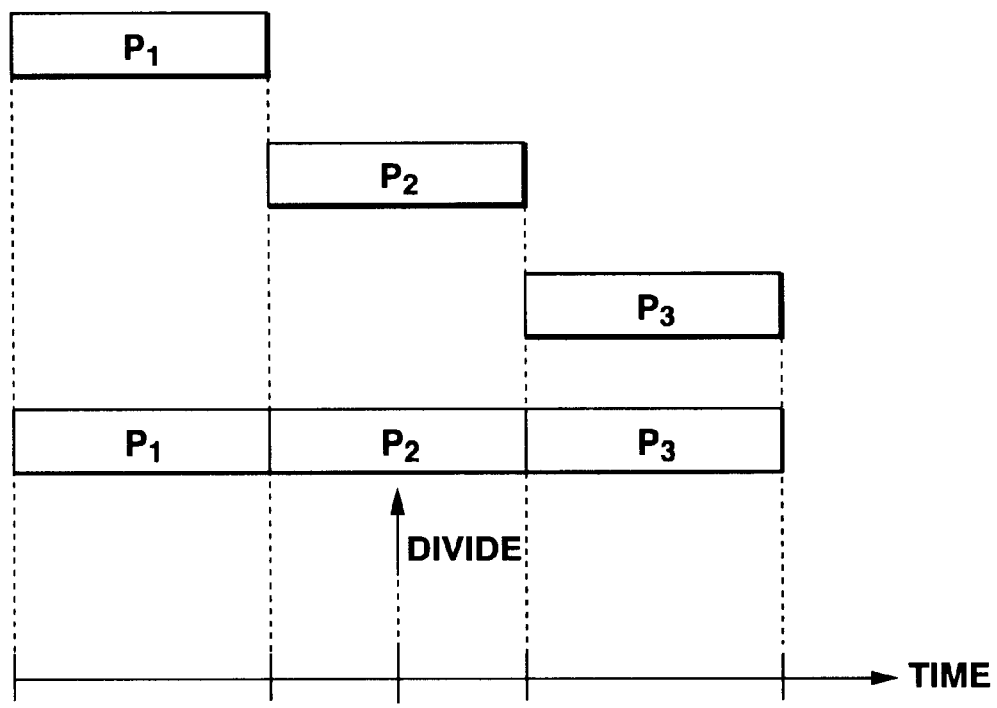
FIG. 24 shows the relation between a page and package before an arbitrary page is divided.
Figure 25A:
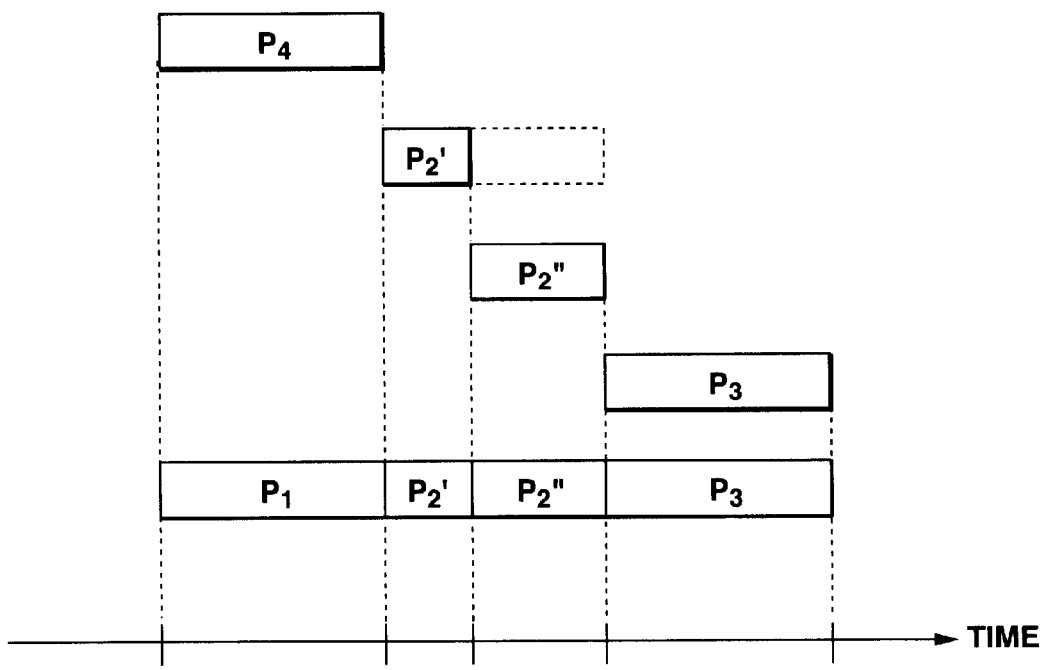
FIG. 25A shows the relation between the page and package after the arbitrary page is divided.
Figure 25B:
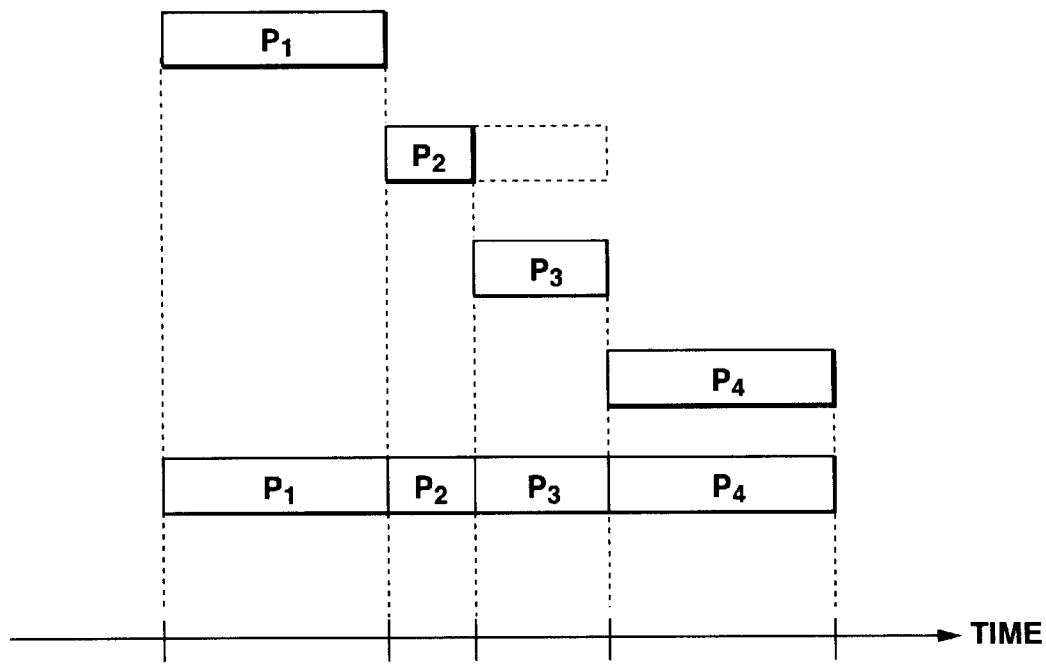
FIG. 25B shows the relation between the page and package after the page numbers are automatically changed by the auto renumbering function after the arbitrary page has been divided.

Also, in the A/V server 1, the auto renumbering function can be used to divide an arbitrary page into two during an edition in units of page as at step S10. Here, division of a page $P_2$ of page data consisting of pages $P_1$, $P_2$ and $P_3$ into two as shown in FIG. 24 will be discussed by way of example. In this case, at the A/V server 1, when the user presses the backspace switch 167 or forward-space switch 168, the page $P_2$ to be divided is displayed on the display screen 180. Next at the A/V server 1, when the user turns the search dial 170, an image at a position where it is desired to divide is cued up. Then at the A/V server 1, when the user presses a divide switch (not shown), the page $P_2$ is divided into pages $P_2$' and $P_2$" at the designated position as shown in FIG. 25A. Correspondingly, the IN and OUT points in the recorders of the pages $P_2$', $P_2$" and $P_3$, respectively, are automatically changed and generated, and the auto renumbering function is performed to automatically renumber the pages $P_2$', $P_2$" and $P_3$, respectively. Thus, the page numbers of the pages $P_1$, $P_2$, $P_3$ and $P_4$ respectively are arranged in the temporal order as shown in FIG. 25B.

In the A/V server 1, an arbitrary page can be divided in this way.

Figure 26:
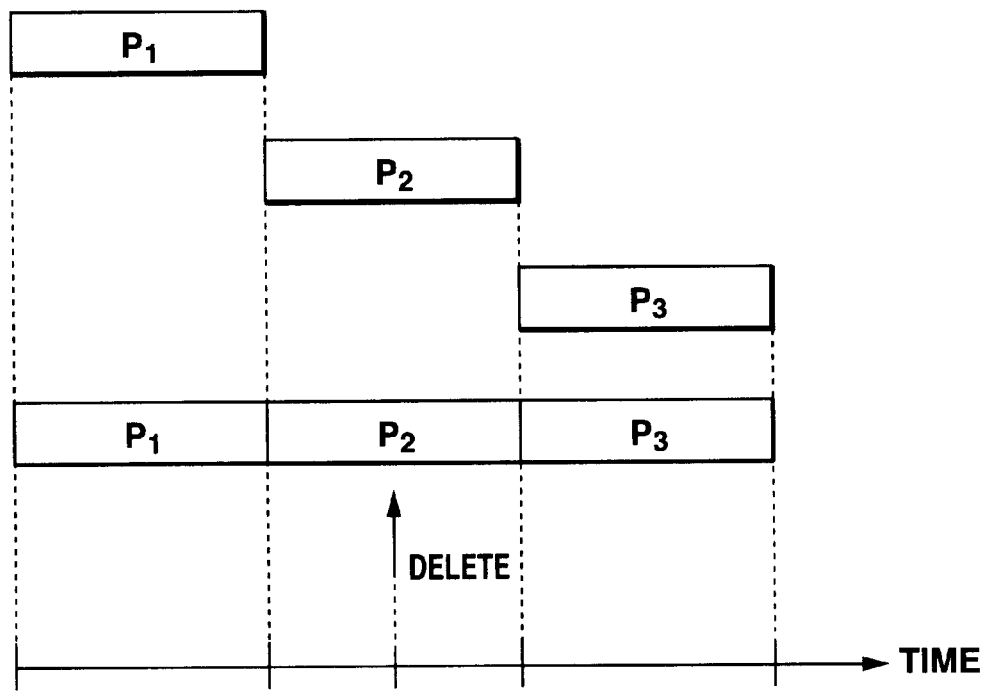
FIG. 26 shows the relation between a page and package before an arbitrary page is deleted.
Figure 27A:
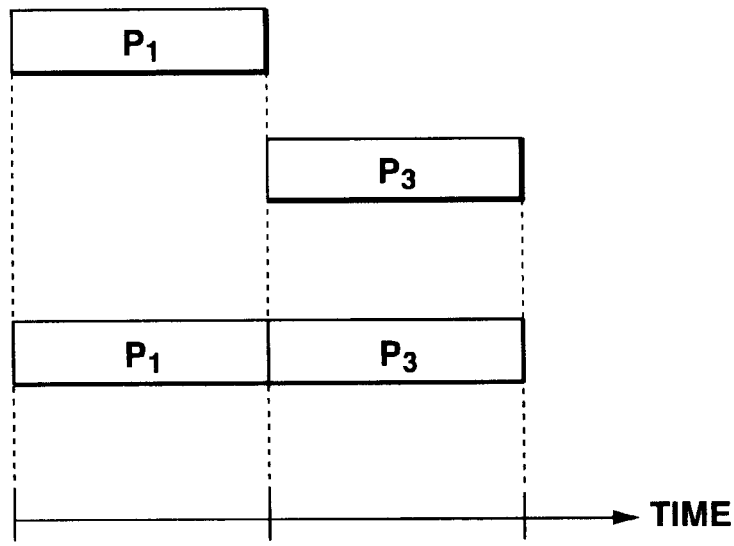
FIG. 27A shows the relation between the page and package after the arbitrary page is deleted.
Figure 27B:
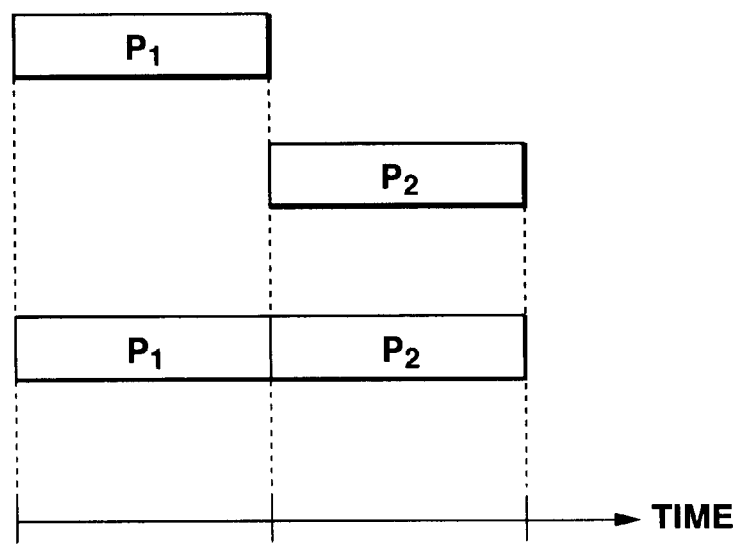
FIG. 27B shows the relation between the page and package after the page numbers are automatically changed by the auto renumbering function after the arbitrary page has been deleted.

Further in the A/V server 1, the auto renumbering function can be used to delete an arbitrary page during an edition in units of page as at step S10. Deletion of the page $P_2$ of page data consisting of three pages $P_1$, $P_2$ and $P_3$ as shown in FIG. 26 will specifically be discussed by way of example. In this case, when the user presses the backspace switch 167 or forward-space switch 168 on the control panel 80 of the A/V server 1, the page $P_2$ to be deleted is displayed on the display screen 180. Next, when the user presses a delete switch (not shown) provided in the A/V server 1, the edition start switch 162 and preview start switch 163 flicker. In the A/V server 1, when the user presses the preview start switch 163 as necessary, preview is done as at step S5. Then when the user presses the edition start switch 162, the page $P_2$ is deleted as shown in FIG. 27A. Correspondingly, IN and OUT points in the recorder of the page $P_3$ are automatically changed and generated. As shown in FIG. 27B, the auto renumbering function is performed to automatically change the page numbers of the pages $P_1$ and $P_2$, respectively, and the page numbers are arranged in the temporal order.

The arbitrary page can thus be deleted in the A/V server 1.

Figure 28:
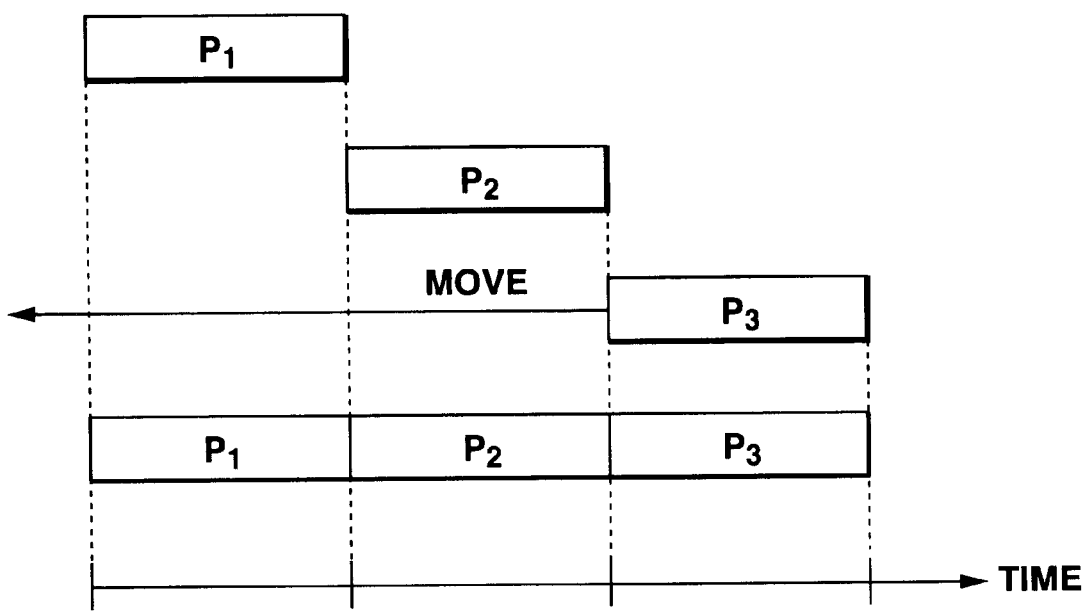
FIG. 28 shows the relation between a page and package before an arbitrary page is moved.
Figure 29A:
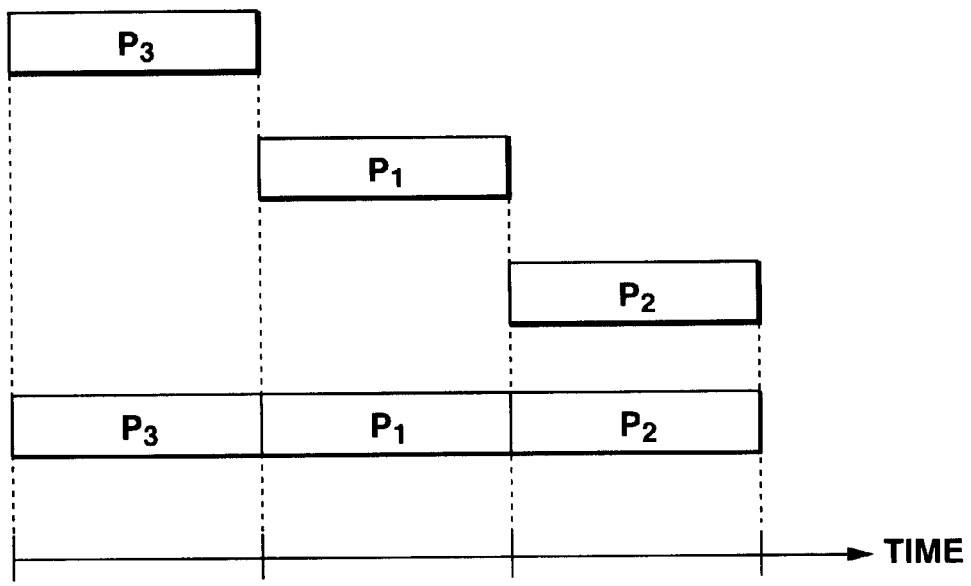
FIG. 29A shows the relation between the page and package after the arbitrary page is moved.
Figure 29B:
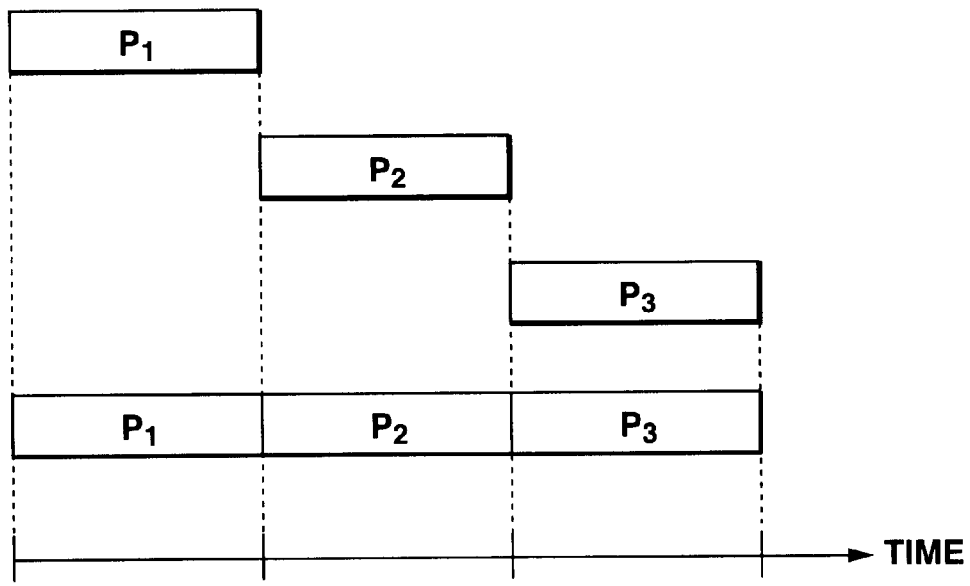
FIG. 29B shows the relation between the page and package after page numbers are automatically changed by the auto renumbering function after the arbitrary page has been moved.

Furthermore in the A/V server 1, the auto renumbering function can be used to move an arbitrary page during an edition in units of page as at step S1. Move of the page $P_3$ of page data consisting of three pages $P_1$, $P_2$ and $P_3$ to before the page $P_1$ as shown in FIG. 28 will specifically be discussed by way of example. In this case, first a page to be moved is deleted in the A/V server 1 as in the above. Next, when the user pressed the backspace switch 167 or forward-space switch 168 of the A/V server 1, a page immediately after a position to which it is desired to move the deleted page, namely, the page $P_1$, is displayed on the display screen 180. When it is desired to move the deleted page for example to the end of the page data, an end blank page is displayed on the display screen 180. Next, when the user pressed a paste switch (not shown) provided in the A/V server 1, the edition start switch 162 and preview start switch 163 flicker. At the A/V server 1, when the user presses the preview start switch 163 when necessary, preview is done as at step S5. Then, when the user presses the edition start switch 162, the page $P_3$ is moved to before the page 1 as shown in FIG. 29A. Correspondingly, IN and OUT points in the recorders of the pages $P_1$, $P_2$ and $P_3$, respectively, are automatically changed and generated. As shown in FIG. 29B, the auto renumbering function is performed to automatically change the page numbers of the pages $P_1$, $P_2$ and $P_3$, respectively, and the page numbers are arranged in the temporal order.

In the A/V server 1, an arbitrary page can thus be moved.

As in the above, the A/V server 1 effects the edition to produce edit data pages, and sends a VFL based on the edit data pages from the control panel 80 to the main body of the A/V server 1. Thus, data to be edited can be outputted without being recorded in the HDDs $120_1$, $120_2$, ..., $120_{n-3}$, $120_{n-2}$, $120_{n-1}$ and $120_n$.

When an external device such as VTR which records and plays back video/audio data to and from a tape (not shown), for example, being a non-linear recording medium is connected to the A/V server 1 and the video/audio data recorded in the tape in the VTR is edited as material data, major operations to be effected for the edition of the video/audio data by operating the various switches provided on the control panel 80 are as follows. Note that in this case, the VTR operates under the control of various commands sent from the control panel 80. More specifically, the commands sent from the control panel 80 are supplied to the CPU 53 of the editing manager 50 and sent from the CPU 53 to the VTR via the I/F 52. Processing of the video/audio data for one page will be described below.

In the A/V server 1, an external device is designated as a player device and also a recorder device is designated.

Assume here that the VTR which supplies played-back video/audio data to the input terminal 18 of the recording port 10 is a player port and the playback port 30 is a recorder port. In this case, when the user presses the first external device select 152a for the VTR and playback select switch 153 on the control panel 80 of the A/V server 1 at the same time, the VTR is designated as the player port. Also, when the user presses the playback port select switch 151c for the playback port 30 and recording select switch 154 on the control panel 80 of the A/V server 1 at the same time, the playback port 30 is designated as the recorder port. These switches are illuminated when pressed. With the above operations, "EXT1" indicating VTR is indicated in the PLAYER port indicator 184 in the display screen 180 of the control panel shown in FIG. 10 and "P2" is indicated in the RECORDER port indicator 186.

Next in the A/V server 1, edition points are set. At this time, the source data name indicator 185 in the display screen 180 of the control panel 80 is blank, and the destination data name indicator 187 indicates a predetermined name. Note that the name indicated in the destination data name indicator 187 can subsequently be changed to an arbitrary one.

At the A/V server 1, the user first press the playback select switch 153 to designate the VTR as the current port. On the display screen 180 of the control panel 80, "EXT1" indicating the VTR is indicated in the current port indicator 181.

Then, at the A/V server 1, the user sets edition points for the material data recorded in the tape in the VTR. At this time, the user presses the playback select switch 157 or the like on the control panel 80 of the A/V server 1 to control the VTR to play back the material data and input the played-back material data to the recording port 10, and output the entered material data to the monitor (not shown) from the output terminal 54 via the editor 51. While watching the monitor, the user searches an IN point. At a desired point, the user operates the cursor move rotary encoder 171 to move the cursor onto the IN point indicator 189 and enter a time code to a dialog box displayed by pressing the dialog box display switch (not shown) to set an IN point. Then, the user searches an OUT point. At a desired point, the user operates the cursor move rotary encoder 171 to move the cursor onto the OUT point indicator 190 and enter a time code to a dialog box displayed by pressing the dialog box display switch (not shown) to set an OUT point.

When the edition points have been set, the time code for the set IN point is indicated in the IN point indicator 189, and that for the set OUT point is indicated in the OUT point indicator 190. When each of the IN and OUT points is set, the time code for it is indicated in the current time indicator 183. Further, when both the IN and OUT points have completely been set, a duration is indicated in the duration indicator 191.

At the A/V server 1, after setting the edition points for the material data recorded in the tape in the VTR as in the above, the user presses the recording select switch 154 to designate the playback port 30 as the current port ad set edition points for data to be produced as at step S4 in FIG. 13.

At the A/V server 1, when three of the IN and OUT points of the player and recorder ports, respectively, are set, the edition start switch 162 and preview start switch 163 flicker to indicate when the edition and preview can be effected. In the A/V server 1, when the edition points are thus set, the controller 195 of the control panel 80 produces page data as shown in FIG. 17 for example and holds it in the memory 197. That is, the page data thus produced consists of "P2" indicating the playback port 30 as the device name in the recorder, "File2", for example, as the file name in the recorder, information about the set IN and OUT points, "EXT1" indicating the VTR as the device name in the player, and information about the set IN and OUT points. The file name in the player is blank. Also in the A/V server 1, after the above steps of operation have been done, internal status information as shown in FIG. 15 is generated.

Next, an edition section is previewed as necessary in the A/V server 1. At the A/V server 1, when the user presses the preview start switch 163, the preview is started. At the A/V server 1, the preview start switch 163 is illuminated during the preview.

At the control panel 80, when the user presses the preview start switch 163, the controller 195 reads out the page data shown in FIG. 30 from the memory 197, converts the page data to a VFL by the I/F 196, and sends, to the main body of the A/V server 1, the VFL along with preview commands including various command which will further be described later and information about provisional file name automatically generated. Note that the file name information is held also in the memory 197.

In the A/V server 1, the I/F 92 of the timing manager 90 receives the VFL, preview command and file name information and sends the VFL and file name information to the file management block 101 of the file manager 100 where they will provisionally be stored (buffered) or via the file management block 101 to the HDD array 110 where they will be written, while sending the preview command to the CPU 53 of the editing manager 50. In this case, the preview command consists of a command for cue-up to the pre-roll point, a command for playback of the data, commands to stop data recording and playback at the post-roll point, and command for recording the data in the HDD $120_1$, $120_2$, . . . , $120_{n-3}$, $120_{n-2}$, $120_{n-1}$ and $120_n$. In the A/V server 1, the phase of the VTR is modified by the editor 51 based on the VFL and command to operate the VTR.

More specifically, in the A/V server 1, the CPU 53 sends the cue-up and playback commands received from the control panel 80 to the VTR which will thus cue up to the pre-roll point and play back the material data, and input the material data to the recording port 10. In the A/V server 1, the played-back material data is inputted to the editor 51 and outputs it from the output terminal 54 to the monitor (not shown). Then, in the A/V server 1, after a preset time passes from the pre-roll point, the CPU 53 sends the record command received from the control panel 80 o the CPU 17 of the recording port 10, thereby starting recording of the material data. The recording of the material data is started after the playback in the VTR starts and playback output becomes stable and before the IN point is reached. Also in this case, the A/V server 1 of course delivers the played-back material data from the output terminal 54 to the monitor. In a preset time from the OUT point in the material data, the A/V server 1 sends the material data recording stop command from the CPU 53 to the CPU 17 of the recording port 10 to stop the recording of the material data. Before the material data reaches the post-roll point, the A/V server 1 sends the material data playback stop command from the CPU 53 to the VTR to stop the playback of the material data. At this time, the relation in operation between the VTR and recording port 10 is as shown in FIG. 31. Thus, the A/V server 1 records the material data recorded in the VTR into the HDDs $120_1$, $120_2$, . . . , $120_{n-3}$, $120_{n-2}$, $120_{n-1}$ and $120_n$ for a time including a margin of a predetermined length to before the IN point, a time period from the IN point to the OUT point and a margin of the predetermined length to after the OUT point. The predetermined length of time is set taking in consideration a range expected to be changed during fine adjustment of the edition points. At this time, the material data recorded in the HDDs $120_1, 120_2, \ldots, 120_{n-3}, 120_{n-2}, 120_{n-1}$ and $120_n$ is given a file name generated by the control panel 80.

Figures 30, 31:
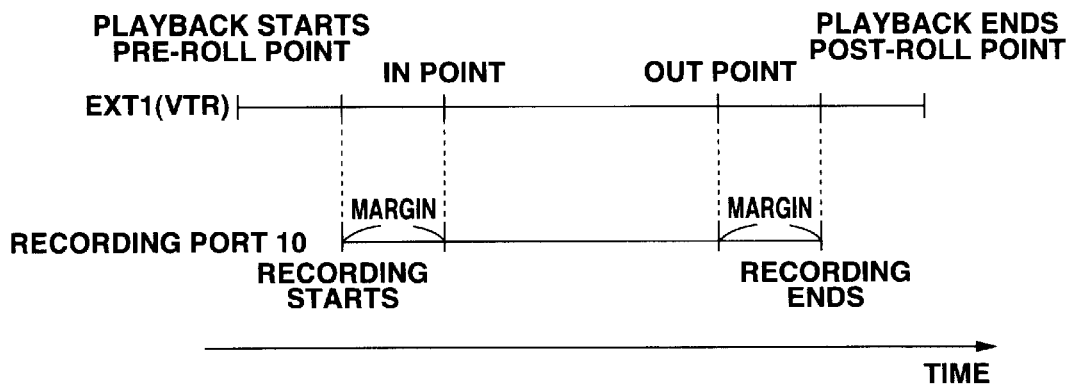
FIG. 30 shows an example of page data produced in the A/V server in FIG. 1, explaining the page data when VTR being an external device is designated as player port.
FIG. 31 shows the relation in operation between VTR and recording port when a first preview is made at the A/V server in FIG. 1.

In the A/V server 1, when a preview is done as in the above, the controller 195 of the control panel 80 automatically changes the page data shown in FIG. 30, generates page data as shown in FIG. 32 and holds it in the memory 197. That is, in the page data thus generated, the variety of information in the recorder is not changed but the device name in the player is changed from "EXT1" to "P1" indicating the playback port 20, and the file name in the player is changed from blank to a file name given to the material data recorded in the HDDs $120_1, 120_2, \ldots, 120_{n-3}, 120_{n-2}, 120_{n-1}$ and $120_n$, for example, "FileX". Also, with the above operations, the internal status information as shown in FIG. 15 is also changed in the A/V server 1.

Namely, the A/V server 1 automatically changes the page data generated from video/audio data recorded in the VTR to one generated from the internal material data recorded in the HDDs $120_1, 120_2, \ldots, 120_{n-3}, 120_{n-2}, 120_{n-1}$ and $120_n$.

In the A/V server 1, after the edition section is previewed as in the above, the edition is effected and the result of the edition is checked as at steps S7 and S8 in FIG. 13. At this time, in the A/V server 1, when the edition is effected, the page data as shown in FIG. 32 is converted by the I/F 196 to a VFL, and the VFL is sent along with the edition commands including those having been described in the foregoing to the main body of the A/V server 1. Namely, the A/V server 1 effects the edition using the material data recorded in the HDDs $120_1, 120_2, \ldots, 120_{n-3}, 120_{n-2}, 120_{n-1}$ and $120_n$ without access to the VTR. Note that when no previewed is done before the edition is effected and the result of the edition is checked, the A/V server 1 will record the material data recorded in the VTR into the HDDs $120_1, 120_2, 120_{n-3}, 120_{n-2}, 120_{n-1}$ and $120_n$ as in the above for effecting the edition and checking the result of the edition.

When the video/audio data recorded in the VTR is used as material data in the A/V server 1, it is recorded in the HDDs $120_1, 120_2, \ldots, 120_{n-3}, 120_{n-2}, 120_{n-1}$ and $120_n$ in units of page for the first access to the VTR and the page data is changed taking the external material data recorded in the VTR as internal material data, so that for subsequent access to the same page, access can be made to the HDDs $120_1, 120_2, 120_{n-3}, 120_{n-2}, 120_{n-1}$ and $120_n$ without access to the VTR.

For more detailed description, correction of edition points in a page edited using the external material data recorded in the VTR will be described below. At the A/V server 1, the user operates the trimmer (not shown) provided on the control panel 80 while pressing the IN point designate switch 160 or OUT point designate switch 161 to elaborately correct the edition points. In the A/V server 1, as the trimmer is operated, a time code indicated in the current time indicator 183, IN point indicator 189 or OUT point indicator 190 changes frame by frame. At this time, the A/V server 1 does not access data corresponding to an object page recorded in the VTR but data including margins, recorded in the HDDs $120_1, 120_2, \ldots, 120_{n-3}, 120_{n-2}, 120_{n-1}$ and $120_n$. In the A/V server 1, since the data recorded in the HDDs $120_1, 120_2, \ldots, 120_{n-3}, 120_{n-2}, 120_{n-1}$ and $120_n$ includes margins, a stamp picture of data of the current port in the time code indicated in the IN point indicator 189 and a one of data of the current port in the time code indicated in the OUT point indicator 190 can be indicated in the IN point stamp picture indicator 193 and OUT point stamp picture indicator 194, respectively, correspondingly to the operations of the trimmer. Thus, at the A/V server 1, the user can correct, by increasing or decreasing, the time codes of the edition points while watching the stamp pictures indicated in the IN and OUT point stamp picture indicators 193 and 194.

Thus in the A/V server 1, when data recorded in the external VTR is taken as material data for a desired page, it can be edited using the data recorded in the HDDs $120_1, 120_2, \ldots, 120_{n-3}, 120_{n-2}, 120_{n-1}$ and $120_n$ after access is made to the VTR once. So, a high speed edition can be done with no access to the VTR.

Next, operations effected by the control panel 80 for the main body of the A/V server 1 during the aforementioned sequence of editing operations will further be described with reference to the flow chart in FIGS. 33 to 39. Note that the relation between the internal status information shown in FIG. 15 and the aforementioned sequence of editing operations will also be described.

Figure 33:
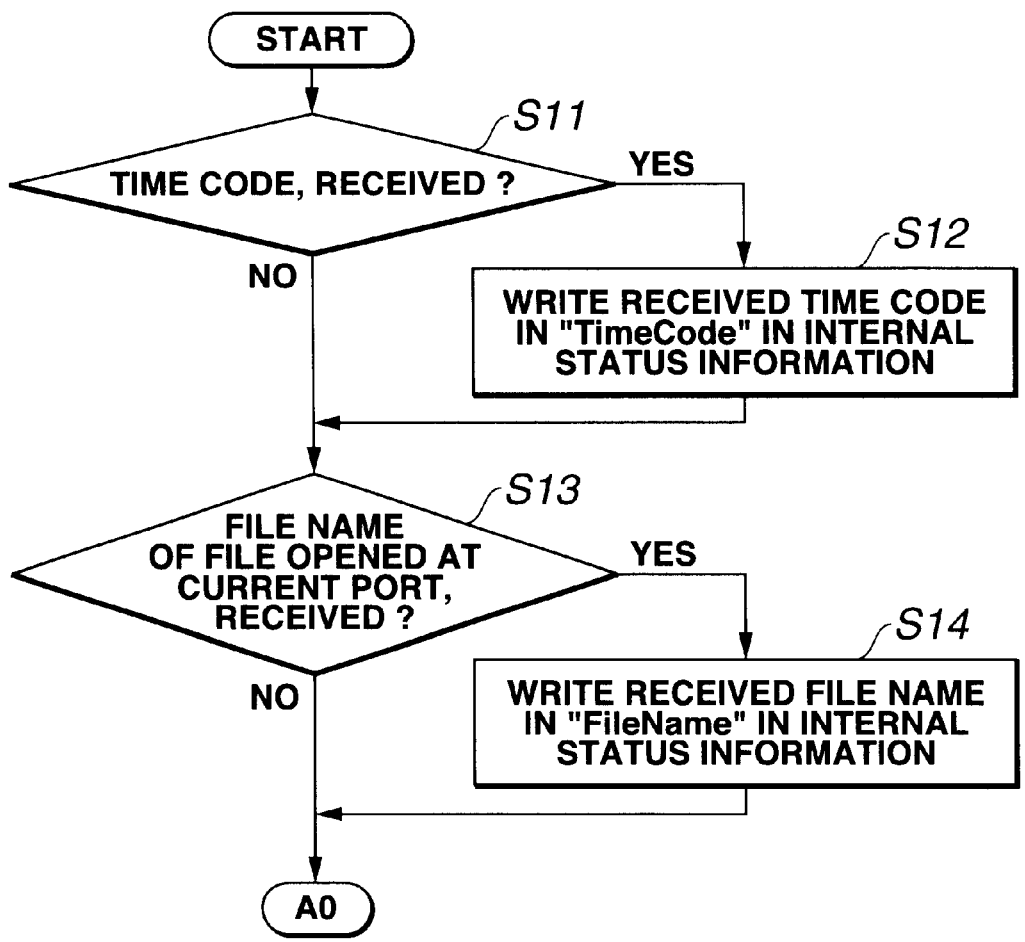
FIG. 33 is a flow chart of operations effected during a sequence of editing operations in the control panel provided in the A/V server in FIG. 1, explaining the operations effected when a time code and file name are received.

First, when the control panel 80 has received a time code for data from the main body of the A/V server 1 at step S11 in FIG. 33, it goes to step S12 where it will write the received time code in "TimeCode" in the internal status information and save it in the memory 197. On the other hand, if it is determined at step S11 that the control panel 80 has received no time code from the main body of the A/V server 1, the content of the internal status information is not changed.

When the control panel 80 of the A/V server 1 has received a file name of a file opened in the current port from the main body of the A/V server 1 at step S13, it goes to step S14 where it will write the received file name in "FileName" in the internal status information and save it in the memory. On the other hand, if it is determined at step S13 that the control panel 80 has received no file name from the main body of the A/V server 1, the content of the internal status information is not changed. information is not changed.

Figure 34:
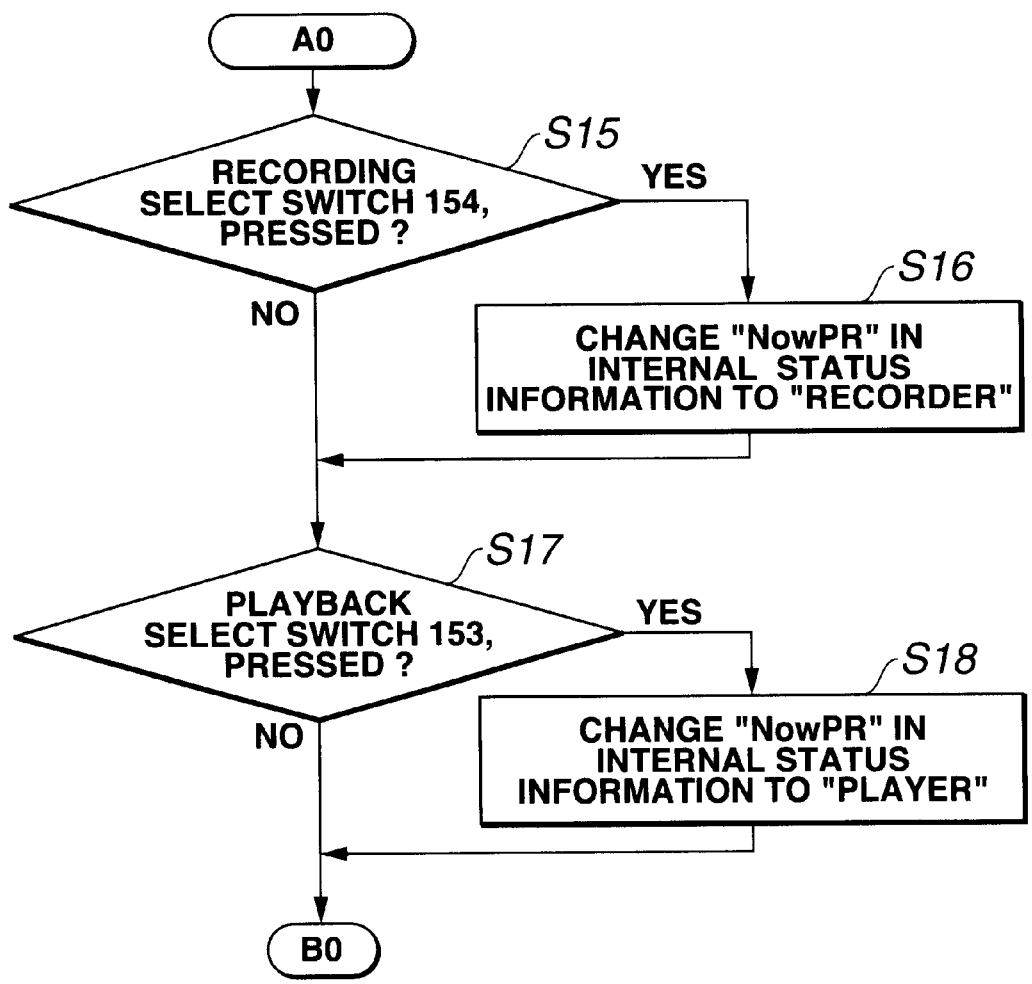
FIG. 34 is a flow chart of operations effected during a sequence of editing operations in the control panel of the A/V server in FIG. 1, explaining the operations effected when a recorder and player are designated.

Further, if the user presses the recording select switch 154 on the control panel 80 of the A/V server 1 at step S15 in FIG. 34, the control panel 80 goes to step S16 where it will change "NowPR" in the internal status information to RECORDER (recorder port) and save it in the memory 197, and inform the file management block 101 at the main body of the A/V server 1 that the recording select switch 154 has been pressed by the user. On the other hand, if the recording select switch 154 has not been pressed by the user at step S15, the content of the internal status information will not be changed.

If the playback select switch 153 on the control panel 80 of the A/V server 1 is pressed by the user at step S17, the control panel 80 goes to step S18 where it will change "NowPR" in the internal status information to PLAYER (player port) and save it in the memory 197, and inform the file management block 101 at the main body of the A/V server 1 that the playback select switch 153 has been pressed by the user. On the other hand, if the playback select switch 153 has not been pressed by the user at step S17, the content of the internal status information will not be changed.

Figure 35:
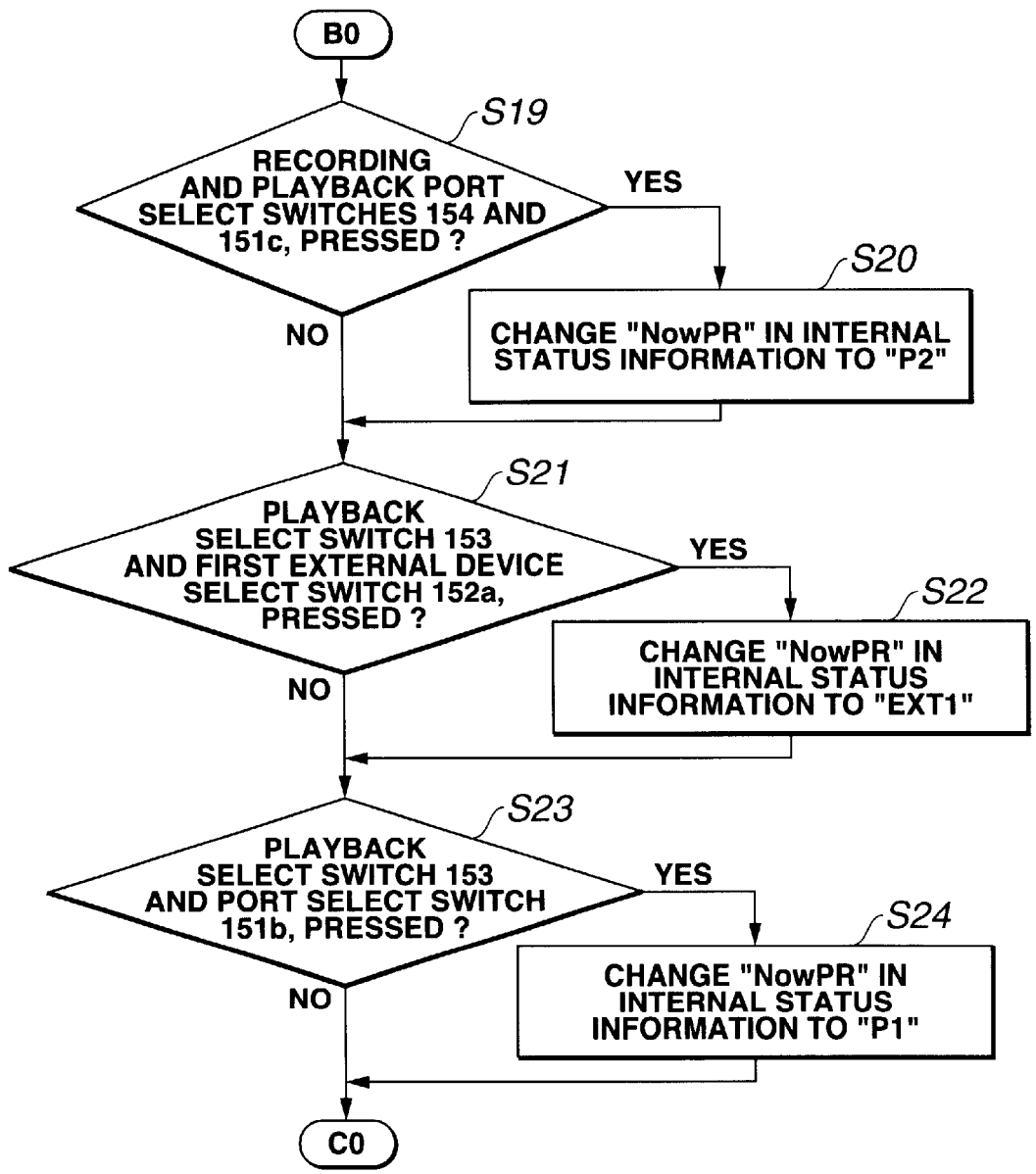
FIG. 35 is a flow chart of operations effected during a sequence of editing operations in the control panel of the A/V server in FIG. 1, explaining the operations effected when a recorder and player and their ports are designated.

If the recording select switch 154 and playback port select switch 151c are pressed by the user at the control panel 80 of the A/V server 1 at step S19 in FIG. 35, the control panel 80 goes to step S20 where it will change "NowPort" in the internal status information to the playback port 30 (P2) and save it in the memory 197, and inform the file management block 101 of the main body of the A/V server 1 that the switches have been pressed by the user. On the other hand, if the switches have not been pressed at step S19, the content of the internal status information will not be changed.

If the playback select switch 153 and first external device select switch 152a are pressed by the user at the control panel 80 of the A/V server 1 at step S21, the control panel 80 goes to step S22 where it will change "NowPort" in the internal status information to the first external device (EXT1) and save it in the memory 197, and inform the file management block 101 of the main body of the A/V server 1 that the switches have been pressed by the user. On the other hand, if the switches have not been pressed at step S21, the content of the internal status information will not be changed.

If the playback select switch 153 and playback port select switch 151b are pressed by the user at the control panel 80 of the A/V server 1 at step 23, the control panel 80 goes to step S24 where it will change "NowPort" in the internal status information to the playback port 20 (P1) and save it in the memory 197, and inform the file management block 101 of the main body of the A/V server 1 that the switches have been pressed by the user. On the other hand, if the switches have not been pressed at step S23, the content of the internal status information will not be changed.

Figure 36:
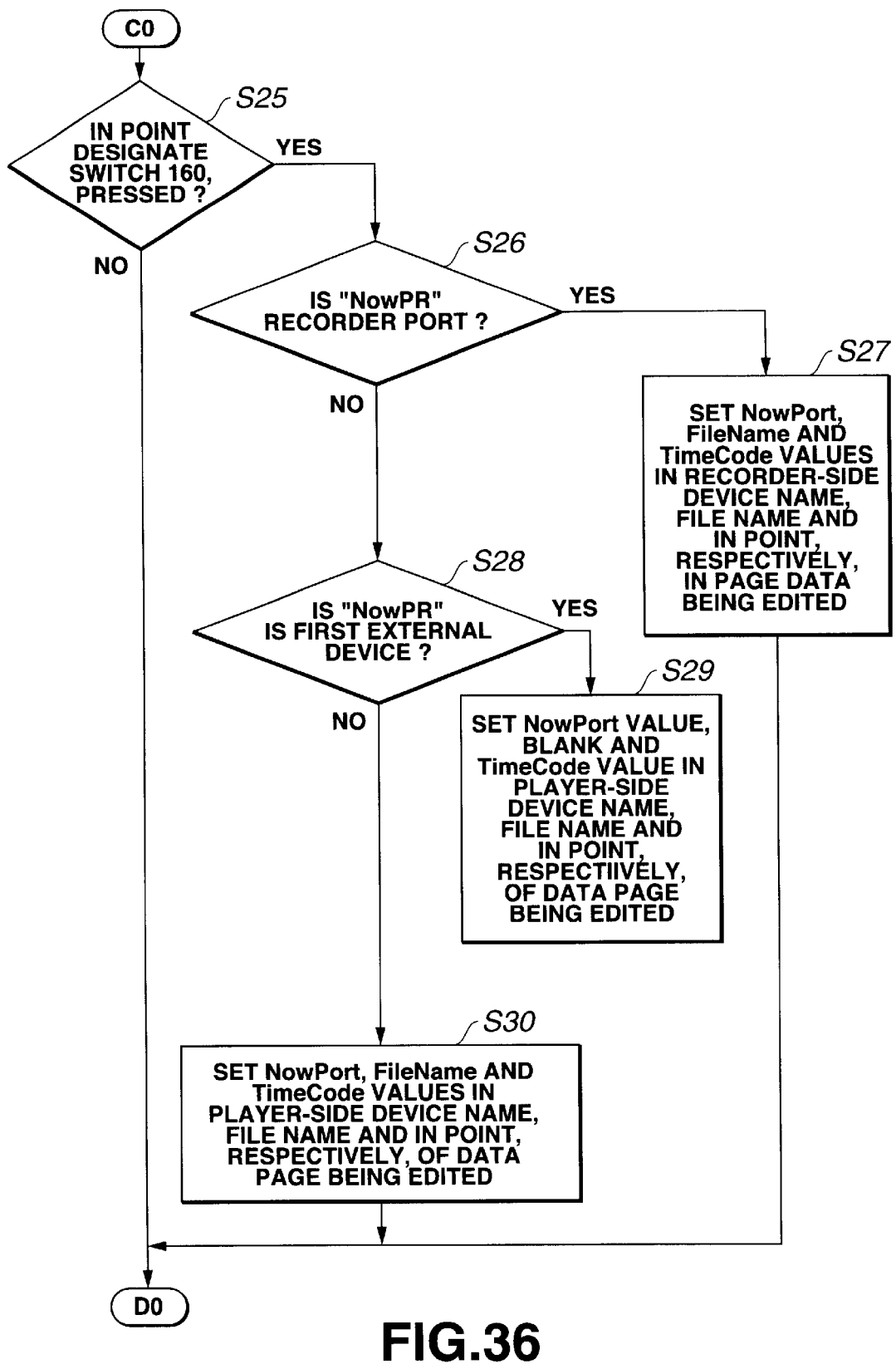
FIG. 36 is a flow chart of operations effected during a sequence of editing operations in the control panel of the A/V server in FIG. 1, explaining the operations effected when an IN point is designated.

If the user presses the IN point designate switch 160 on the control panel 80 of the A/V server 1 at step S25 in FIG. 36, the control panel 80 judges, at step S26, whether "NowPR" in the internal status information is a recorder port.

If "NowPR" in the internal status information is a recorder port, the control panel 80 goes to step S27 where it will set "NowPort", "File Name" and "TimeCode" values in the recorder-side device name, file name and IN point, respectively, of the page data being edited. At this time, the display screen 180 on the control panel 80 displays a content corresponding to the information.

On the other hand, if it is determined at step S26 that "NowPR" in the internal status information is not any recorder port, the control panel 80 will judge, at step S28, whether "NowPR" in the internal status information is the first external device.

If "NowPR" in the internal status information is determined to be the first external device, the control panel 80 goes to step S29 where it will set "NowPort" value in the player-side device name of the page data being edited, blank the player-side file name, and set "TimeCode" in the player-side IN point. At this time, the display screen 180 on the control panel 80 displays a content corresponding to the information.

If it is determined at step S28 that "NowPR" in the internal status information is not the first external device, the control panel 80 goes to step S30 where it will set "NowPort", "FileName" and "TimeCode" values in the player-side device name, file name and IN point, respectively, of the page data being edited. At this time, the display screen 180 on the control panel 80 displays a content corresponding to the information.

If it is determined at step S25 that the IN point designate switch 160 has not been pressed by the user, the page data and information displayed on the display screen 180 will not be changed.

Figure 37:
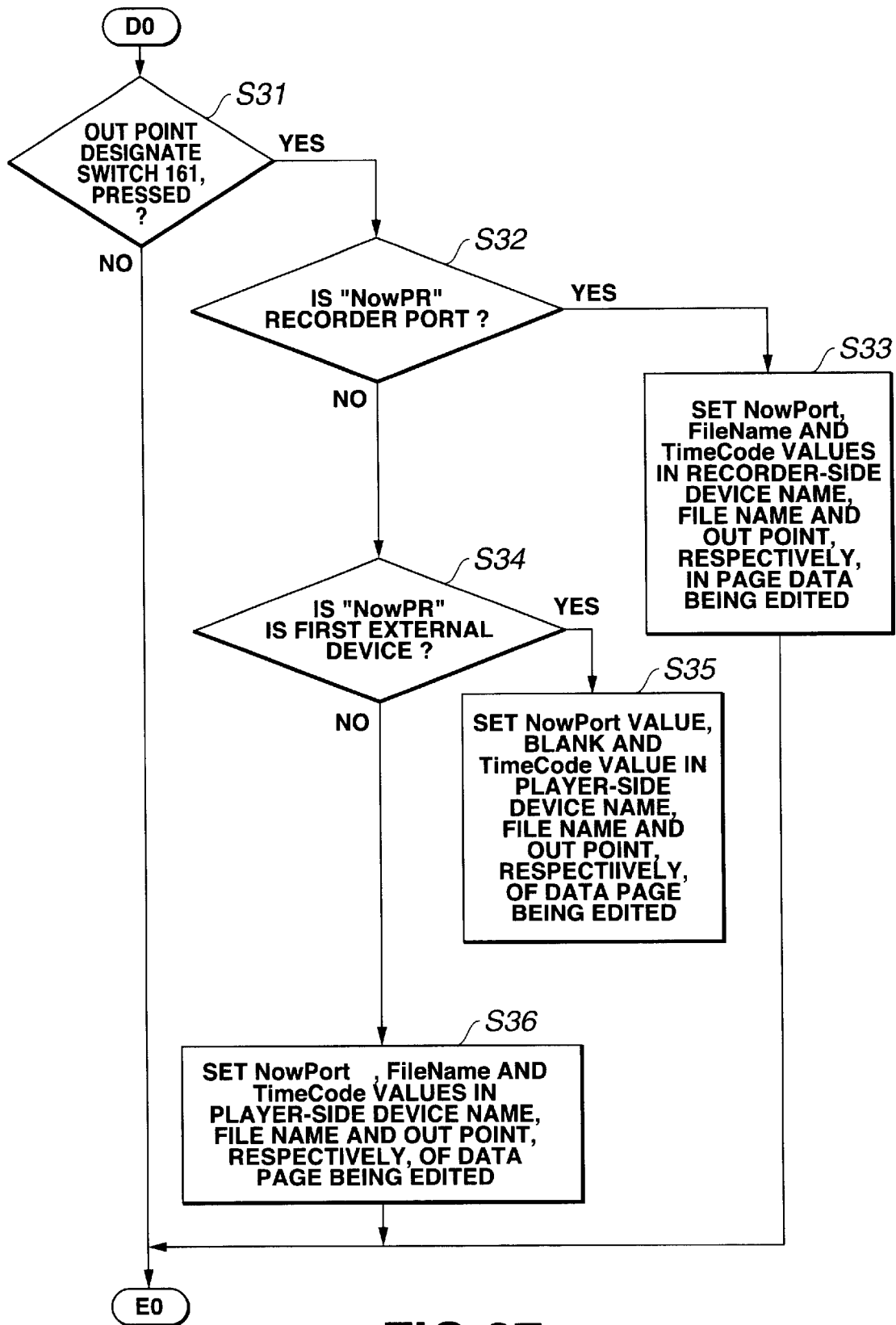
FIG. 37 is a flow chart of operations effected during a sequence of editing operations in the control panel of the A/V server in FIG. 1, explaining the operations effected when an OUT point is designated.

Further, when the OUT point designate switch 161 of the control panel 80 of the A/V server 1 is pressed by the user at step S31 in FIG. 37, the control panel 80 will judge, at step S32, whether "NowPR" in the internal status information is a recorder port.

If "NowPR" in the internal status information is a recorder port, the control panel 80 goes to step S33 where it will set "NowPort", "FileName" and "TimeCode" values in the recorder-side device name, file name and IN point, respectively, of the page data being edited. At this time, the display screen 180 of the control panel 80 will display a content corresponding to the information.

On the other hand, if it is determined at step S32 that "NowPR" in the internal status information is not any recorder port, the control panel 80 will further judge, at step S34, whether "NowPR" in the internal status information is the first external device.

If "NowPR" in the internal status information is the first external device, the control panel 80 goes to step S35 where it will set "NowPort" value in the player-side device name, blank the player-side file name, and set "TimeCode" value in the player-side IN point. At this time, the display screen 180 of the control panel 80 will display a content corresponding to the information.

On the other hand, if it is determined at step S34 that "NowPR" in the internal status information is not the first external device, the control panel 80 goes to step S36 where it will set "NowPort", "FileName" and "TimeCode" values in the player-side device name, file name and IN point, respectively, of the page data being edited. At this time, the display screen 180 on the control panel 80 will display a content corresponding to the information.

Note that the OUT point designated switch 161 has not been pressed at step S31, the page data and information displayed on the display screen 180 will not be changed.

Figure 38:
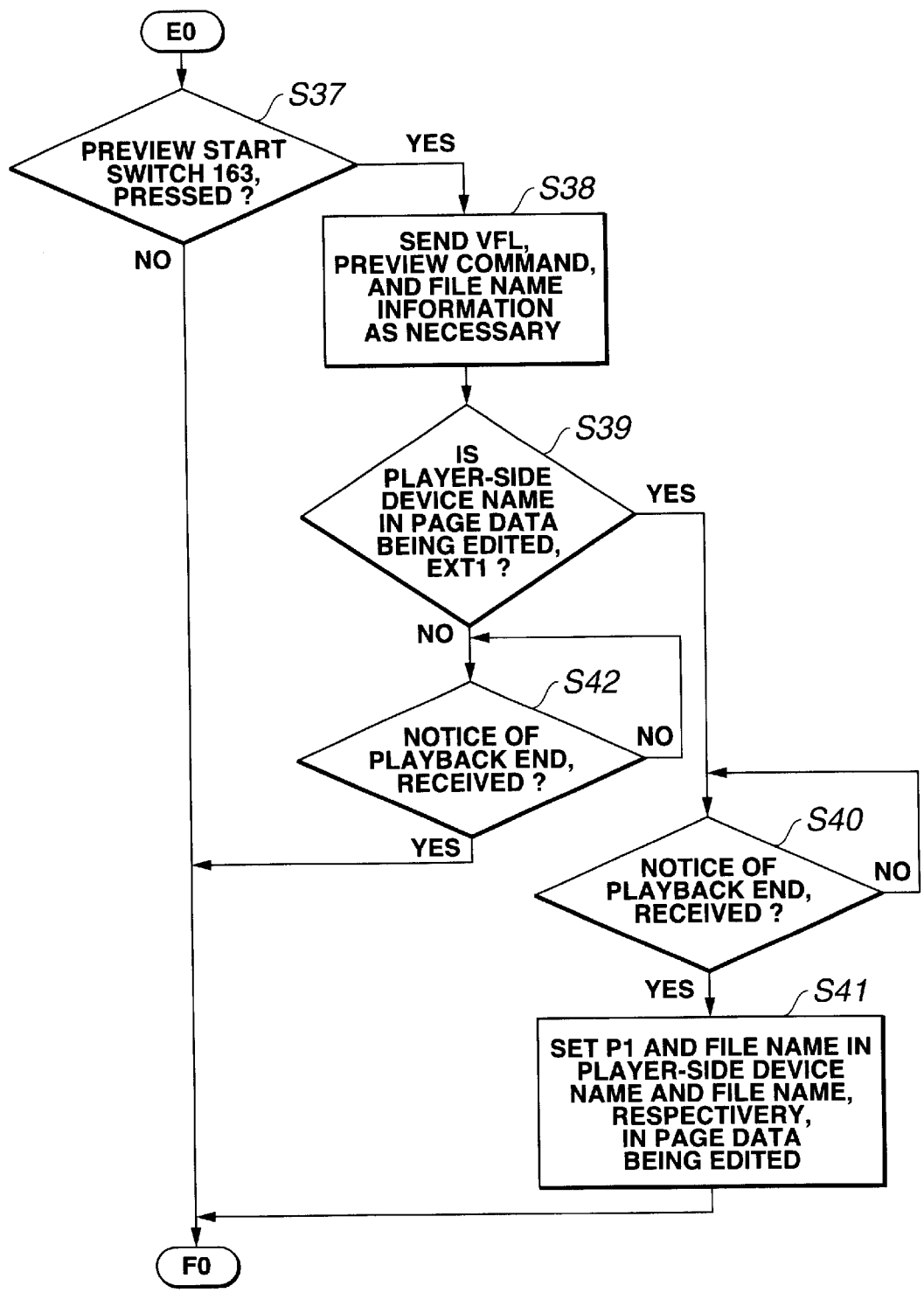
FIG. 38 is a flow chart of operations effected during a sequence of editing operations in the control panel of the A/V server in FIG. 1, explaining the operations effected when a preview is effected.

Further, if the preview start switch 163 on the control panel of the A/V server 1 is pressed by the user at step S37 in FIG. 38, the control panel 80 goes to step S38 where it will send VFL resulted from the conversion of page data, and preview commands to the main body of the A/V server 1 as having been described in the foregoing. The control panel 80 will also send information of a provisional file name to the main body of the A/V server 1 when the player-side device name in the page date being edited is "EXT1" indicating the first external device.

When the player-side device name in the page data being edited is "EXT1" indicating that the first external device, the preview commands include the cue-up, playback, stop and record commands as having been described in the foregoing. If the player-side device name in the page data being edited is not "EXT1", the preview commands will include the cue-up, playback and stop commands as having been described in the foregoing.

At step S39, the control panel 80 will judge whether the player-side device name in the page data being edited is "EXT1".

When the player-side device name in the page data being edited is "EXT1", the control panel 80 will wait at step S40 until it is informed from the CPU 53 provided in the editing manager 50 that the playback of data from the first external device is complete. At step S41, the control panel 80 will set "P1" indicating the playback port 20 in the player-side device name in the page data being edited, and read a produced file name from the memory 197 and set it in the player-side file name.

On the other hand, if it is determined at step S39 that the player-side device name in the page data being edited is not "EXT1", the control panel 80 will wait at step S42 until it is informed from the CPU provided in the port playing back the data that the playback of data is complete.

Figure 39:
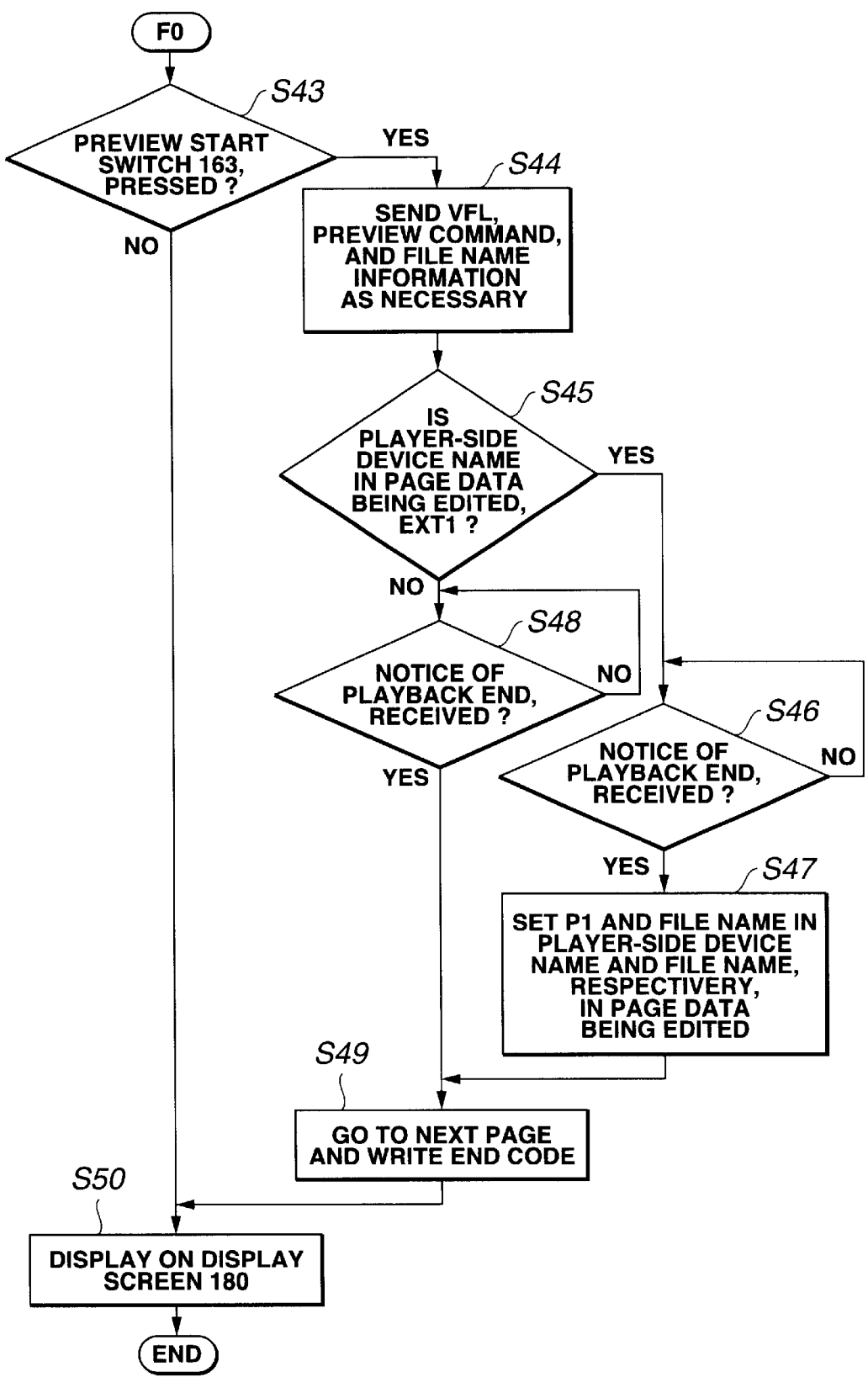
FIG. 39 is a flow chart of operations effected during a sequence of editing operations in the control panel of the A/V server in FIG. 1, explaining the operations effected when an edition is effected.

When the user presses the edition start switch 162 on the control panel 80 of the A/V server 1 at step S43 shown in FIG. 39, the control panel 80 goes to step S44 where it will send VFL resulted from the conversion of page data, and edit commands to the main body of the A/V server 1 as having been described in the foregoing. When the payer-side device name in the page data being edited is "EXT1" indicating the first external device, the control panel 80 will also send information on the provisional file name since no preview has been done.

When the player-side device name in the page data being edited is "EXT1" the edit commands include the cue-up, playback, stop and record commands. If the player-side device name in the page data being edited is not "EXT1", the edit commands include the cue-up, playback and stop commands as having previously been described.

At step S45, the control panel 80 will judge whether the player-side device name in the page data being edited is "EXT1".

When the player-side device name in the page data being edited is "EXT1", the control panel 80 will wait at step S46 until it is informed from the CPU 53 provided in the editing manager 50 that the playback of data from the first external device is complete. At step S47, the control panel 80 will set "P1" indicating the playback port 20 in the player-side device name in the page data being edited, and read a produced file name from the memory 197 and set it in the player-side file name.

On the other hand, if it is determined at step S45 that the player-side device name in the page data being edited is not "EXT1", the control panel 80 will wait at step S48 until it is informed from the CPU provided in the port playing back the data that the playback of data is complete.

After passing through step S47 and S48, the control panel 80 goes to step S49 where it will go to a next page and write an end code. At this time, if there already exits data in the next page, the control panel 80 will not write the end code.

At step S50, the A/V server 1 displays information based on the aforementioned operations of various switches in predetermined areas of the display screen 180.

Thus, as the user operates the control panel 80, the A/V server 1 can edit data.

As in the above, when taking video/audio data recorded in an external device such as VTR or the like as material data in a desired page, the A/V server 1 records the material data in the HDDs $120_1$, $120_2$, ..., $120_{n-3}$, $120_{n-2}$, $120_{n-1}$ and $120_n$ and rewrites the page data as internal material data, thereby permitting to edit data recorded in the HDDs $120_1$, $120_2$, ..., $120_{n-3}$, $120_{n-2}$, $120_{n-1}$ and $120_n$ without subsequent access to the VTR. Therefore, the A/V server 1 can edit data at a high speed and thus reduce the time required for the data edition.

Next, operations for production of edit data pages will specifically be described with reference to the flow chart shown in FIGS. 40 to 44. Note that the relation between the internal status information shown in FIG. 15 and the aforementioned sequence of editing operations will also be described.

Figure 40:
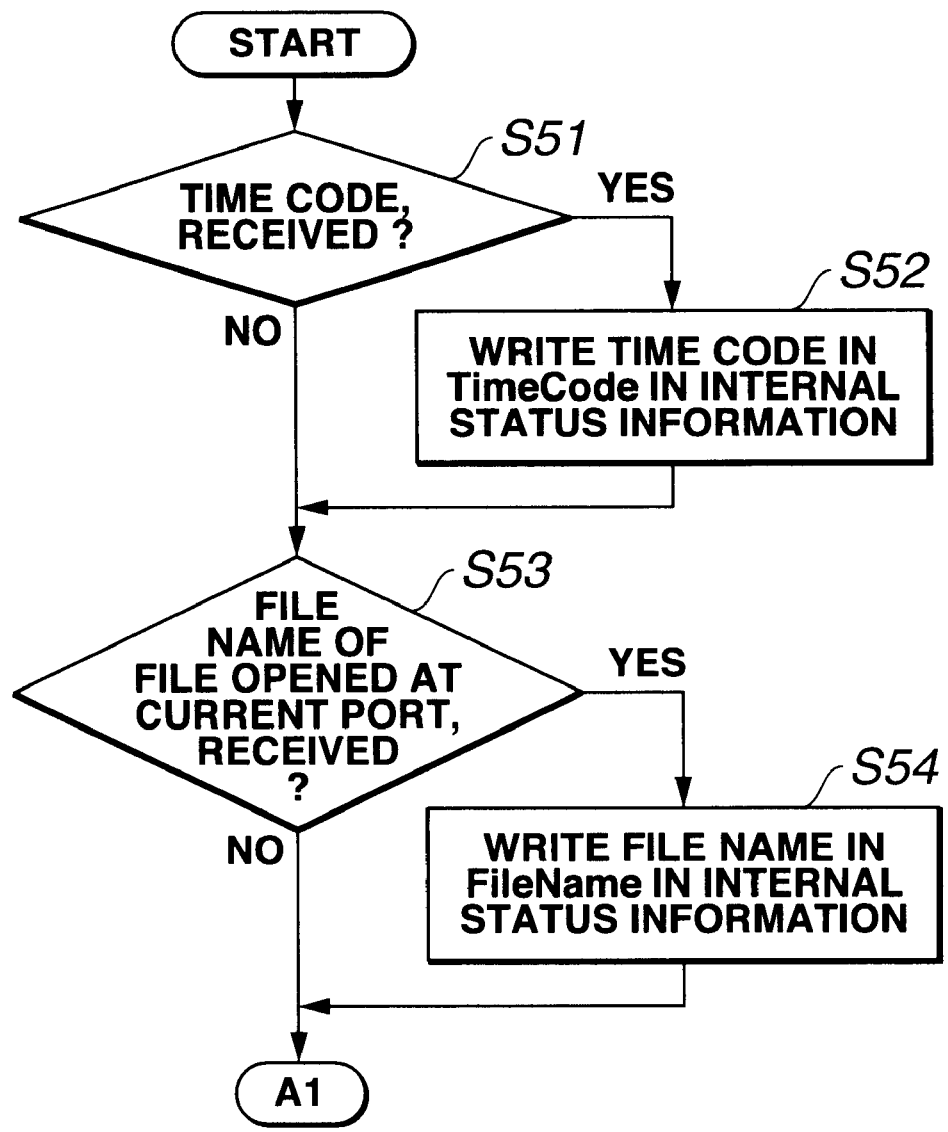
FIG. 40 is a flow chart of operations effected for production of an edit date page during a sequence of editing operations in the control panel of the A/V server in FIG. 1, explaining the operations effected when a time code and file name are received.

First, when the control panel 80 of the A/V server 1 has received a data time code from the main body of the A/V server 1 at step S51 in FIG. 40, it goes to step S52 where it will write the received time code in "TimeCode" in the internal status information and save it in the memory 197.

On the other hand, if the control panel 80 does not receive the data time code from the main body of the A/V server 1 at step S53, the content of the internal status information will not be changed.

Next, when the control panel 80 has received the file name of a file opened at the current port from the main body of the A/V server 1 at step S53, it goes to step S54 where it will write the received file name in "FileName" in the internal status information and save it in the memory 197. On the other hand, if the control panel 80 does not receive the file name from the main body of the A/V server 1, the content of the internal status information will not be changed.

Figure 41:
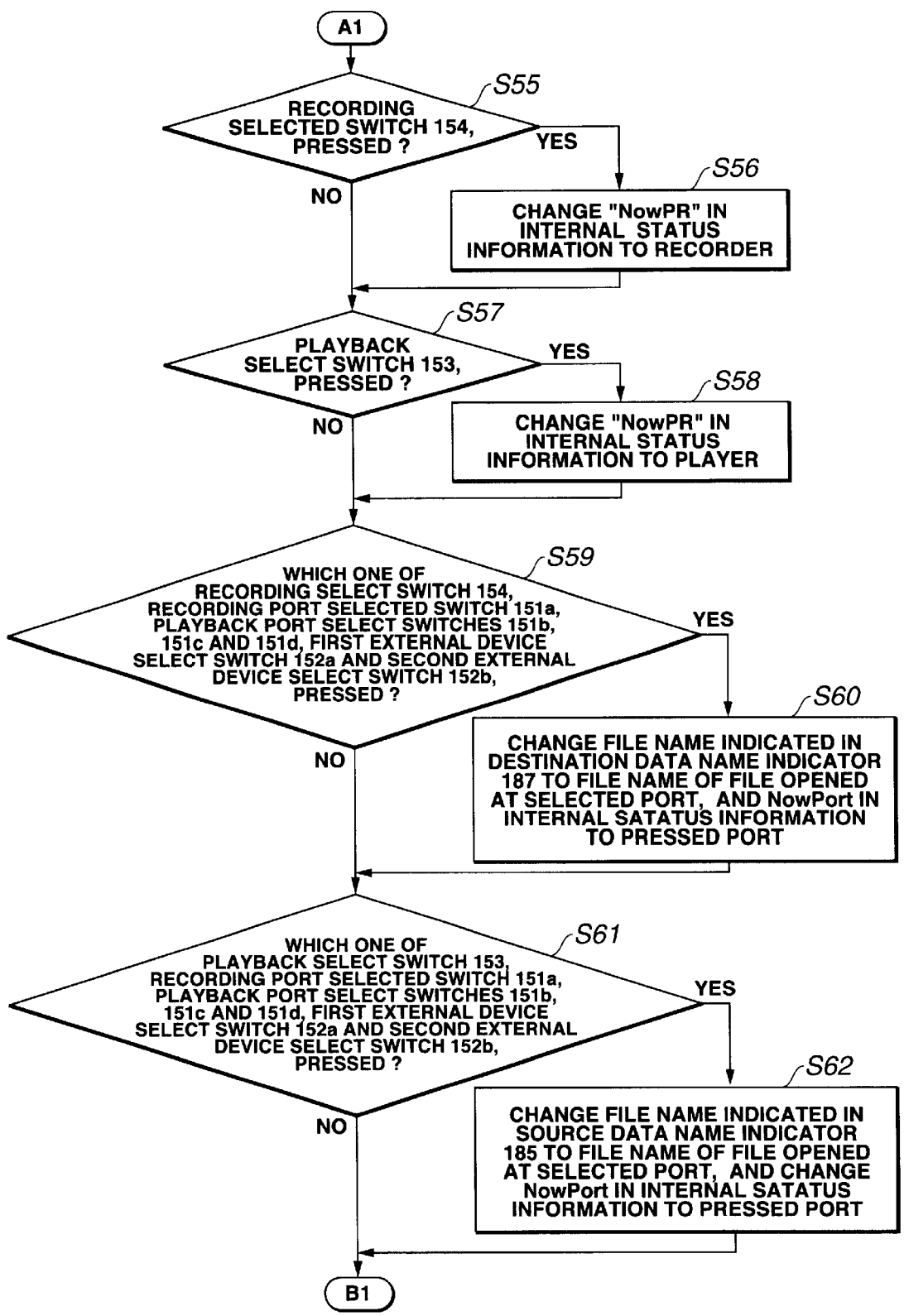
FIG. 41 is a flow chart of operations effected for production of an edit data page during a sequence of editing operations in the control panel of the A/V server in FIG. 1, explaining the operations effected when a recorder and player are designated.
Figure 42:
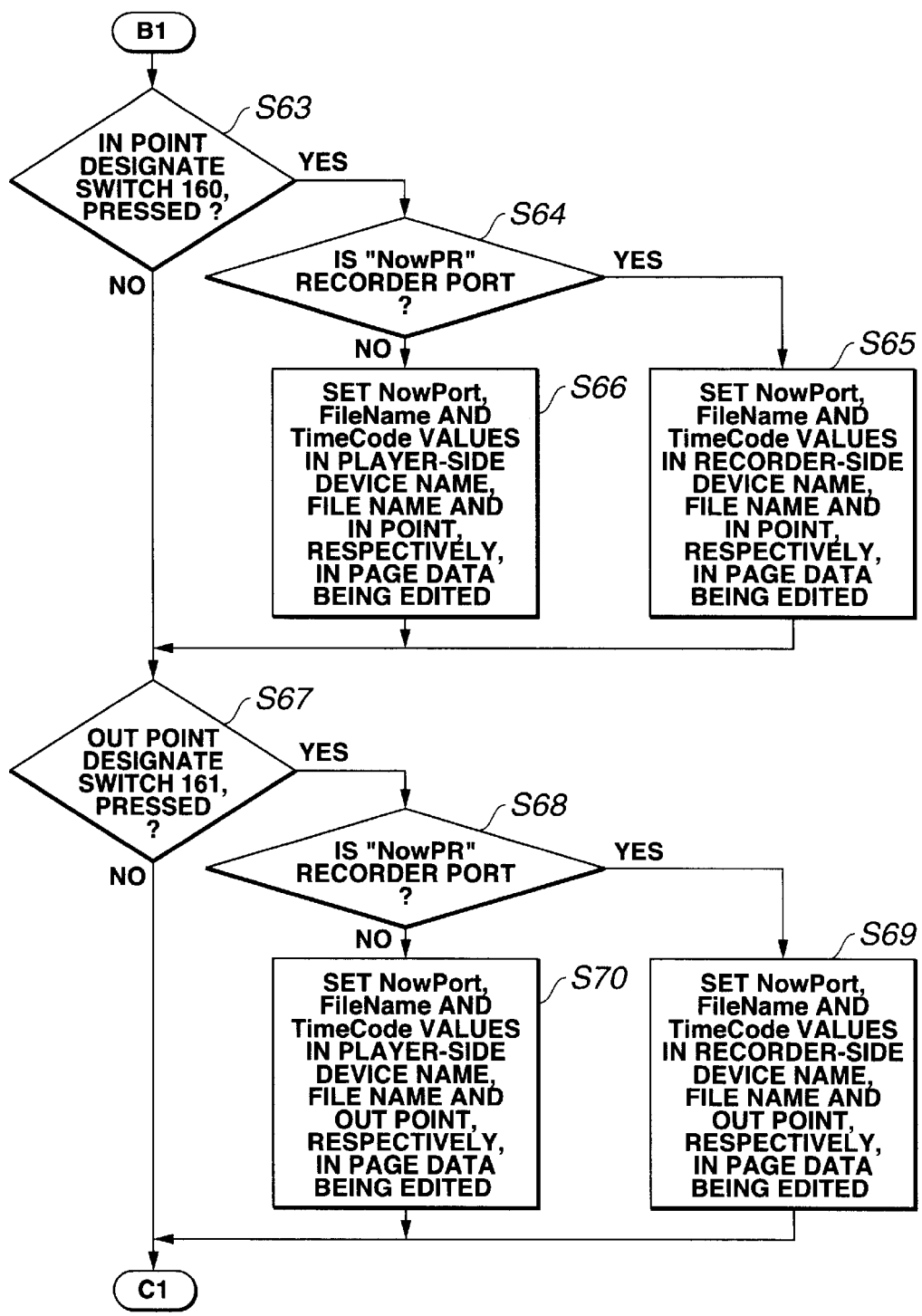
FIG. 42 is a flow chart of operations effected for production of an edit data page during a sequence of editing operations in the control panel of the A/V server in FIG. 1, explaining the operations effected when IN and OUT points are designated.

Next, when the user presses the recording select switch 154 on the control panel 80 at step S55 in FIG. 41, the control panel 80 goes to step S56 where will change "NowPR" in the internal status information to RECORDER (recorder port) and save it in the memory 197, and inform the file management block 101 at the main body of the A/V server 1 that the user has pressed the recording select switch 154. On the other hand, if the user has not pressed the recording select switch 154 at step S55, the content of the internal status information will not be changed.

If the playback select switch 153 is pressed by the user at the control panel 80 at step S57, the control panel 80 goes to step S58 where it will change "NowPR" in the internal status information to PLAYER (player port) and save it in the memory 197, and inform the file management block 101 in the main body of the A/V server 1 that the playback select switch 153 has been pressed by the user. On the otherhand, if the user has not pressed the playback select switch 153 at step S57, the content of the internal status information will not be changed.

When the recording select switch 154, recording port select switch 151a, playback port select switches 151b, 151c and 151d, first external device select switch 152a and second external device select switch 152b are pressed by the user at the control panel 80 at step S59, the control panel 80 goes to step S60 where it will change a file name indicated in the destination data name indicator 187 on the display screen 180 thereof to a file name of a file opened at a selected port and change "NowPort" in the internal status information to the selected port, save it in the memory 197, and inform the file management block 101 in the main body of the A/V server 1 that the above switches have been pressed by the user. On the other hand, if the switches have not been pressed by the user at step S59, the file name indicated in the destination data name indicator 187 and the content of the internal status information will not be changed.

Next, when the playback select switch 153, recording port select switch 151a, playback port select switches 151b, 151c and 151d, first external device select switch 152a and second external device select switch 152b are pressed by the user at the control panel 80 at step S61, the control panel 80 goes to step S62 where it will change a file name indicated in the source data name indicator 185 on the display screen 180 thereof to a file name of a file opened at a selected port and change "NowPort" in the internal status information to the selected port, save it in the memory 197, and inform the file management block 101 in the main body of the A/V server 1 that the above switches have been pressed by the user. On the other hand, if the switches have not been pressed by the user at step S61, the file name indicated in the source data name indicator 185 and the content of the internal status information will not be changed.

If the user presses the IN point designate switch 160 on the control panel 80 of the A/V server 1 at step S63 in FIG.

42, the control panel 80 judges, at step S64, whether "NowPR" in the internal status information is a recorder port.

If "NowPR" in the internal status information is a recorder port, the control panel 80 goes to step S65 where it will set "NowPort", "FileName" and "TimeCode" values in the recorder-side device name, file name and IN point, respectively, of the page data being edited. At this time, the display screen 180 on the control panel 80 displays a content corresponding to the information.

On the other hand, if it is determined at step S64 that "NowPR" in the internal status information is not any recorder port, the control panel 80 goes to step S66 where it will set "NowPort", "FileName" and "TimeCode" values in the layer-side device name, file name and IN point, respectively, of the page data being edited. At this time, the display screen 180 of the control panel 80 will display a content corresponding to the information.

If it is determined at step S63 that the IN point designate switch 160 has not been pressed by the user, the page data and information displayed on the display screen 180 will not be changed.

Next, when the OUT point designate switch 161 on the control panel 80 is pressed by the user at step S67, the control panel 80 will judge at step S68 whether "NowPR" in the internal status information is a recorder port.

If "NowPR" in the internal status information is a recorder port, the control panel 80 goes to step S69 where it will set "NowPort", "FileName" and "TimeCode" values in the recorder-side device name, file name and OUT point, respectively, of the page data being edited. At this time, the display screen 180 of the control panel 80 will display a content corresponding to the information.

On the other hand, if it is determined at step S68 that "NowPR" in the internal status information is not the first external device, the control panel 80 goes to step S70 where it will set "NowPort", "FileName" and "TimeCode" values in the player-side device name, file name and OUT point, respectively, of the page data being edited. At this time, the display screen 180 on the control panel 80 will display a content corresponding to the information.

Note that if the OUT point designate switch 161 has not been pressed at step S67, the page data and information displayed on the display screen 180 will not be changed.

Figure 43:
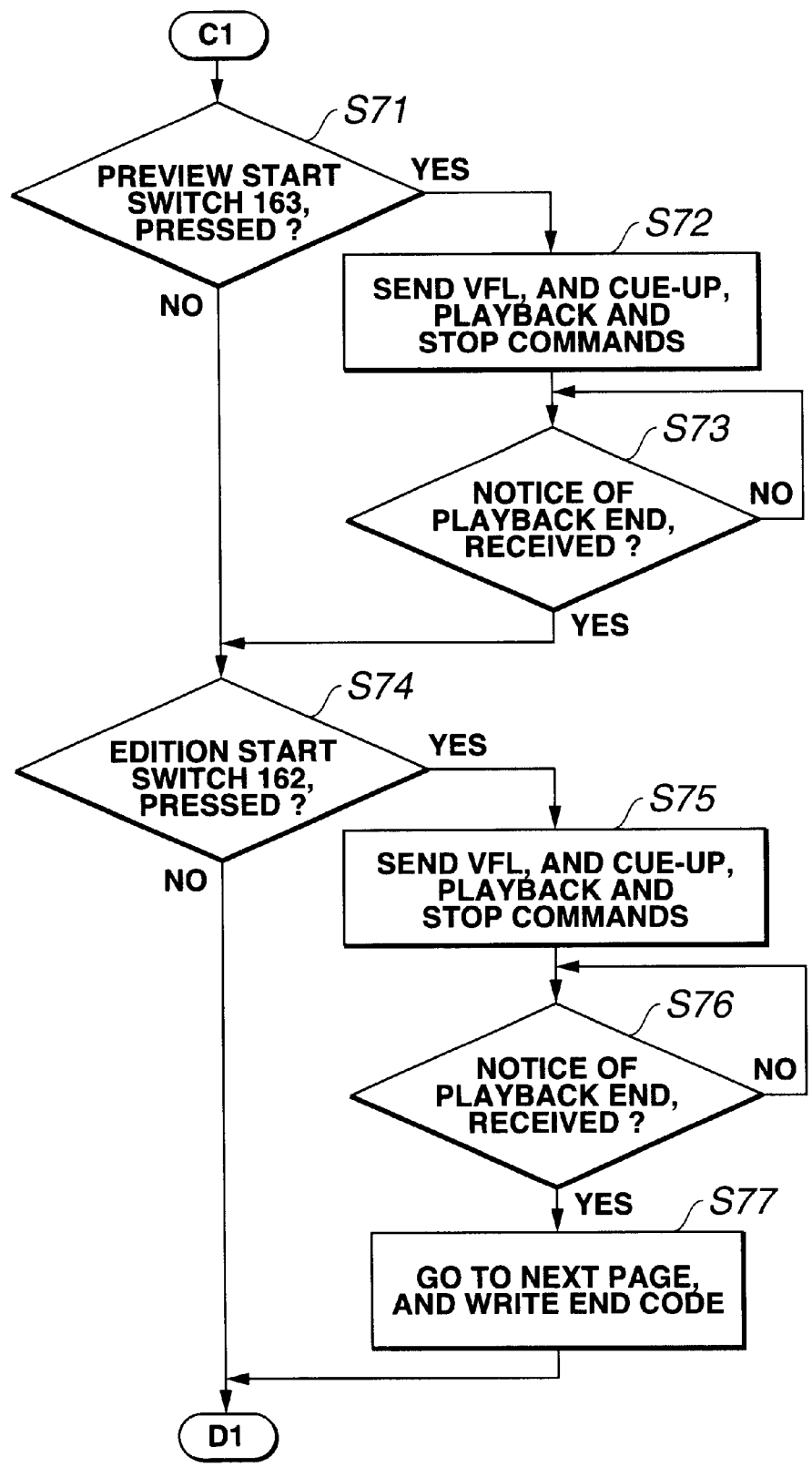
FIG. 43 is a flow chart of operations effected for production of an edit data page during a sequence of editing operations in the control panel of the A/V server in FIG. 1, explaining the operations effected when a preview and edition are effected.

Next, when the user presses the preview start switch 163 on the control panel at step S71 in FIG. 43, the control panel 80 goes to step S72 where, as at step S5 in the flow chart in FIG. 13, it will send VFL resulted from the convention of the page data, cue-up, playback and stop commands to the main body of the A/V server 1. At step S73, the control panel 80 will wait until it is informed from the CPU in the port playing back the data that the data playback is complete.

Next, when the user has pressed the edition start switch 162 on the control panel at step S74, the control panel 80 goes to step S75 where, as at steps S7 and S8 in the flow chart in FIG. 13, it will send VFL resulted from the convention of the page data, cue-up, playback and stop commands to the main body of the A/V server 1. At step S76, the control panel 80 will wait until it is informed from the CPU in the port playing back the data that the data playback is complete. Receiving the information, the control panel 80 goes to step S77 where it will go to a next page and write an end code. Note that at this time, if there already exists data on the next page, the control panel 80 will not write the end code.

Figure 44:
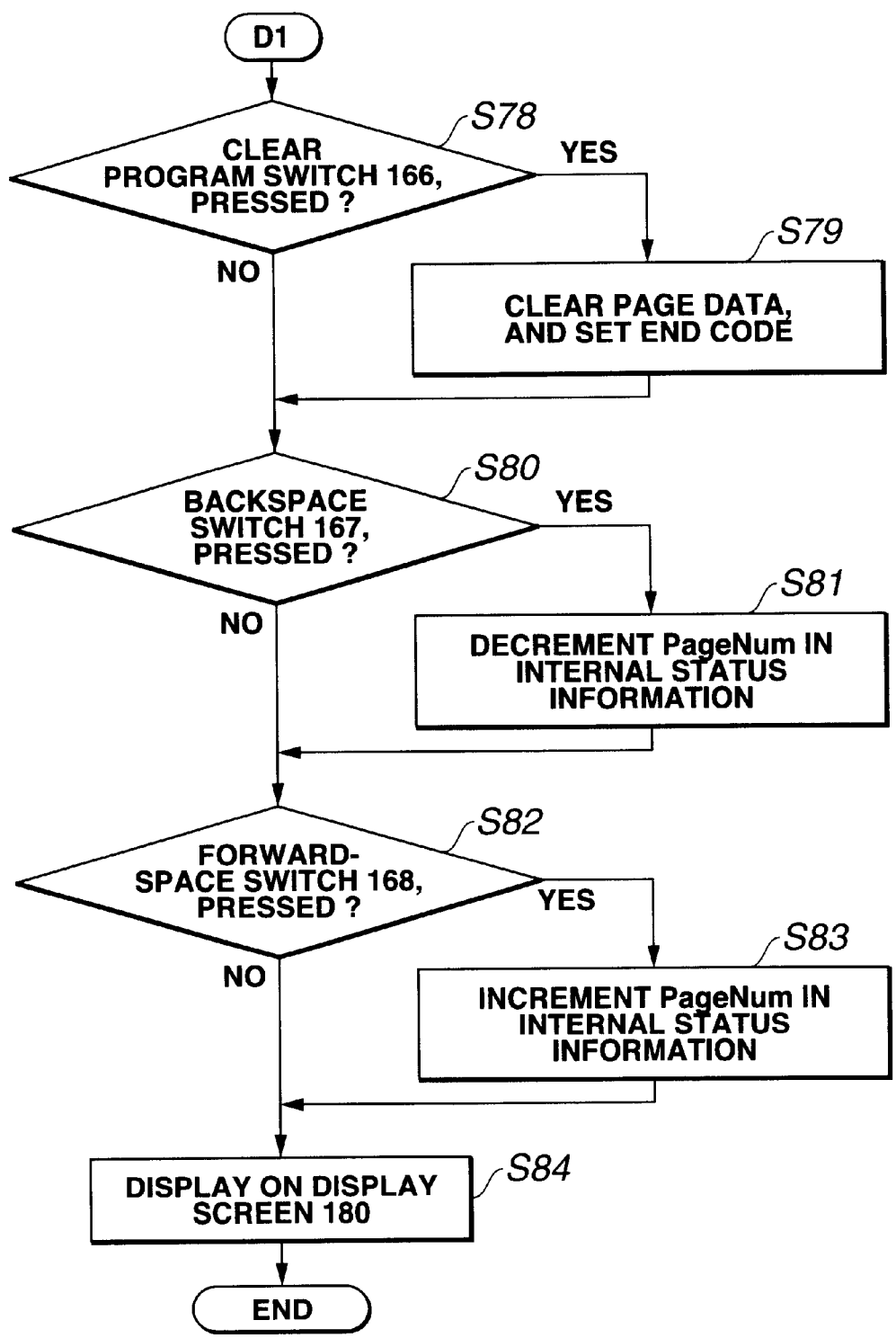
FIG. 44 is a flow chart of operations effected for production of an edit data page during a sequence of editing operations in the control panel of the A/V server in FIG. 1, explaining the operations effected when a program is cleared and page is moved.

When the clear program switch 166 on the control panel 80 is pressed by the user at step S78 in FIG. 44, the control panel 80 goes to step S79 where it will clear the page data being edited and set an end code for newly produced page data.

Next, if the backspace switch 167 on the control panel 80 is pressed by the user at step S80, the control panel 80 goes to step S81 where it will set back the page data being edited a designated number of pages, subtract the designated number of pages from "PageNum" in the internal status information, and save it in the memory 197. On the other hand, if the backspace switch 167 has not been pressed by the user at step S80, the content of the internal status information will not be changed.

Next, if the forward-space switch 168 on the control panel 80 is pressed by the user at step S82, the control panel 80 goes to step S83 where it will forward the page data being edited a designated number of pages, increase "PageNum" in the internal status information by the designated number of pages, and save it in the memory 197. On the other hand, if the forward-space switch 168 has not been pressed by the user at step S82, the content of the internal status information will not be changed.

Note that in the A/V server 1, when at least any of the IN and OUT points has been changed, operations of the backspace switch 167 and forward-space switch 168 are not accepted, so that the pages will not be renumbered. In the A/V server 1, however, even if any of the IN and OUT points has been changed, the pages may be renumbered by operating the backspace switch 167 and forward-space switch 168 to cancel that change of the IN or OUT point.

At step S84, information based on the operations of the aforementioned switches is indicated in predetermined areas on the display screen 180.

By operating the control panel 80 in this way, the A/V server 1 can produce edit data pages and edit them.

The auto renumbering of the produced edit data pages has previously been described. It will further be described below with reference to the flow chart shown in FIGS. 45 to 51. Note that the relation between the internal status information shown in FIG. 15 and the aforementioned sequence of editing operations will also be described.

Figure 45:
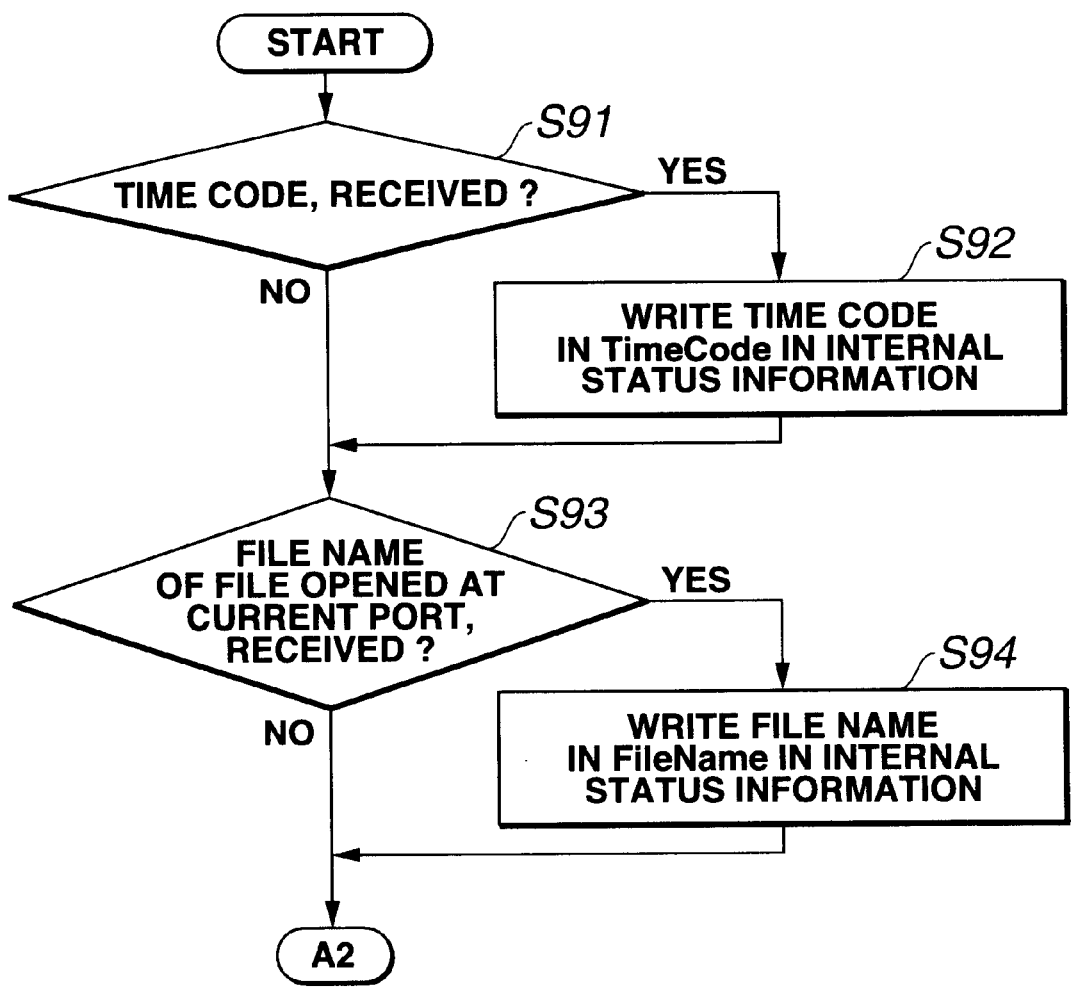
FIG. 45 is a flow chart of operations effected under the auto renumbering function for an edit data page produced in the A/V server in FIG. 1, explaining the operations effected when a time code and file name are received.

First, when the control panel 80 has received a time code for data from the main body of the A/V server 1 at step S91 in FIG. 45, it goes to step S92 where it will write the received time code in "TimeCode" in the internal status information and save it in the memory 197. On the other hand, if it is determined at step S91 that the control panel 80 has received no time code from the main body of the A/V server 1, the content of the internal status information is not changed.

Next, when the control panel 80 has received a file name of a file opened at the current port from the main body of the A/V server 1 at step S93, it goes to step S94 where it will write the received file name in "FileName" in the internal status information and save it in the memory 197. On the other hand, if it is determined at step S93 that the control panel 80 has received no time code from the main body of the A/V server 1, the content of the internal status information is not changed.

Figure 46:
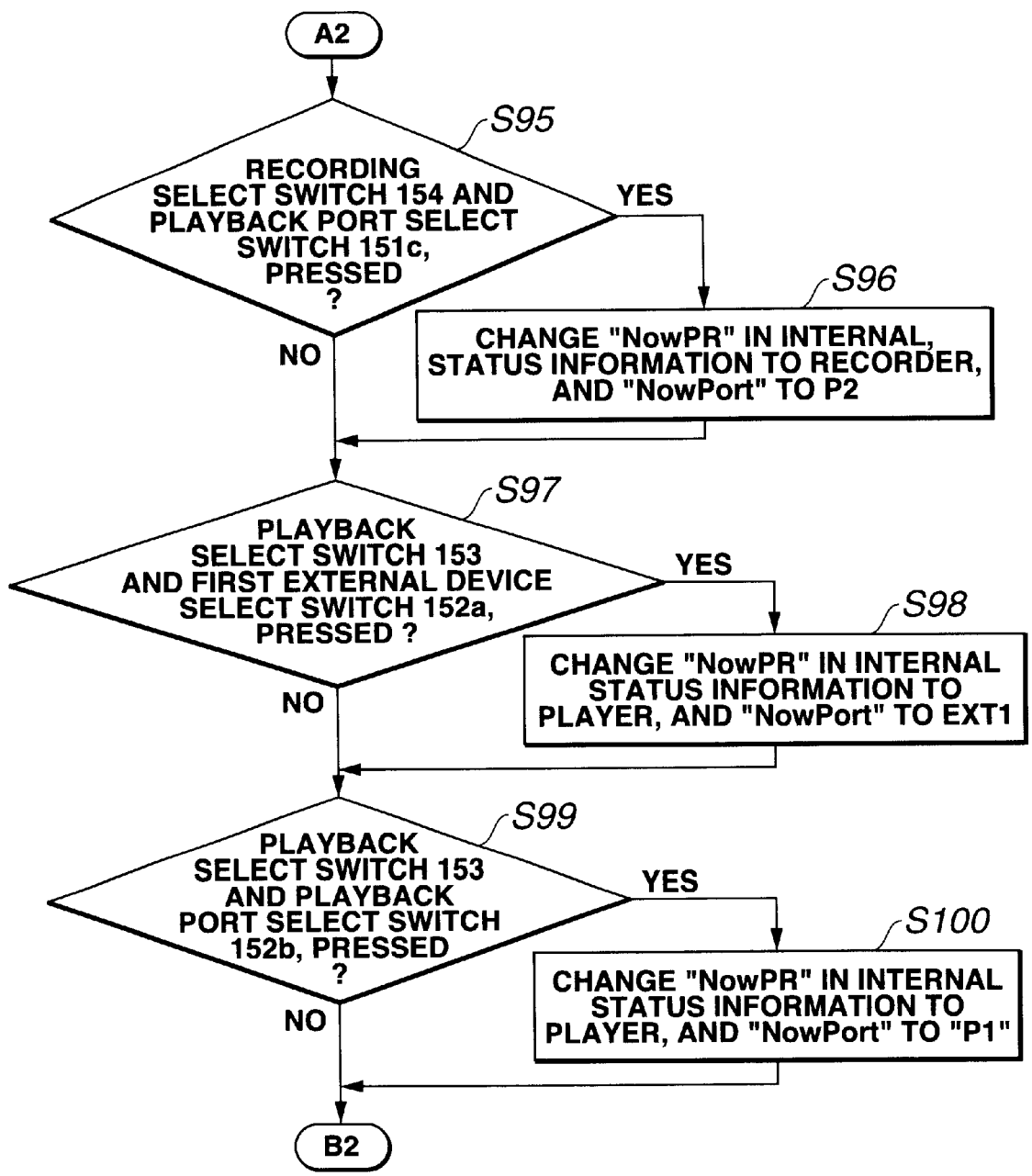
FIG. 46 is a flow chart of operations effected under the auto renumbering function for an edit data page produced in the A/V server in FIG. 1, explaining the operations effected when a recorder and player and their ports are designated.

When the recording select switch 154 and playback port select switch 151c on the control panel 80 have been pressed by the user at step S95 in FIG. 46, the control panel 80 goes to step S96 where it will change "NowPR" in the internal status information to RECORDER (recorder port) and save it in the memory 197, and change "NowPort" in the internal status information to the playback port 30 (P2) and save it in the memory 197, and inform the file management block 101 in the main body of the A/V server 1 that the switches have been pressed by the user. On the other hand, when the switches have not been pressed by the user at step S95, the content of the internal status information will not be changed.

When the playback select switch 153 and first external device select switch 152*a* on the control panel 80 have been pressed by the user at step S97, the control panel 80 goes to step S98 where it will change "NowPR" in the internal status information to PLAYER (player port) and save it in the memory 197, and change "NowPort" in the internal status information to the first external device (EXT1) and save it in the memory 197, and inform the file management block 101 in the main body of the A/V server 1 that the switches have been pressed by the user. On the other hand, when the switches have not been pressed by the user at step S97, the content of the internal status information will not be changed.

When the playback select switch 153 and playback port select switch 151*b* on the control panel 80 have been pressed by the user at step S99, the control panel 80 goes to step S100 where it will change "NowPR" in the internal status information to PLAYER (player port) and save it in the memory 197, and change "NowPort" in the internal status information to the playback port 20 (P1) and save it in the memory 197, and inform the file management block 101 in the main body of the A/V server 1 that the switches have been pressed by the user. On the other hand, when the switches have not been pressed by the user at step S99, the content of the internal status information will not be changed.

Figure 47:
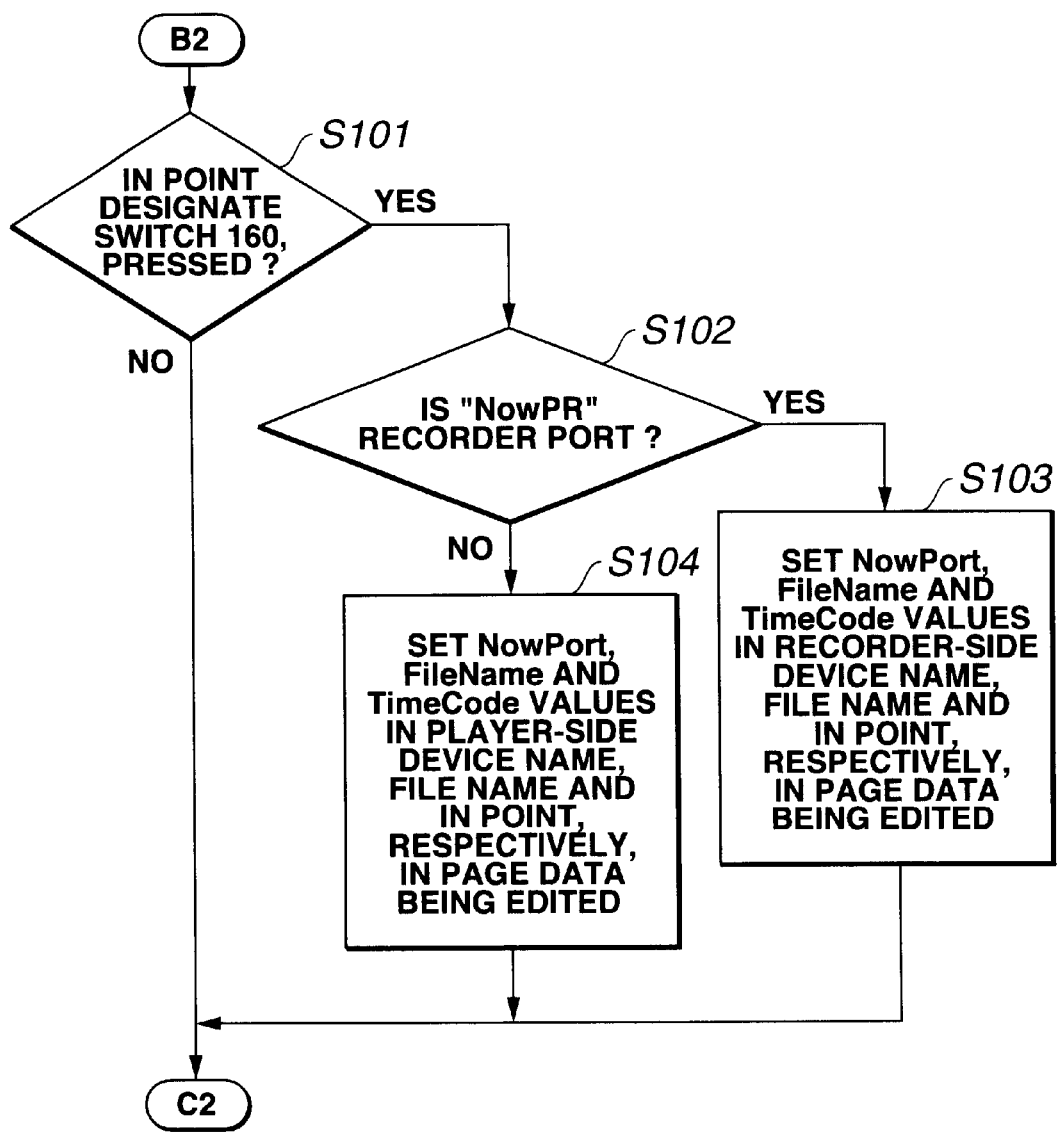
FIG. 47 is a flow chart of operations effected under the auto renumbering function for an edit data page produced in the A/V server in FIG. 1, explaining the operations effected when an IN point is designated.

When the IN point designate switch 160 on the control panel 80 has been pressed by the user at step S101 in FIG. 47, the control panel 80 goes to step S102 where it will judge whether "NowPR" in the internal status information is a recorder port.

If "NowPR" in the internal status information is a recorder port, the control panel 80 goes to step S103 where it will set "NowPort", "FileName" and "TimeCode" values in the recorder-side device name, file name and IN point, respectively, in the page data being edited. At this time, the display screen 180 of the control panel 80 displays a content corresponding to the information.

On the other hand, if it is determined at step S102 that "NowPR" in the internal status information is not any recorder port, the control panel 80 goes to step S104 where it will set "NowPort", "FileName" and "TimeCode" values in the player-side device name, file name and IN point, respectively, of the page data being edited. At this time, the display screen 180 on the control panel 80 displays a content corresponding to the information.

If the IN point designate switch 160 has not been pressed by the user at step S101, the page data and information displayed on the display screen 180 will not be changed.

Figure 48:
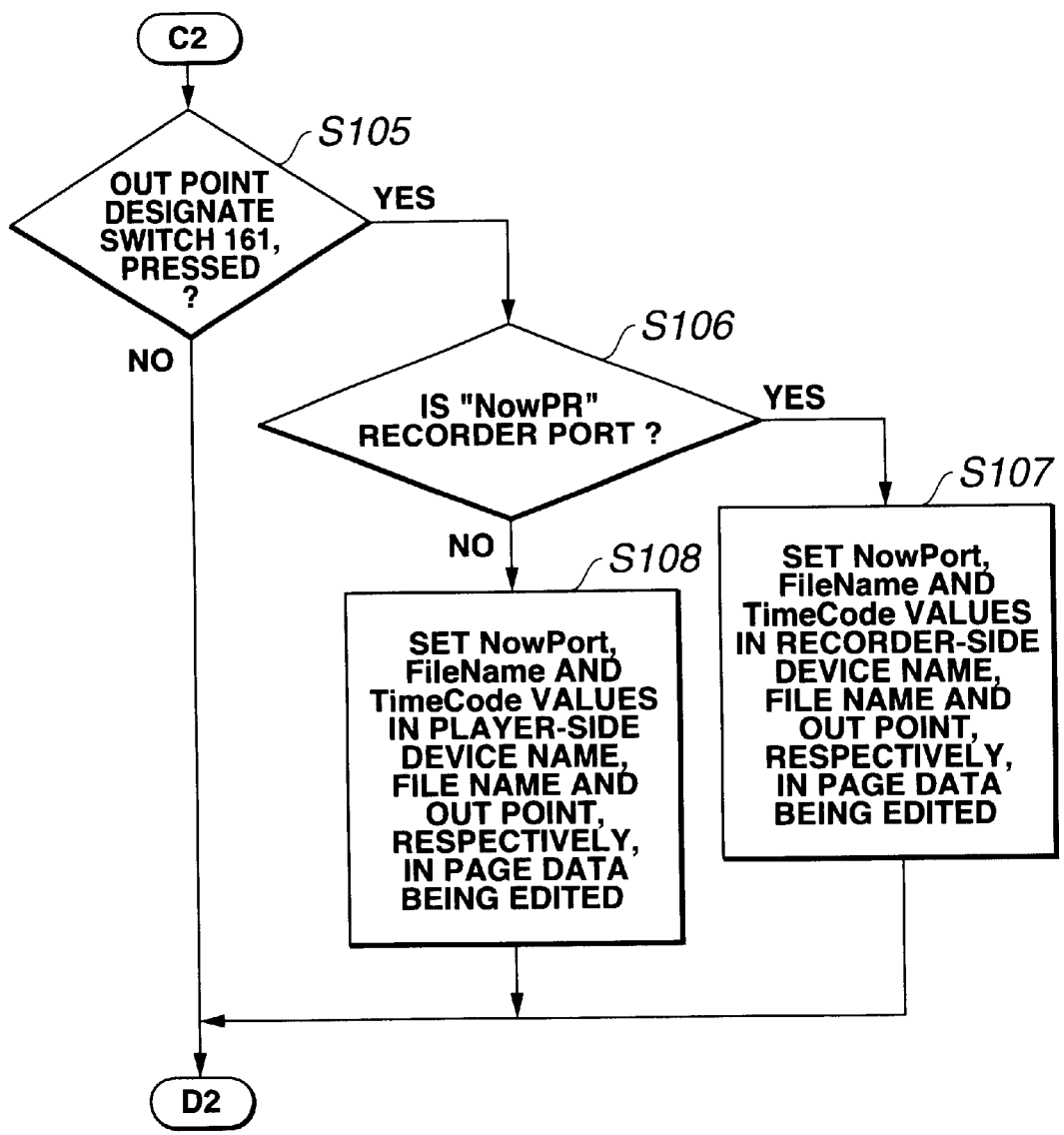
FIG. 48 is a flow chart of operations effected under the auto renumbering function for an edit data page produced in the A/V server in FIG. 1, explaining the operations effected when an OUT point is designated.

Further, when the OUT point designate switch 161 of the control panel 80 of the A/V server 1 has been pressed by the user at step S105 in FIG. 48, the control panel 80 will judge, at step S106, whether "NowPR" in the internal status information is a recorder port.

If "NowPR" in the internal status information is a recorder port, the control panel 80 goes to step S107 where it will set "NowPort", "FileName" and "TimeCode" values in the recorder-side device name, file name and IN point, respectively, of the page data being edited. At this time, the display screen 180 of the control panel 80 will display a content corresponding to the information.

On the other hand, if it is determined at step S106 that "NowPR" in the internal status information is not any recorder port, the control panel 80 goes to step S108 where it will set "NowPort", "FileName" and "TimeCode" values in the player-side device name, file name and IN point, respectively, of the page data being edited. At this time, the display screen 180 on the control panel 80 displays a content corresponding to the information.

If the OUT point designate switch 161 has not been pressed by the user at step S105, the page data and information displayed on the display screen 180 will not be changed.

Figure 49:
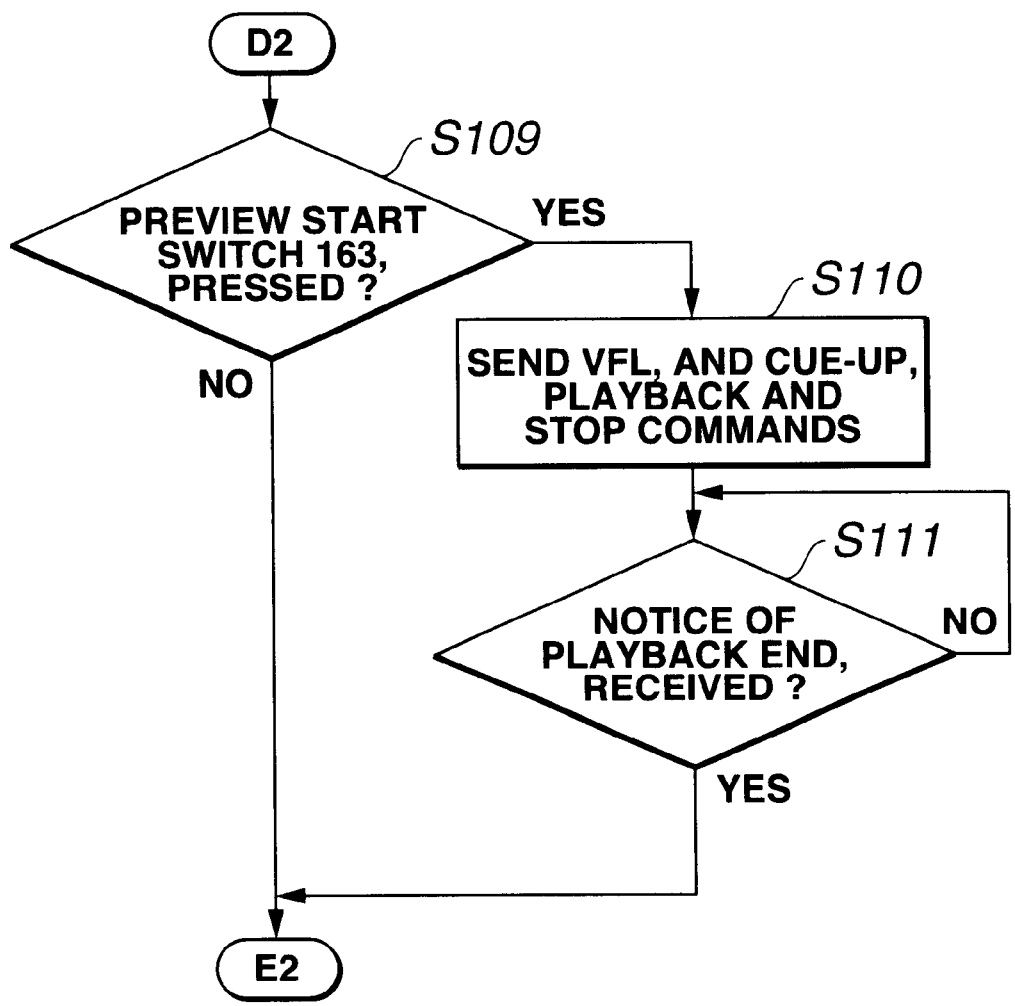
FIG. 49 is a flow chart of operations effected under the auto renumbering function for an edit data page produced in the A/V server in FIG. 1, explaining the operations effected when a preview is effected.

Next, when the preview start switch 163 on the control panel 80 has been pressed by the user at step S109 in FIG. 49, the control panel 80 goes to step S110 where it will send to the main body of the A/V server 1 VFL resulted from the conversion of page data, cue-up, playback and stop commands at step S5 in FIG. 13. Then, the control panel 80 will wait at step S111 until it is informed from the CPU provided in a port playing back the data that the data playback is complete.

Figure 50:
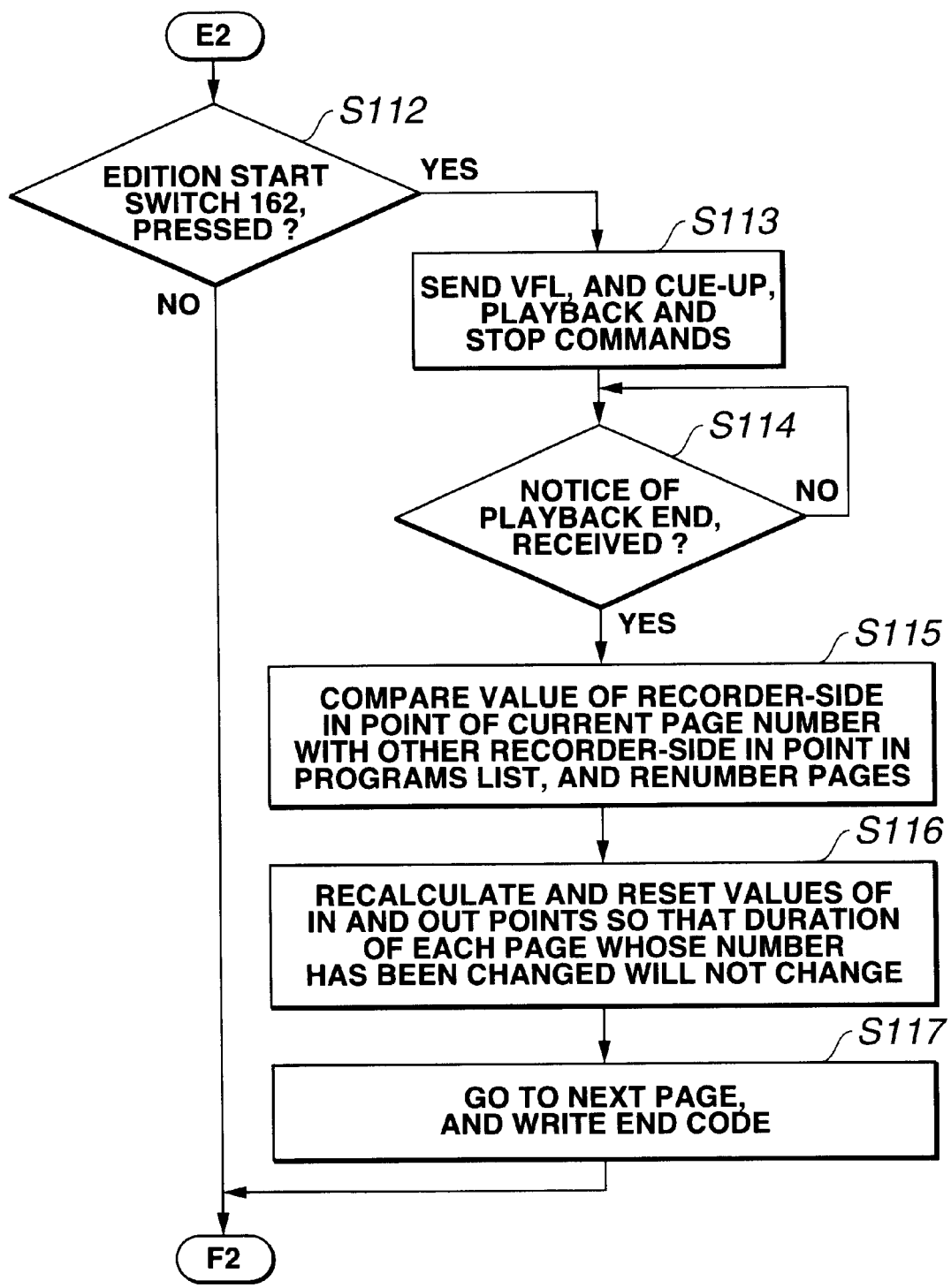
FIG. 50 is a flow chart of operations effected under the auto renumbering function for an edit data page produced in the A/V server in FIG. 1, explaining the operations effected when an edition is effected.

If the edition start switch 162 on the control panel 80 has been pressed by the user at step S12 in FIG. 50, the control panel 80 goes to step S113 where it will send to the main body of the A/V server 1 VFL resulted from the conversion of the page data, cue-up, playback and stop commands as at steps S7 and S8 in FIG. 13. Then the control panel 80 will wait at step S114 until it is informed from the CPU provided in a port playing back the data that the data playback is complete. Receiving the notice, the control panel 80 goes to step S115 where it will compare the recorder-side IN point value in a page of the current page number and other recorder-side IN point value in the program, and renumber the pages. Further at step SI 16, the control panel 80 will recalculate the IN and OUT point values so that the duration of each page whose page number has been changed will not change, and reset the values. Then at step S117, the control panel 80 will go to a next page and write an end code. Note that at this time, if there already exists data in the next page, the control panel 80 will write no end code.

Figure 51:
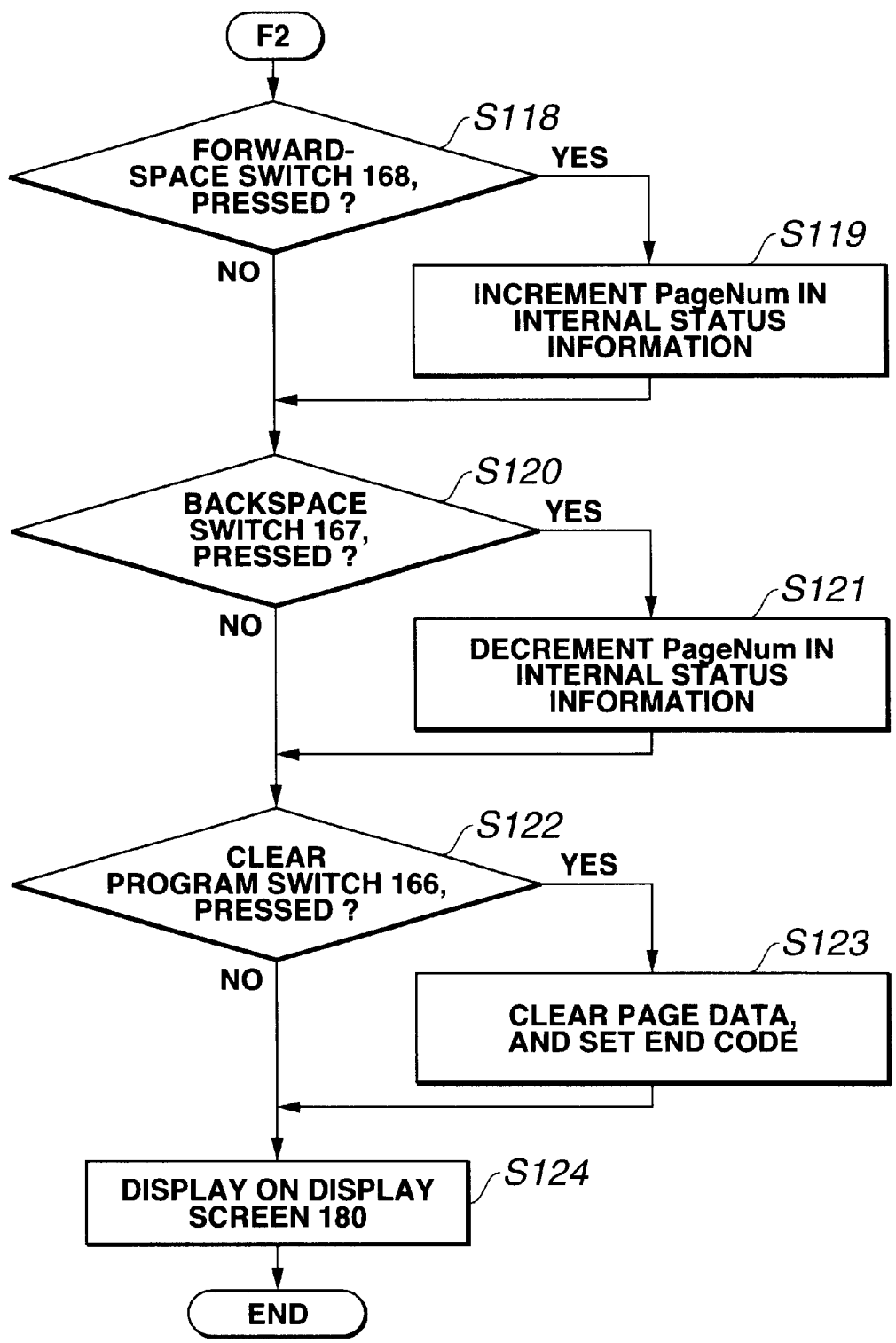
FIG. 51 is a flow chart of operations effected under the auto renumbering function for an edit data page produced in the A/V server in FIG. 1, explaining the operations effected when a page is moved and program is cleared.

Next, if the forward-space switch 168 on the control panel 80 is pressed by the user at step S118 in FIG. 51, the control panel 80 goes to step S119 where it will forward the page data being edited a designated number of pages, increase "PageNum" in the internal status information by the designated number of pages, and save it in the memory 197. On the other hand, if the forward-space switch 168 has not been pressed by the user at step S118, the content of the internal status information will not be changed.

Next, if the backspace switch 167 on the control panel 80 is pressed by the user at step S120, the control panel 80 goes to step S121 where it will set back the page data being edited a designated number of pages, subtract the designated number of pages from "PageNum" in the internal status information, and save it in the memory 197. On the other hand, if the backspace switch 167 has not been pressed by the user at step S120, the content of the internal status information will not be changed.

Note that in the A/V server 1, when at least any of the IN and OUT points has been changed, operations of the backspace switch 167 and forward-space switch 168 are not accepted, so that the pages will not be renumbered. In the A/V server 1, however, even if any of the IN and OUT points has been changed, the pages may be renumbered by operating the backspace switch 167 and forward-space switch 168 to cancel that change of the IN or OUT point.

When the clear program switch 166 on the control panel 80 is pressed by the user at step S122, the control panel 80 goes to step S123 where it will clear the page data being edited and set an end code for newly produced page data.

Then at step S124, information based on the aforementioned operations of the switches is displayed in predetermined areas on the display screen 180.

Thus, the A/V server 1 can automatically renumber the newly produced pages through operation of the control panel 80 by the user.

As having been described in the foregoing, by operating the control panel 80 of the A/V server 1 to manage edited data in the form of a program as a collection of page data according to the operation of the control panel 80 which displays mainly character information, the user can edit data non-linearly as if he used the conventional linear editing apparatus.

Even if pages cannot be arranged in the temporal order of the edition points in page data by addition, deletion or correction of pages, the A/V server 1 can automatically renumber the pages in the temporal order of the edition points irrespectively of the produced order of page data. Thus, in the A/V server 1, a desired edition point can easily be searched also for re-edition of data so that broadcast data called "package" can be processed quite as in the conventional linear editing apparatus. Therefore, the A/V server 1 permits even a user well familiar with the conventional linear editing apparatus and using the linear editing apparatus in the first time to edit data very easily.

Further, when video/audio data recorded in an external device such as VTR is dealt with material data in a desired page, the A/V server 1 can record the material data from the external device into the HDDs $120_1$, $120_2$, . . . , $120_{n-3}$, $120_{n-2}$, $120_{n-1}$ and $120_n$ once and edit the data recorded in the HDDs $120_1$, $120_2$, . . . , $120_{n-3}$, $120_{n-2}$, $120_{n-1}$ and $120_n$ without subsequent access to the VTR. Therefore, the A/V server 1 can edit data at a high speed and thus in a shortened time.

Note that the present invention is not limited to the embodiment having been described in the foregoing but the switches on the control panel 80 and information displayed on the display screen 180 may further include other than the aforementioned.

The present invention has been described as a 4-input/output system having one input system and three output systems, but the number of the input and output systems is not limited to the above.

INDUSTRIAL APPLICABILITY

As having been described in the foregoing, the data recording/playback apparatus according to the present invention includes means for writing data including video data and/or audio data to a non-linearly accessible recording medium and reading data recorded in the recording medium; a plurality of input/output means for receiving data supplied from outside and accessing the data writing/reading means for an assigned time slot to output data to the data writing/reading means, and receiving read data supplied from the data writing/reading means for an assigned time slot and delivering the data to outside; and a controlling means for producing, for a data edition by inserting source data into destination data, both included in the data recorded in the recording medium, page data having source data insertion start and end points and a start point of the data insertion into the destination data for each of edition units.

Therefore, in the above data recording/playback apparatus, when editing data by inserting the source data into the destination data, the page data having source data insertion start and end points and a start point of the data insertion into the destination data can be produced for each of edition units to edit the data based on the page data thus produced, and the data edition can be done by the above apparatus with a similar operability to that of the conventional linear editing apparatus.

Also, in the data editing apparatus having means for reading data including video data and/or audio data recorded in a tape-like recording medium, and means for editing the data read by the reading means, the editing means includes, according to the present invention, means for writing data including video data and/or audio data to a non-linearly accessible recording medium and reading data recorded in the non-linearly accessible recording medium; a plurality of input/output means for receiving read data supplied from the data writing/reading means and accessing the data writing/reading means for an assigned time slot to output data to the data writing/reading means, and receiving played-back data supplied from the data writing/reading means for an assigned time slot and delivering the data to outside; and a controlling means for producing, for a data edition by inserting source data into destination data, both included in the data recorded in the non-linearly accessible recording medium, page data having start and end points of the source data insertion and a start point of the data insertion into the destination data for each of edition units.

In the above data editing apparatus, when editing data by inserting the source data into the destination data, the editing means can produce the page data having source data insertion start and end points and a start point of the data insertion into the destination data for each of edition units to edit the data based on the page data thus produced. Thus, the data can be edited based on the page data using the above apparatus with a similar operability to that of the conventional linear editing apparatus.

Also the data recording/playback apparatus according to the present invention includes means for writing data including video data and/or audio data to a non-linearly accessible recording medium and reading data recorded in the recording medium; a plurality of input/output means for receiving data supplied from outside and accessing the data writing/reading means for an assigned time slot to output data to the data writing/reading means, and receiving played-back data supplied from the data writing/reading means for an assigned time slot and delivering the data to outside; and a controlling means for producing, for a data edition by inserting source data into destination data, both included in the data recorded in the recording medium, page data having start and end points of the source data insertion and a start point of the data insertion into the destination data for each of edition units, and assigning, when a plurality of page data is produced, page numbers to them in the order of source data output time points for discrimination from other page data and then writing the page numbers in the page data.

Therefore, in the above data recording/playback apparatus, when editing data by inserting the source data into the destination data, the page data having source data insertion start and end points and a start point of the data insertion into the destination data is produced for each of edition units and the data is edited based on the page data thus produced. If a plurality of page data is produced, page numbers for discrimination from other page data are assigned to them in the order of source data output time points and written into the page data. Thus, data can be edited based on the page data. Also, for re-edition, a desired edition point can easily be searched irrespectively of the produced order of the page data, so that a package can be processed quite as in the conventional linear editing apparatus. Therefore, the data recording/playback apparatus according to the present invention can edit data with a similar operability to that of the conventional linear editing apparatus.

Also in the data editing apparatus having means for reading data including video data and/or audio data recorded in a tape-like recording medium, and means for editing the data read by the reading means, the editing means includes, according to the present invention, means for writing data including video data and/or audio data to a non-linearly accessible recording medium and reading data recorded in the non-linearly accessible recording medium; a plurality of input/output means for receiving read data supplied from the data reading means and accessing the data writing/reading means for an assigned time slot to output data to the data writing/reading means, and receiving read data supplied from the data writing/reading means for an assigned time slot and delivering the data to outside; and a controlling means for producing, for a data edition by inserting source data into destination data, both included in the data recorded in the recording medium, page data having start and end points of the source data insertion and a start point of the data insertion into the destination data for each of edition units, and assigning, when a plurality of page data is produced, page numbers to them in the order of source data output time points for discrimination from other page data and then writing the page numbers in the page data.

Therefore, in the above data editing apparatus, when editing data by inserting source data into destination data, the editing means produces page data having start and end points of the source data insertion and a start point of the data insertion into the destination data for each of edition units. When a plurality of page data is produced, the editing means assigns page numbers to the plurality of page data in the order of source data output time points for discrimination from other page data, and then writes the page numbers in the page data, thereby permitting to edit data based on the page data. Further, for re-edition, a desired edition point can easily be searched irrespectively of the produced order of the page data, so that a package can be processed quite as in the conventional linear editing apparatus. Therefore, the data recording/playback apparatus according to the present invention can edit data with a similar operability to that of the conventional linear editing apparatus.

Also, in the data recording/playback apparatus having a non-linearly accessible recording medium, and a plurality of input/output units for receiving and/or providing data from and/or to the recording medium, each of the input/output units processing input data and writing it to the recording medium and processing data read from the recording medium and delivering it to outside, both within a pre-assigned time slot, there are further included, according to the present invention, an input controlling means for designating an edition point for material data recorded in the non-linearly accessible recording medium and/or material data recorded in a linear recording medium provided in an external device; and means for controlling the non-linearly accessible recording medium and/or linear recording medium according to the edition point designation by the input controlling means; the controlling means writing, when the edition point is designated by the input controlling means, to the non-linearly accessible recording medium, data including edition units based on the edition point, recorded in the linear recording medium, and accessing, when access is made again to near the edition unit recorded in the linear recording medium, data including the edition unit recorded in the non-linearly accessible recording medium.

In the above data recording/playback apparatus, data including edition units based on the edition point, recorded in the linear recording medium, is written to the non-linearly accessible recording medium. When access is made again to near the edition unit recorded in the linear recording medium, access is made to data including the edition unit recorded in the non-linearly accessible recording medium without operation of the external device. Thus, with the data recording/playback apparatus according to the present invention, data can be edited with a high efficiency and convenience.

Also according to the present invention, the data editing apparatus for editing and controlling material data for each of edition units, includes a non-linearly accessible recording medium; an input controlling means for designating an edition point for material data recorded in the non-linearly accessible recording medium and/or material data recorded in a linear recording medium provided in an external device; and means for controlling the non-linearly accessible recording medium and/or linear recording medium according to the edition point designation by the input controlling means; the controlling means writing, when the edition point is designated by the input controlling means, to the non-linearly accessible recording medium, data including edition units based on the edition point, recorded in the linear recording medium, and accessing, when access is made again to near the edition unit recorded in the linear recording medium, data including the edition unit recorded in the non-linearly accessible recording medium.

In the above data editing apparatus, data including edition units based on the edition point, recorded in the linear recording medium, is written to the non-linearly accessible recording medium. When access is made again to near the edition unit recorded in the linear recording medium, access is made to data including the edition unit recorded in the non-linearly accessible recording medium without operation of the external device. Thus, edition can be made at a high speed, and the time for data edition can be reduced. Therefore, with the data editing apparatus according to the present invention, data can be edited with a high efficiency and convenience.

Also the data recording method includes, according to the present invention, steps of writing, when designating an edition point for material data recorded in the non-linearly accessible recording medium and/or material data recorded in a linear recording medium provided in an external device, to the non-linearly accessible recording medium data including edition units based on the edition point, recorded in the linear recording medium; and accessing, when accessing again near the edition unit recorded in the linear recording medium, data including the edition unit recorded in the non-linearly accessible recording medium.

In the above data recording method, data including edition units based on the edition point, recorded in the linear recording medium, is written to the non-linearly accessible recording medium. When access is made again to near the edition unit recorded in the linear recording medium, access is made to data including the edition unit recorded in the non-linearly accessible recording medium without operation of the external device, so that data can be edited at a high speed, and thus the time for data edition can be reduced. Thus, with the data recording method according to the present invention, data can be edited with a high efficiency and convenience.

What is claimed is:

1. A data recording/playback apparatus, comprising:

means for writing video data and/or audio data to a plurality of non-linearly accessible recording mediums and reading data recorded in the recording mediums;

a plurality of input/output means for receiving data supplied from outside and accessing the data writing/reading means for an assigned time slot to output data to the data writing/reading means, and receiving read data supplied from the data writing/reading means for an assigned time slot and delivering the data to outside; and a controlling means for producing, for a data edition by inserting source data into destination data, both included in the data recorded in the recording mediums, page data having source data insertion start and end points and a start point of the data insertion into the destination data for each of edition units, whereby said video data and/or said audio data is divided into a plurality of portions prior to writing, whereby said writing means substantially simultaneously writes the plurality of portions of divided data to said recording mediums, and whereby said page data includes information pertaining to a port from which the source data is outputted.

2. The apparatus as set forth in claim 1, wherein the page data further includes an identification name for the source data.

3. The apparatus as set forth in claim 1, wherein when a plurality of source data is inserted into the destination data, the controlling means produces the page data for each of the edition units, and numbers the plurality of page data for discrimination from other page data; the page numbers being included in the page data.

4. The apparatus as set forth in claim 1, further comprising a switching means for receiving the data outputted from the plurality of input/output means and outputting them to any one of the plurality of the input/output means or an external input/output terminal;

when inserting the source data into the destination data, the controlling means selectively switching, based on the produced page data, the source data and destination data supplied to the switching means from the destination data to the source data at the insertion start point and controlling the switching means to output the data to any one of the plurality of input/output means or external input/output terminal.

5. The apparatus as set forth in claim 4, wherein the controlling means switches, based on the produced page data, the source data and destination data supplied to the switching means from the source data to the destination data at the insertion end point and controls the switching means to output the data to any one of the plurality of input/output means or external input/output terminal.

6. The apparatus as set forth in claim 4, further comprising:

a first means for selecting one of the plurality of input/output means from which the source data is outputted; and a second means for selecting one of the plurality of input/output means from which the destination data is outputted;

the destination data being outputted from the input/output means selected by the first selecting means to the switching means while the source data is outputted from the input/output means selected by the second selecting means to the switching means.

7. The apparatus as set forth in claim 6, further comprising a display means on which the data output from the external output terminal is displayed;

the display means displaying the destination data and source data outputs from the switching means and the page data when produced by the controlling means.

8. The apparatus as set forth in claim 7, further comprising an edition position setting means for setting the insertion start point and/or insertion end point for the source data and/or destination data outputted from the input/output means selected by the first and second selecting means;

the controlling means producing the page data from the insertion start point and/or insertion end point set by the edition point setting means and outputting a control signal for instruction to read the source data and/or destination data to the input/output means selected by the first and second selecting means; and the input/output means operating under the control signal to receive the designation data and/or source data from the recording/playback means and output the destination data and/or source data to the switching means, for an assigned time slot.

9. The apparatus as set forth in claim 7, wherein the controlling means determines, for the source data and/or destination data, a playback start point for the destination data and a playback end point being a recorded length from the playback start point from file system information including a top address in the recording medium at which the data is recorded in units of file and a recorded length of the file in the recording medium and the data insertion start point and/or end point, and outputs the playback start and end points superposed on the control signal to the input/output means.

10. The apparatus as set forth in claim 1, wherein said controlling means utilizes said data edition for data editing.

11. The apparatus as set forth in claim 1, wherein video and audio data are written to the plurality of non-linearly accessible recording mediums such that the video data is written to a first group of non-linearly accessible recording mediums and the audio data is written to a second group of non-linearly accessible recording mediums which is different from said first group of non-linearly accessible recording mediums.

12. A data editing apparatus having means for reading data including video data and/or audio data recorded in a tape-like recording medium, and means for editing the data read by the reading means, the editing means comprising:

means for writing video data and/or audio data to a plurality of non-linearly accessible recording mediums and reading data recorded in the non-linearly accessible recording mediums;

a plurality of input/output means for receiving read data supplied from the data writing/reading means and accessing the data writing/reading means for an assigned time slot to output data to the data writing/reading means, and receiving played-back data supplied from the data writing/reading means for an assigned time slot and delivering the data to outside; and a controlling means for producing, for a data edition by inserting source data into destination data, both included in the data recorded in the non-linearly accessible recording mediums, page data having start and end points of the source data insertion and a start point of the data insertion into the destination data for each of edition units, whereby said video data and/or said audio data is divided into a plurality of portions prior to writing, whereby said writing means substantially simultaneously writes the plurality of portions of divided data to said recording mediums, and whereby said page data includes information pertaining to a port from which the source data is outputted.

13. The apparatus as set forth in claim 12, wherein the page data further includes an identification name for the source data.

14. The apparatus as set forth in claim 12, wherein when a plurality of source data is inserted into the destination data, the controlling means produces the page data for each of the edition units, and numbers the plurality of page data for discrimination from other page data; the page numbers being included in the page data.

15. The apparatus as set forth in claim 12, wherein the editing means further comprises a switching means for receiving the data outputted from the plurality of input/output means and outputting them to any one of the plurality of the input/output means or an external input/output terminal;

when inserting the source data into the destination data, the controlling means selectively switching, based on the produced page data, the source data and destination data supplied to the switching means from the destination data to the source data at the insertion start point and controlling the switching means to output the data to any one of the plurality of input/output means or external input/output terminal.

16. The apparatus as set forth in claim 15, wherein the controlling means switches, based on the produced page data, the source data and destination data supplied to the switching means from the source data to the destination data at the insertion end point and controls the switching means to output the data to any one of the plurality of input/output means or external input/output terminal.

17. The apparatus as set forth in claim 15, wherein the editing means further comprises:

a first means for selecting one of the plurality of input/output means from which the source data is outputted; and a second means for selecting one of the plurality of input/output means from which the destination data is outputted;

the destination data being outputted from the input/output means selected by the first selecting means to the switching means while the source data is outputted from the input/output means selected by the second selecting means to the switching means.

18. The apparatus as set forth in claim 17, wherein the editing means further comprises a display means on which the data output from the external output terminal is displayed;

the display means displaying the destination data and source data outputs from the switching means and the page data when produced by the controlling means.

19. The apparatus as set forth in claim 18, wherein the editing means further comprises an edition position setting means for setting the insertion start point and/or insertion end point for the source data and/or destination data outputted from the input/output means selected by the first and second selecting means;

the controlling means producing the page data from the insertion start point and/or insertion end point set by the edition point setting means and outputting a control signal for instruction to read the source data and/or destination data to the input/output means selected by the first and second selecting means; and the input/output means operating under the control signal to receive the designation data and/or source data from the recording/playback means and output the destination data and/or source data to the switching means, for an assigned time slot.

20. The apparatus as set forth in claim 18, wherein the controlling means determines, for the source data and/or destination data, a playback start point for the destination data and a playback end point being a recorded length from the playback start point from file system information including a top address in the recording medium at which the data is recorded in units of file and a recorded length of the file in the recording medium and the data insertion start point and/or end point, and outputs the playback start and end points superposed on the control signal to the input/output means.

21. The apparatus as set forth in claim 12, wherein video and audio data are written to the plurality of non-linearly accessible recording mediums such that the video data is written to a first group of non-linearly accessible recording mediums and the audio data is written to a second group of non-linearly accessible recording mediums which is different from said first group of non-linearly accessible recording mediums.

22. A data recording/playback apparatus, comprising:

means for writing video data and/or audio data to a plurality of non-linearly accessible recording mediums and reading data recorded in the recording mediums;

a plurality of input/output means for receiving data supplied from outside and accessing the data writing/reading means for an assigned time slot to output data to the data writing/reading means, and receiving played-back data supplied from the data writing/reading means for an assigned time slot and delivering the data to outside; and a controlling means for producing, for a data edition by inserting source data into destination data, both included in the data recorded in the recording mediums, page data having start and end points of the source data insertion and a start point of the data insertion into the destination data for each of edition units, and assigning, when a plurality of page data is produced, page numbers to them in the order of source data output time points for discrimination from other page data and then writing the page numbers in the page data, whereby said video data and/or said audio data is divided into a plurality of portions prior to writing, whereby said writing means substantially simultaneously writes the plurality of portions of divided data to said recording mediums, and whereby said page data includes information pertaining to a port from which the source data is outputted.

23. The apparatus as set forth in claim 22, wherein the page data further includes an identification name for the source data.

24. The apparatus as set forth in claim 22, further comprising a switching means for receiving the data outputted from the plurality of input/output means and outputting them to any one of the plurality of the input/output means or an external input/output terminal;

when inserting the source data into the destination data, the controlling means selectively switching, based on the produced page data, the source data and destination data supplied to the switching means from the destination data to the source data at the insertion start point and controlling the switching means to output the data to any one of the plurality of input/output means or external input/output terminal.

25. The apparatus as set forth in claim 24, wherein the controlling means switches, based on the produced page data, the source data and destination data supplied to the switching means from the source data to the destination data at the insertion end point and controls the switching means to output the data to any one of the plurality of input/output means or external input/output terminal.

26. The apparatus as set forth in claim 24, further comprising:
   a first means for selecting one of the plurality of input/output means from which the source data is outputted; and
   a second means for selecting one of the plurality of input/output means from which the destination data is outputted;
      the destination data being outputted from the input/output means selected by the first selecting means to the switching means while the source data is outputted from the input/output means selected by the second selecting means to the switching means.

27. The apparatus as set forth in claim 26, further comprising a display means on which the data output from the external output terminal is displayed;
   the display means displaying the destination data and source data outputs from the switching means and the page data when produced by the controlling means.

28. The apparatus as set forth in claim 27, further comprising an edition position setting means for setting the insertion start point and/or insertion end point for the source data and/or destination data outputted from the input/output means selected by the first and second selecting means;
   the controlling means producing the page data from the insertion start point and/or insertion end point set by the edition point setting means and outputting a control signal for instruction to read the source data and/or destination data to the input/output means selected by the first and second selecting means; and
   the input/output means operating under the control signal to receive the designation data and/or source data from the recording/playback means and output the destination data and/or source data to the switching means, for an assigned time slot.

29. The apparatus as set forth in claim 27, wherein the controlling means determines, for the source data and/or destination data, a playback start point for the destination data and a playback end point being a recorded length from the playback start point from file system information including a top address in the recording medium at which the data is recorded in units of file and a recorded length of the file in the recording medium and the data insertion start point and/or end point, and outputs the playback start and end points superposed on the control signal to the input/output means.

30. The apparatus as set forth in claim 22, wherein said controlling means utilizes said data edition for data editing.

31. The apparatus as set forth in claim 22, wherein video and audio data are written to the plurality of non-linearly accessible recording mediums such that the video data is written to a first group of non-linearly accessible recording mediums and the audio data is written to a second group of non-linearly accessible recording mediums which is different from said first group of non-linearly accessible recording mediums.

32. A data editing apparatus having means for reading data including video data and/or audio data recorded in a tape-like recording medium, and means for editing the data read by the reading means, the editing means comprising:
   means for writing video data and/or audio data to a plurality of non-linearly accessible recording mediums and reading data recorded in the non-linearly accessible recording mediums;
   a plurality of input/output means for receiving read data supplied from the data reading means and accessing the data writing/reading means for an assigned time slot to output data to the data writing/reading means, and receiving read data supplied from the data writing/reading means for an assigned time slot and delivering the data to outside; and
   a controlling means for producing, for a data edition by inserting source data into destination data, both included in the data recorded in the recording mediums, page data having start and end points of the source data insertion and a start point of the data insertion into the destination data for each of edition units, and assigning, when a plurality of page data is produced, page numbers to them in the order of source data output time points for discrimination from other page data and then writing the page numbers in the page data,
      whereby said video data and/or said audio data is divided into a plurality of portions prior to writing,
      whereby said writing means substantially simultaneously writes the plurality of portions of divided data to said recording mediums, and
      whereby said page data includes information pertaining to a port from which the source data is outputted.

33. The apparatus as set forth in claim 32, wherein the page data further includes an identification name for the source data.

34. The apparatus as set forth in claim 32, further comprising a switching means for receiving the data outputted from the plurality of input/output means and outputting them to any one of the plurality of the input/output means or an external input/output terminal;
   when inserting the source data into the destination data, the controlling means selectively switching, based on the produced page data, the source data and destination data supplied to the switching means from the destination data to the source data at the insertion start point and controlling the switching means to output the data to any one of the plurality of input/output means or external input/output terminal.

35. The apparatus as set forth in claim 34, wherein the controlling means switches, based on the produced page data, the source data and destination data supplied to the switching means from the source data to the destination data at the insertion end point and controls the switching means to output the data to any one of the plurality of input/output means or external input/output terminal.

36. The apparatus as set forth in claim 34, further comprising:
   a first means for selecting one of the plurality of input/output means from which the source data is outputted; and
   a second means for selecting one of the plurality of input/output means from which the destination data is outputted;
      the destination data being outputted from the input/output means selected by the first selecting means to the switching means while the source data is outputted from the input/output means selected by the second selecting means to the switching means.

37. The apparatus as set forth in claim 36, further comprising a display means on which the data output from the external output terminal is displayed;
   the display means displaying the destination data and source data outputs from the switching means and the page data when produced by the controlling means.

38. The apparatus as set forth in claim 37, further comprising an edition position setting means for setting the insertion start point and/or insertion end point for the source data and/or destination data outputted from the input/output means selected by the first and second selecting means;
   the controlling means producing the page data from the insertion start point and/or insertion end point set by the edition point setting means and outputting a control signal for instruction to read the source data and/or destination data to the input/output means selected by the first and second selecting means; and
   the input/output means operating under the control signal to receive the designation data and/or source data from the recording/playback means and output the destination data and/or source data to the switching means, for an assigned time slot.

39. The apparatus as set forth in claim 37, wherein the controlling means determines, for the source data and/or destination data, a playback start point for the destination data and a playback end point being a recorded length from the playback start point from file system information including a top address in the recording medium at which the data is recorded in units of file and a recorded length of the file in the recording medium and the data insertion start point and/or end point, and outputs the playback start and end points superposed on the control signal to the input/output means.

40. The apparatus as set forth in claim 32, wherein video and audio data are written to the plurality of non-linearly accessible recording mediums such that the video data is written to a first group of non-linearly accessible recording mediums and the audio data is written to a second group of non-linearly accessible recording mediums which is different from said first group of non-linearly accessible recording mediums.

41. A data recording/playback apparatus having a plurality of non-linearly accessible recording mediums, and a plurality of input/output units for receiving and/or providing data from and/or to the recording mediums each of the input/output units processing input data and writing it to the recording mediums and processing data read from the recording mediums and delivering it to outside, both within a pre-assigned time slot, the apparatus further comprising:
   an input controlling means for designating edition points for material data recorded in the non-linearly accessible recording mediums and/or material data recorded in a linear recording medium provided in an external device; and
   means for controlling the non-linearly accessible recording mediums and/or linear recording medium according to the edition points designated by the input controlling means;
   the controlling means writing, when the edition points are designated by the input controlling means, to the non-linearly accessible recording mediums data including a number of edition units based on the edition points recorded in the linear recording medium, and accessing, when access is made again to near the edition unit(s) recorded in the linear recording medium, data including the edition unit(s) recorded in the non-linearly accessible recording medium(s),
   whereby said material data recorded in the non-linearly accessible recording mediums are divided into a plurality of portions prior to recording,
   whereby the plurality of portions is substantially simultaneously recorded on the non-linearly accessible recording mediums, and
   whereby said edition point includes information pertaining to a port from which the material data is outputted.

42. The apparatus as set forth in claim 41, wherein the controlling means provides such a control that the recording medium records also data in a predetermined range before and after a designated edition unit recorded in the linear recording medium.

43. The apparatus as set forth in claim 42, wherein the predetermined range is a one required for fine adjustment of the edition points.

44. The apparatus as set forth in claim 41, further comprising:
   means for displaying information associated with each edition unit, entered by the input controlling means; and
   means for assigning a series of identification information to each edition information in the edition unit produced according to the operation of the input controlling means to produce edition list information;
   the edition list producing means producing, according to the operation of the input controlling means, first edition information related to the edition unit recorded in the linear recording medium, and changing the first edition information to second edition information related to the edition unit recorded in the recording medium upon recording of the data including the edition unit recorded in the linear recording medium into the recording medium.

45. The apparatus as set forth in claim 44, further comprising means for storing the edition list information.

46. The apparatus as set forth in claim 44, wherein the first edition information has stated therein information about the external device and input/output unit to play back data produced by editing the material data.

47. The apparatus as set forth in claim 46, wherein the external device and input/output unit are selected by operating the input controlling means.

48. The apparatus as set forth in claim 44, wherein the second edition information has stated therein information about the input/output unit to play back the edition unit recorded in the recording medium and the input/output unit to play back the data produced by editing the material data.

49. The apparatus as set forth in claim 44, wherein the identification information is expressed by a natural number.

50. A data editing apparatus for editing and controlling material data for each of edition units, the apparatus comprising:
   a plurality of non-linearly accessible recording mediums;
   an input controlling means for designating edition points for material data recorded in the non-linearly accessible recording mediums and/or material data recorded in a linear recording medium provided in an external device; and
   means for controlling the non-linearly accessible recording mediums and/or linear recording medium according to the edition points designated by the input controlling means;

the controlling means writing, when the edition points are designated by the input controlling means, to the non-linearly accessible recording mediums data including a number of edition units based on the edition points recorded in the linear recording medium, and accessing, when access is made again to near the edition unit(s) recorded in the linear recording medium, data including the edition unit(s) recorded in the non-linearly accessible recording medium(s), whereby said material data recorded in the non-linearly accessible recording mediums are divided into a plurality of portions prior to recording, whereby the plurality of portions is substantially simultaneously recorded on the non-linearly accessible recording mediums, and whereby said edition points include information pertaining to a port from which the material data is outputted.

51. The apparatus as set forth in claim 50, wherein the controlling means provides such a control that the recording medium records also data in a predetermined range before and after a designated edition unit recorded in the linear recording medium.

52. The apparatus as set forth in claim 51, wherein the predetermined range is a one required for fine adjustment of the edition points.

53. The apparatus as set forth in claim 50, further comprising:

means for displaying information associated with each edition unit, entered by the input controlling means; and means for assigning a series of identification information to each edition information in the edition unit produced according to the operation of the input controlling means to produce edition list information;

the edition list producing means producing, according to the operation of the input controlling means, first edition information related to the edition unit recorded in the linear recording medium, and changing the first edition information to second edition information related to the edition unit recorded in the recording medium upon recording of the data including the edition unit recorded in the linear recording medium into the recording medium.

54. The apparatus as set forth in claim 53, further comprising means for storing the edition list information.

55. The apparatus as set forth in claim 53, wherein the identification information is expressed by a natural number.

56. A data recording method, comprising steps of:

writing, when designating edition points for material data recorded in a plurality of non-linearly accessible recording mediums and/or material data recorded in a linear recording medium provided in an external device, to the non-linearly accessible recording mediums data including edition units based on the edition points, recorded in the linear recording medium; and accessing, when accessing again near the edition unit(s) recorded in the linear recording medium, data including the edition unit(s) recorded in the non-linearly accessible recording medium(s), whereby said material data recorded in the non-linearly accessible recording mediums are divided into a plurality of portions prior to recording, whereby the plurality of portions is substantially simultaneously recorded on the non-linearly accessible recording mediums, and whereby said edition point includes information pertaining to the name of a port from which the material data is outputted.

57. The apparatus as set forth in claim 56, wherein the controlling means provides such a control that the recording medium records also data in a predetermined range before and after a designated edition unit recorded in the linear recording medium.

58. The apparatus as set forth in claim 57, wherein the predetermined range is a one required for fine adjustment of the edition points.

59. The apparatus as set forth in claim 56, further comprising:

means for displaying information associated with each edition unit, entered by the input controlling means; and means for assigning a series of identification information to each edition information in the edition unit produced according to the operation of the input controlling means to produce edition list information;

the edition list producing means producing, according to the operation of the input controlling means, first edition information related to the edition unit recorded in the linear recording medium, and changing the first edition information to second edition information related to the edition unit recorded in the recording medium upon recording of the data including the edition unit recorded in the linear recording medium into the recording medium.

60. The apparatus as set forth in claim 59, further comprising means for storing the edition list information.

61. The apparatus as set forth in claim 59, wherein the identification information is expressed by a natural number.

* * * * *